United States Patent
Harashina et al.

(10) Patent No.: US 7,411,013 B2
(45) Date of Patent: Aug. 12, 2008

(54) FLAME-RETARDANT RESIN COMPOSITION

(75) Inventors: Hatsuhiko Harashina, Fuji (JP); Shinya Yamada, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 393 days.

(21) Appl. No.: 10/538,735

(22) PCT Filed: Dec. 24, 2003

(86) PCT No.: PCT/JP03/16529
§ 371 (c)(1), (2), (4) Date: Jun. 14, 2005

(87) PCT Pub. No.: WO2004/061008
PCT Pub. Date: Jul. 22, 2004

(65) Prior Publication Data
US 2006/0074154 A1    Apr. 6, 2006

(30) Foreign Application Priority Data
Dec. 27, 2002    (JP) .............................. 2002-380575

(51) Int. Cl.
*C08K 5/5397* (2006.01)
(52) U.S. Cl. .................... 524/117; 524/116; 524/119
(58) Field of Classification Search ................ 524/122, 524/129, 136, 137, 139, 146–148, 150–151, 524/116, 117, 119
See application file for complete search history.

(56) References Cited

U.S. PATENT DOCUMENTS

| 4,017,455 | A | * | 4/1977 | Hoffman | .................... | 524/129 |
| 4,680,342 | A | * | 7/1987 | Axelrod et al. | .............. | 525/132 |
| 7,109,286 | B2 | * | 9/2006 | Tamura et al. | ................ | 528/99 |

FOREIGN PATENT DOCUMENTS

| CN | 1229816 A | 9/1999 |
| EP | 0 943 653 A1 | 9/1999 |
| JP | 63-150349 | 6/1988 |
| JP | 5-70671 | 3/1993 |
| JP | 5-311026 | 11/1993 |
| JP | 6-166764 | 6/1994 |
| JP | 11-152402 | 6/1999 |
| JP | 2000-103973 | 4/2000 |
| JP | 2002-69313 | 3/2002 |

OTHER PUBLICATIONS

Office Action issued Jun. 23, 2006 in Chinese Application No. 200380107715.7 in Chinese and English translation.
International Search Report.

* cited by examiner

*Primary Examiner*—Peter Szekely
(74) *Attorney, Agent, or Firm*—Nixon & Vanderhye P.C.

(57) ABSTRACT

A flame-retardant resin composition comprises a base resin (A), an organic phosphorus compound (B) having a unit represented by the following formula (1a), and a flame-retardant auxiliary (C).

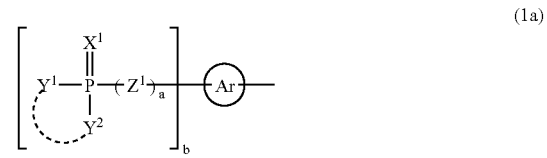

(1a)

Wherein Ar represents an aromatic hydrocarbon ring or a nitrogen-containing aromatic heterocycle; $X^1$ represents an oxygen atom or a sulfur atom; $Y^1$ and $Y^2$ are the same or different and each represents a hydrocarbon group, an alkoxy group, an aryloxy group, or an aralkyloxy group; $Z^1$ represents an alkylene group, or a nitrogen-containing bivalent group corresponding to an alkylamine; $Y^1$ and $Y^2$ may bind to each other, and $Y^1$ and $Y^2$ together with the adjacent phosphorus atom may form a ring; "a" denotes 0 or 1; and "b" denotes an integer of 1 to 6.

24 Claims, No Drawings

FLAME-RETARDANT RESIN COMPOSITION

This application is the US national phase of international application PCT/JP2003/016529 filed 24 Dec. 2003 which designated the U.S. and claims benefit of JP 2002-380575, dated 27 Dec. 2002, the entire content of which is hereby incorporated by reference.

TECHNICAL FIELD

The present invention relates to a flame-retardant resin composition which comprises a base resin, a specific organic phosphorus compound, and a specific flame-retardant auxiliary (a phosphorus-containing compound, an aromatic resin, a nitrogen-containing compound, an inorganic metal compound, a sulfur-containing compound, a silicon-containing compound), to a process for producing the flame-retardant resin composition, and to a shaped article formed with the flame-retardant resin composition.

BACKGROUND ART

Among thermoplastic resins, a polyester-series resin (such as a polybutylene terephthalate), a polyamide-series resin, or the like has excellent mechanical and electrical properties, weather resistance, water resistance, and resistance to chemicals and solvents. Therefore, the resin has been utilized for various purposes such as electric or electronic device parts, and automotive parts. While, these resins are required to have improved flame retardancy as the field of their uses expands.

Until now, there has been proposed a method for imparting flame retardancy to a thermoplastic resin by adding a flame retardant comprising a halogen-containing compound or an antimony-containing compound to the resin. For example, Japanese Patent Application Laid-Open No. 150349/1988 (JP-63-150349A) discloses a resin composition to which flame retardancy is imparted by blending a glass fiber, an organic halogen-containing flame retardant, antimony trioxide, and a hydroxide of an alkali metal or alkaline earth metal to a mixed resin comprising a polyamide resin and a nylon 66. However, the halogen-containing flame retardant is not preferable for environmental reasons because the flame retardant sometimes generates a dioxin-series compound on resolution caused by combustion. Therefore, there is proposed a method for rendering a resin flame-retardant by using a nitrogen-containing compound or a phosphorus-containing compound as a flame retardant having no halogen atom.

Japanese Patent Application Laid-Open No. 70671/1993 (JP-5-70671A) discloses a flame-retardant resin composition comprising (A) a polyalkylene terephthalate having an intrinsic viscosity of 0.3 to 1.5 dl/g, (B) a reinforcing filler, (C) an adduct of melamine and cyanuric acid, and (D) a resorcinol bisarylphosphate. Moreover, Japanese Patent Application Laid-Open No. 152402/1999 (JP-11-152402A) discloses a flame-retardant polyester composition comprising a reinforcing component and a polymer component, wherein the polymer component comprises a poly(butylene terephthalate), and a mixed flame retardant containing an aromatic phosphate oligomer, and a melamine pyrophosphate. Further, Japanese Patent Application Laid-Open No. 103973/2000 (JP-2000-103973A) discloses a flame-retardant resin composition comprising a thermoplastic resin, a phosphorus compound having a phosphonyl group (>P(=O)H), and a phenol resin.

The flame retardant having no halogen atom does not comprise harmful halogens, however, it is inferior to a halogen-containing flame retardant in flame retardancy, so that it is necessary to add a large amount of the flame retardant. The addition of a phosphate-series flame retardant or a phosphorus compound-series flame retardant having a phosphonyl group brings about bleeding out and deterioration in mechanical properties of a resin. Therefore, it is impossible to improve mechanical properties along with flame retardancy.

Thus, in conventional methods, it is difficult to render a resin high flame-retardant without deteriorating properties of the resin. Moreover, the above-mentioned flame retardant is capable of imparting flame-retardant to a specific resin, however, it is impossible to render a wide variety of thermoplastic resins flame-retardant.

It is therefore an object of the present invention to provide a flame-retardant resin composition having no halogen atom which is rendered flame-retardant to a satisfactory level with the use of a small amount of a flame retardant, and a process for producing the same.

It is another object of the present invention to provide a flame-retardant resin composition in which mold deposit and bleeding out (or blooming) of a flame retardant is effectively inhibited and to which high flame retardancy is imparted without deteriorating properties of the resin, and a process for producing the same.

It is still another object of the present invention to provide a shaped article having improved flame retardancy.

DISCLOSURE OF THE INVENTION

The inventors of the present invention made intensive studies to achieve the above objects and finally found that the addition of a specific organic phosphorus compound and a flame-retardant auxiliary in combination to a base resin imparts high flame-retardancy to the resin. The present invention was accomplished based on the above finding.

That is, the flame-retardant resin composition of the present invention comprises a base resin (A), an organic phosphorus compound (B), and a flame-retardant auxiliary (C), wherein the organic phosphorus compound (B) comprises a compound having a unit represented by the following formula (1a):

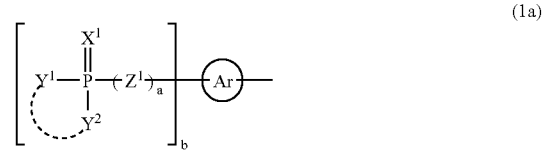

wherein Ar represents an aromatic hydrocarbon ring or a nitrogen-containing aromatic heterocycle; $X^1$ represents an oxygen atom or a sulfur atom; $Y^1$ and $Y^2$ are the same or different from each other and each represents a hydrocarbon group, an alkoxy group, an aryloxy group, or an aralkyloxy group; $Z^1$ represents an alkylene group, or a nitrogen-containing bivalent group corresponding to an alkylamine; $Y^1$ and $Y^2$ may bind to each other, and $Y^1$ and $Y^2$ together with the adjacent phosphorus atom may form a ring; "a" denotes 0 or 1; and "b" denotes an integer of 1 to 6.

The base resin (A) may comprise a polyester-series resin, a styrenic resin, a polyamide-series resin, a polycarbonate-series resin, a polyphenylene oxide-series resin, a vinyl-series resin, an olefinic resin, an acrylic resin, and others. The polyester-series resin may be a homo- or co-polyester having at least one unit selected from the group consisting of 1,4-cyclohexanedimethylene terephthalate, a $C_{2-4}$alkylene terephthalate (e.g., ethylene terephthalate, trimethylene terephthalate, and butylene terephthalate), and a $C_{2-4}$ alkylene naphthalate.

The organic phosphorus compound (B) may comprise a compound represented by the following formula (1):

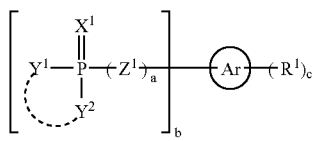

(1)

wherein $R^1$ represents an organic group; "c" denotes an integer of 0 to 9; and Ar, $X^1$, $Y^1$, $Y^2$, $Z^1$, "a" and "b" have the same meanings as defined above.

In the formula (1), $R^1$ may be an organic group such as a hydrocarbon group, an N-substituted amino group, an amino group-containing hydrocarbon group, a hydroxyl group, and a substituted hydroxyl group (in particular, a hydroxyl group or a substituted hydroxyl group); the ring Ar may be a $C_{6-20}$ aromatic hydrocarbon ring (e.g., a $C_{6-12}$ aromatic hydrocarbon ring) or a 6 to 20-membered aromatic heterocycle having 1 to 4 nitrogen atom(s) as a ring-constituting atom; a hydrocarbon group represented by $Y^1$ and $Y^2$ may be an alkyl group, a cycloalkyl group, an aryl group, or an aralkyl group; and a ring formed by $Y^1$ and $Y^2$ with the adjacent phosphorus atom may be a 4 to 20-membered heterocycle having a phosphorus atom as a ring-constituting hetero atom. The organic phosphorus compound (B) may comprise at least one member selected from the group consisting of compounds represented by the following formulae (2) to (4):

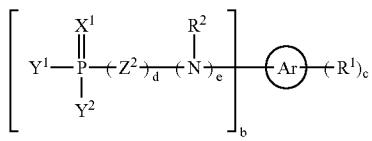

(2)

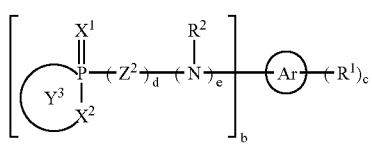

(3)

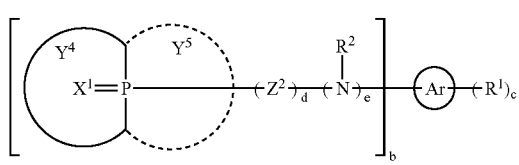

(4)

wherein $X^2$ represents an oxygen atom or a sulfur atom; $Y^3$ represents a 5 to 10-membered ring which contains P and $X^2$ as ring-constituting atoms and may have a substituent; $Y^4$ and $Y^5$ are the same or different from each other and each represents a 4 to 10-membered ring which contains P as a ring-constituting atom and may have a substituent; $Z^2$ represents an alkylene group; $R^2$ represents a hydrogen atom, an alkyl group, or a group represented by the following formula (2a), (3a) or (4a):

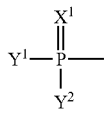

(2a)

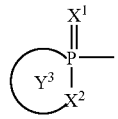

(3a)

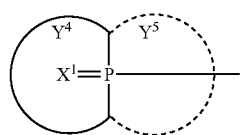

(4a)

wherein $X^1$, $X^2$, $Y^2$, $Y^3$, $Y^3$, $Y^4$ and $Y^5$ have the same meanings defined above;

"d" and "e" are the same or different from each other and each represents 0 or 1, provided that "d" is 1 when "e" is 1; and $R^1$, Ar, $X^1$, $Y^1$, $Y^2$, "a", "a", "b", and "c" have the same meanings as defined above.

In the formulae (3) and (3a), the phosphorus-containing group formed by the ring $Y^3$, $X^1$ and $X^2$ may be a group represented by the following formula, and the aromatic ring in the formula may have an organic substituent (e.g., an alkyl group, a cycloalkyl group, an aryl group, an aralkyl group, an acyl group, and a cyano group).

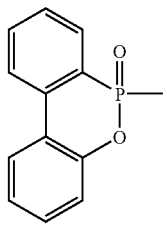

The organic phosphorus compound (B) may comprise a diarylphosphonyl-polyhydroxyarene, a dialkylphosphonyl-polyhydroxyarene, a 10-(polyhydroxyaryl)-10H-9-oxa-10-phosphaphenanthlene-10-oxide, a cycloalkylenephosphonyl-polyhydroxyarene, and the like. Moreover, the organic phosphorus compound (B) may comprise a mono- or bis[(9,10-dihydro-9-oxa-10-oxide-10-phosphaphenanthlen-10-yl)$C_{1-4}$alkyl]benzene, an N-mono- or N,N-bis[(9,10-dihydro-9-oxa-10-oxide-10-phosphaphenanthlen-10-yl)$C_{1-4}$alkyl] aminotriazine, a mono- or bis[(cycloalkylenephosphonyl) $C_{1-4}$alkyl]benzene, and an N-mono- or N,N-bis[(cycloaklylenephosphonyl)$C_{1-4}$alkyl]aminotriazine, and others. The organic phosphorus compound (B) may comprise an oligomer or polymer obtainable from a compound represented by the formula (1) and a dicarboxylic acid component containing at least an aromatic dicarboxylic acid, wherein the compound represented by the formula (1) is a phosphorus-containing polyhydroxy compound in which $R^1$ is a hydroxyl group or a derivative group thereof capable of forming an ester and "c" is not less than 2.

The flame-retardant auxiliary (C) may comprise (C1) a phosphorus-containing compound, (C2) an aromatic resin, (C3) a nitrogen-containing cyclic compound having no phosphorus atom, or a salt thereof, (C4) an inorganic metal compound, (C5) a sulfur-containing compound, (C6) a silicon-containing compound, and others, and the phosphorus-containing compound (C1) may be selected from the group consisting of (c-1) an inorganic phosphorus compound, (c-2) an orthophosphoric ester or a condensate thereof, (c-3) a phosphoric acid ester amide, (c-4) a phosphonitrilic compound, (c-5) a phosphorous ester having a phosphonyl group or a phosphinico group, or a metal salt thereof, and (c-6) an organic hypophosphorous acid compound having a phosphonyl group or a phosphinico group, or a metal salt thereof.

The flame-retardant may comprise a base resin (A), an organic phosphorus compound (B), and a flame-retardant auxiliary (C), wherein the organic phosphorus compound (B) is at least one member selected from the group consisting of compounds represented by the following formulae (2) to (4):

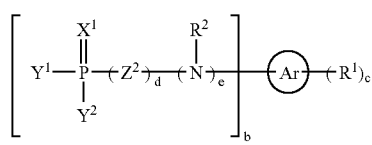
(2)

wherein "d" denotes 1, and $R^1$, $R^2$, Ar, $X^1$, $Y^2$, $Z^2$, "b", "c" and "e" have the same meanings as defined above;

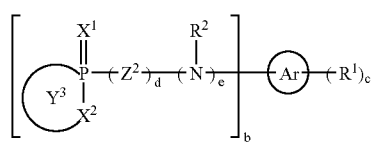
(3)

wherein $R^1$, $R^2$, Ar, $X^1$, $X^2$, $Y^3$, $Z^1$, "b", "c", "d" and "e" have the same meanings as defined above; and

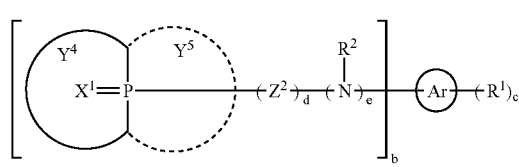
(4)

wherein "d" denotes 1, and $R^1$, $R^2$, Ar, $X^1$, $Y^4$, $Y^5$ $Z^2$, "b", "c" and "e" have the same meanings as defined above.

In such a flame-retardant resin composition, the organic phosphorus compound (B) may be at least one compound selected from the group consisting of compounds represented by the following formulae (2c), (3b), (3c) and (4c):

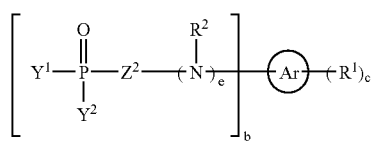
(2c)

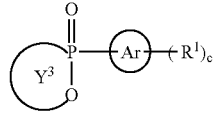
(3b)

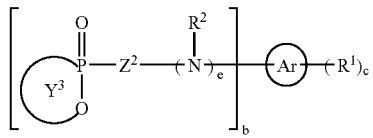
(3c)

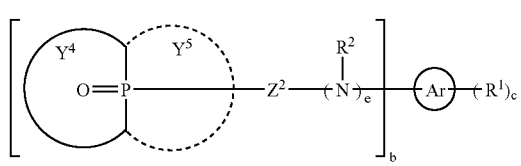
(4c)

wherein $R^1$, $R^2$, Ar, $Y^1$, $Y^2$, $Y^3$, $Y^4$, $Y^5$, $Z^2$, "b", "c" and "e" have the same meanings as defined above.

The total amount of the organic phosphorus compound (B) and the flame-retardant auxiliary (C) may be about 0.01 to 300 parts by weight relative to 100 parts by weight of the base resin (A), and the proportion of the organic phosphorus compound (B) relative to the flame-retardant auxiliary (C) [the former/the latter] may be about 5/100 to 1000/100. The resin composition may further comprise at least one member selected from the group consisting of a hindered phenol-series antioxidant, a phosphorus-containing stabilizer, a fluorine-containing resin, and a filler.

The present invention also includes a process for producing a flame-retardant resin composition, which comprises mixing a base resin (A), the organic phosphorus compound (B) and a flame-retardant auxiliary (C), and also includes a shaped article which is formed with the flame-retardant resin composition.

DETAILED DESCRIPTION OF THE INVENTION

[Base Resin (A)]

The base resin includes various resins utilizable for molding process, and for example, a polyester-series resin, a styrenic resin, a polyamide-series resin, a polycarbonate-series resin, a polyphenylene oxide-series resin, a vinyl-series resin, an olefinic resin, an acrylic resin, and others.

(1) Polyester-series Resin

The polyester-series resin is a homopolyester or copolyester obtained by, for example, a polycondensation of a dicarboxylic acid component and a diol component, a polycondensation of a hydroxycarboxylic acid or a lactone or a polycondensation of these components. The preferred polyester-series resin usually includes a saturated polyester-series resin, in particular an aromatic saturated polyester-series resin.

The dicarboxylic acid component includes, for example, an aliphatic dicarboxylic acid (e.g., a dicarboxylic acid having about 4 to 40 carbon atoms such as succinic acid, glutaric acid, adipic acid, pimelic acid, suberic acid, azelaic acid, sebacic acid, undecanedicarboxylic acid, dodecanedicarboxylic acid, hexadecanedicarboxylic acid and dimeric acid, preferably dicarboxylic acid having about 4 to 14 carbon atoms), an alicyclic dicarboxylic acid (e.g., a dicarboxylic acid having about 8 to 12 carbon atoms such as hexahydrophthalic acid, hexahydroisophthalic acid, hexahydroterephthalic acid, and himic acid), an aromatic dicarboxylic acid [e.g., a dicarboxylic acid having about 8 to 16 carbon atoms such as phthalic acid, isophthalic acid, terephthalic acid, a naphthalenedicarboxylic acid (such as 2,6-naphthalenedicarboxylic acid), 4,4'-diphenyldicarboxylic acid, diphenylether-4,4'-dicarboxylic acid, 4,4'-diphenylmethanedicarboxylic acid, and 4.4'-diphenylketonedicarboxylic acid], or a derivative thereof (e.g., a derivative, capable of producing an ester, such as a lower alkyl ester, an aryl ester, and an acid anhydride). These dicarboxylic acid components may be used singly or in combination. Further, if necessary, the dicarboxylic acid component may be used in combination with a polycarboxylic acid such as trimellitic acid and pyromellitic acid.

The preferred dicarboxylic acid component includes an aromatic dicarboxylic acid such as terephthalic acid, isophthalic acid, and naphthalenedicarboxylic acid.

As the diol component, for example, there are mentioned an aliphatic alkylene glycol (e.g., an aliphatic glycol having about 2 to 12 carbon atoms such as ethylene glycol, trimethylene glycol, propylene glycol, 1,4-butanediol, 1,3-butanediol, neopentyl glycol, hexanediol, octanediol and decanediol, preferably an aliphatic glycol having about 2 to 10 carbon atoms), a polyoxyalkylene glycol [e.g., a glycol having a plurality of oxyalkylene units of which the alkylene group has about 2 to 4 carbon atoms, for example, diethylene glycol, dipropylene glycol, ditetramethylene glycol, triethylene glycol, tripropyleneglycol, a polytetramethylene glycol], an alicyclic diol (e.g., 1,4-cyclohexanediol, 1,4-cyclohexanedimethanol, hydrogenated bisphenol A), and others. Moreover, the diol component may be used in combination with an aromatic diol such as hydroquinone, resorcinol, biphenol, 3,3',5,5'-tetramethyl-4,4'-dihydroxybiphenyl, 2,2-bis(4-hydroxyphenyl)propane, 2,2-bis-(4-(2-hydroxyethoxy)phenyl)propane, and xylylene glycol. These diol components may be used singly or in combination. Further, if necessary, the diol component may be used in combination with a polyol such as glycerin, trimethylolpropane, trimethylolethane and pentaerythritol.

The preferred diol component includes a $C_{2-6}$ alkylene glycol (e.g., a linear alkylene glycol such as ethylene glycol, trimethylene glycol, propylene glycol and 1,4-butanediol), a polyoxyalkylene glycol having a repeating oxyalkylene unit of about 2 to 4 [a glycol containing a poly(oxy-$C_{2-4}$alkylene) unit, such as diethylene glycol and a polytetramethylene glycol], and 1,4-cyclohexanedimethanol.

The hydroxycarboxylic acid includes, for example, a hydroxycarboxylic acid such as hydroxybenzoic acid, hydroxynaphthoic acid, hydroxyphenylacetic acid, glycolic acid and hydroxycaproic acid, or a derivative thereof.

Exemplified as the lactone is a $C_{3-12}$lactone such as propiolactone, butyrolactone, valerolactone, and caprolactone (e.g., ε-caprolactone), and others.

The preferred polyester-series resin includes a homopolyester or copolyester containing an alkylene arylate unit such as an alkylene terephthalate and an alkylene naphthalate as a main unit (e.g., about 50 to 100% by weight, preferably about 75 to 100% by weight) [for example, a homopolyester such as a polyalkylene terephthalate (e.g., a poly$C_{2-4}$alkylene terephthalate such as a poly(1,4-cyclohexanedimethylene terephthalate) (PCT), a polyethylene terephthalate (PET), a polypropylene terephthalate (PPT), a polytrimethylene terephthalate (PTT) and a polybutylene terephthalate (PBT)), a polyalkylene naphthalate (e.g., a poly$C_{2-4}$alkylene naphthalate such as a polyethylene naphthalate, a polypropylene naphthalate and a polybutylene naphthalate); and a copolyester containing alkylene terephthalate and/or alkylene naphthalate unit(s) as a main unit (e.g., not less than 50% by weight)]. The particularly preferred polyester-series resin includes a polybutylene terephthalate-series resin containing a butylene terephthalate unit as a main unit (e.g., a polybutylene terephthalate, and a polybutylene terephthalate copolyester), a polytrimethylene terephthalate-series resin containing a trimethylene terephthalate unit as a main unit (e.g., a polytrimethylene terephthalate, and a polytrimethylene terephthalate copolyester), and a polyethylene terephthalate-series resin containing an ethylene terephthalate unit as a main unit (e.g., a polyethylene terephthalate, and a polyethylene terephthalate copolyester). Incidentally, these polyester-series resins may be used singly or in combination.

Moreover, in the copolyester, a copolymerizable monomer includes a $C_{2-6}$alkylene glycol (e.g., a linear alkylene glycol such as ethylene glycol, propylene glycol and 1,4-butanediol), a polyoxyalkylene glycol which has a repeating oxyalkylene unit of about 2 to 4 (e.g., a glycol comprising a poly(oxy-$C_{2-4}$alkylene) unit, such as diethylene glycol and a polytetramethylene glycol), an alicyclic diol (e.g., 1,4-cyclohexane dimethanol), an aromatic diol [e.g., 2,2-bis(4-(2-hydroxyethoxy)phenyl)propane], a $C_{6-12}$aliphatic dicarboxylic acid (e.g., adipic acid, pimelic acid, suberic acid, azelaic acid, sebacic acid), an aromatic dicarboxylic acid (e.g., phthalic acid, isophthalic acid, diphenyldicarboxylic acid), a hydroxycarboxylic acid (e.g., hydroxybenzoic acid, hydroxynaphthoic acid), and others. Incidentally, the polyester-series resin may have not only a linear chain structure but also a branched chain structure, or crosslinked structure as far as melt-moldability thereof is not deteriorated. Moreover, the polyester-series resin may be a liquid crystalline polyester.

The polyester-series resin may be produced by a conventional manner, for example, transesterification, direct esterification.

(2) Styrenic Resin

As the styrenic resin, for example, there may be mentioned a homo- or copolymer of a styrenic monomer (e.g., styrene, vinyltoluene, α-methylstyrene, chlorostyrene); a copolymer of the styrenic monomer and a vinyl monomer [e.g., an unsaturated nitrile (such as acrylonitrile), an α,β-monoolefinic unsaturated carboxylic acid or acid anhydride or an ester thereof (such as a (meth)acrylic acid ester, (meth)acrylic acid and maleic anhydride)]; a styrenic graft copolymer; and a styrenic block copolymer.

The preferred styrenic resin includes a polystyrene (GPPS), a styrene-methyl methacrylate copolymer, a styrene-(meth)acrylic acid copolymer, a styrene-maleic anhydride copolymer, a styrene-acrylonitrile copolymer (AS resin), a high impact polystyrene (HIPS) in which a styrenic monomer is polymerized to a rubber component, and a polystyrenic graft or block copolymer. As the polystyrene-series graft copolymer, there may be mentioned a copolymer which is obtained by graft polymerization of at least a styrenic monomer and a copolymerizable monomer to a rubber component (for example, ABS resin which is obtained by graft polymerization of styrene and acrylonitrile to a polybutadiene, AAS resin which is obtained by graft polymerization of styrene and acrylonitrile to an acrylic rubber, ACS resin which is obtained by graft polymerization of styrene and acrylonitrile to a chlorinated polyethylene, a polymer which is obtained by graft polymerization of styrene and acrylonitrile to an ethylene-vinyl acetate copolymer, a polymer which is obtained by graft polymerization of styrene and acrylonitrile to an ethylene-propylene rubber, MBS resin which is obtained by graft polymerization of styrene and methyl methacrylate to a polybutadiene, a resin which is obtained by graft polymerization of styrene and acrylonitrile to a styrene-butadiene copolymer rubber). The block copolymer includes a copolymer comprising a polystyrenic block and a diene or olefinic block (e.g., a styrene-butadiene-styrene (SBS) block copolymer, a styrene-isoprene block copolymer, a styrene-isoprene-styrene (SIS) block copolymer, a hydrogenated styrene-butadiene-styrene (SEBS) block copolymer, a hydrogenated styrene-isoprene-styrene (SEPS) block copolymer), and others. These styrenic resins may be used singly or in combination.

(3) Polyamide-series Resin

The polyamide includes a polyamide derived from a diamine and a dicarboxylic acid; a polyamide obtained from an aminocarboxylic acid, and if necessary in combination with a diamine and/or a dicarboxylic acid; a polyamide derived from a lactam, and if necessary in combination with a diamine and/or a dicarboxylic acid. The polyamide also includes a copolyamide derived from at least two different kinds of polyamide constituent components.

As the diamine, there may be mentioned, for example, an aliphatic diamine such as trimethylenediamine, tetramethylenediamine, pentamethylenediamine, hexamethylenediamine, 2,2,4-trimethylhexamethylenediamine, 2,4,4-trimethylhexamethylenediamine, octamethylenediamine and nonamethylenediamine; and an alicyclic diamine such as bis (4-aminocyclohexyl)methane and bis(4-amino-3-methylcyclohexyl)methane. Moreover, the diamine may be used in combination with an aromatic diamine such as phenylenediamine and metaxylylenediamine. These diamines may be used singly or in combination.

Examples of the dicarboxylic acid are a $C_{4-20}$ aliphatic dicarboxylic acid such as glutaric acid, adipic acid, pimelic acid, suberic acid, azelaic acid, sebacic acid and octadecanoic diacid; a dimerized fatty acid (dimeric acid); an alicyclic dicarboxylic acid such as cyclohexane-1,4-dicarboxylic acid and cyclohexane-1,3-dicarboxylic acid; an aromatic dicarboxylic acid such as phthalic acid, phthalic anhydride, isophthalic acid, terephthalic acid and naphthalenedicarboxylic acid; and others.

As the aminocarboxylic acid, there may be mentioned, for example, a $C_{4-20}$ aminocarboxylic acid such as aminoheptanoic acid, aminononanoic acid and aminoundecanoic acid. These aminocarboxylic acids may be also used singly or in combination.

As the lactam, for example, there may be mentioned a $C_{4-20}$ lactam such as butyrolactam, pivalolactam, caprolactam, caprilactam, enantholactam, undecanolactam and dodecalactam. These lactams may be also used singly or in combination.

The polyamide-series resin includes an aliphatic polyamide (such as a nylon 46, a nylon 6, a nylon 66, a nylon 610, a nylon 612, a nylon 11 and a nylon 12), a polyamide obtainable from an aromatic dicarboxylic acid (e.g., terephthalic acid and/or isophthalic acid) and an aliphatic diamine (e.g., hexamethylenediamine, nonamethylenediamine), a polyamide obtainable from both aromatic and aliphatic dicarboxylic acids (e.g., both terephthalic acid and adipic acid) and an aliphatic diamine (e.g., hexamethylenediamine), and others. These polyamides may be used singly or in combination. The preferred polyamide includes a non-aromatic and aliphatic polyamide (e.g., a nylon 6, a nylon 66, a nylon 610, a nylon 612, a nylon 11, a nylon 12), a semiaromatic polyamide (e.g., a nylon MXD6, a nylon 9T), a copolymerized semiaromatic polyamide (e.g., a nylon 6T/6, a nylon 6T/66, a nylon 6T/12, a nylon 6I/6, a nylon 6I/66, a nylon 6T/6I, a nylon 6T/6I/6, a nylon 6T/6I/66, a nylon 6T/M5T), and others. These polyamide-series resins may be used singly or in combination.

(4) Polycarbonate-series Resin

The polycarbonate-series resin includes a polymer obtainable through the reaction of a dihydroxy compound with phosgene or a carbonic ester such as diphenyl carbonate. The dihydroxy compound may be an alicyclic compound, and is preferably a bisphenol compound.

The bisphenol compound includes a bis(hydroxyaryl)$C_{1-6}$ alkane such as bis(4-hydroxyphenyl)methane, 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, and 2,2-bis(4-hydroxyphenyl)-4-methylpentane; a bis(hydroxyaryl) $C_{4-10}$ cycloalkane such as 1,1-bis(4-hydroxyphenyl) cyclopentane and 1,1-bis(4-hydroxyphenyl)cyclohexane; 4,4'-dihydroxydiphenyl ether; 4,4'-dihydroxydiphenyl sulfone; 4,4'-dihydroxydiphenyl sulfide; 4,4'-dihydroxydiphenyl ketone; and others.

The preferred polycarbonate-series resin includes a bisphenol A-based polycarbonate. These polycarbonate-series resins may be used singly or in combination.

(5) Polyphenylene Oxide-series Resin

The polyphenylene oxide-series resin (polyphenylene ether-series resin) includes a homopolymer and a copolymer. As the homopolymer, there may be mentioned a poly(mono-, di- or tri$C_{1-6}$alkyl-phenylene) oxide, a poly(mono- or di$C_{6-20}$ aryl-phenylene) oxide, and a poly(mono$C_{1-6}$alkyl-mono $C_{6-20}$aryl-phenylene) oxide. For example, such a homopolymer may include a poly(2,6-dimethyl-1,4-phenylene) oxide, a poly(2,5-dimethyl-1,4-phenylene) oxide, a poly(2,5-diethyl-1,4-phenylene) oxide, a poly(2-methyl-6-ethyl-1,4-phenylene) oxide, a poly(2,6-di-n-propyl-1,4-phenylene) oxide, a poly(2-ethyl-6-isopropyl-1,4-phenylene) oxide, a poly(2-methyl-6-methoxy-1,4-phenylene) oxide, a poly(2-methyl-6-hydroxyethyl-1,4-phenylene) oxide, a poly(2,3,6-trimethyl-1,4-phenylene) oxide, a poly(2,6-diphenyl-1,4-phenylene) oxide, and a poly(2-methyl-6-phenyl-1,4-phenylene) oxide.

As the copolymer of a polyphenylene oxide, there may be mentioned: a copolymer having not less than two of monomer units constituting the above-mentioned homopolymers (e.g., a random copolymer having 2,6-dimethyl-1,4-phenylene oxide unit and 2,3,6-trimethyl-1,4-phenylene oxide unit); a modified polyphenylene oxide copolymer comprising a polyphenylene oxide block as the main structure and an alkylphenol-modified benzene formaldehyde resin block which is obtainable by a reaction of an alkylphenol (such as cresol and p-tert-butylphenol) with a benzene formaldehyde resin (a condensation product of a benzene ring-containing compound and formaldehyde, such as a phenol resin) or alkylbenzene formaldehyde resin; a modified graft copolymer in which a styrenic monomer and/or an unsaturated acid anhydride is grafted to a polyphenylene oxide or a copolymer thereof; and others. These polyphenylene oxide-series resins may be used singly or in combination.

(6) Vinyl-series Resin

The vinyl-series resin includes a homo- or copolymer of a vinyl-series monomer [e.g., a vinyl ester such as vinyl acetate, vinyl propionate, vinyl crotonate and vinyl benzoate; a chlorine-containing vinyl monomer (e.g., vinyl chloride, chloroprene); a fluorine-containing vinyl monomer (e.g., fluoroethylene); a vinyl ketone such as methyl vinyl ketone and methyl isopropenyl ketone; a vinyl ether such as vinyl methyl ether and vinyl isobutyl ether; and a vinyl amine such as N-vinylcarbazole and N-vinylpyrrolidone], or a copolymer of a vinyl-series monomer and other copolymerizable monomer.

A derivative of the above-mentioned vinyl-series resin (e.g., a polyvinyl alcohol, a polyvinyl acetal such as a polyvinyl formal and a polyvinyl butyral, an ethylene-vinyl acetate copolymer, an ethylene-vinyl alcohol copolymer) may be also used. These vinyl-series resins may be used singly or in combination.

(7) Olefinic Resin

The olefinic resin includes, for example, a homo- or copolymer of a chain olefin (e.g., an $\alpha$-$C_{2-10}$olefin such as ethylene and propylene), a cyclic olefin, or a derivative thereof (e.g., an alkyl-substituted olefin, a carboxy-substituted olefin). The cyclic olefin includes a cycloalkene (e.g., $C_{3-10}$cycloalkene such as a cyclopropene, cyclobutene, cyclopentene, cyclohexene, and cyclooctene), a cycloalkyne (e.g., a $C_{3-10}$cycloalkyne such as cyclopropyne, cyclobutyne, cyclopentyne, cyclohexyne, and cyclooctyne), a crosslinked (bridged) cyclic cycloolefin (e.g., norbornene, dicyclopentadiene, dicycloheptadiene, tetradicyclododecene, and hexacycloheptadecene), and others.

The preferred olefinic resin includes an $\alpha$-$C_{2-3}$olefinic resin [e.g., a propylene-ethylene copolymer, an ethylene-(meth)acrylic acid copolymer, a salt of an ethylene-(meth) acrylic acid copolymer, an ethylene-(meth)acrylate copolymer (e.g., an ethylene-ethyl acrylate copolymer), a propylene-(meth)acrylic acid copolymer], a cyclic olefinic resin (e.g., a homopolymer of a cyclic olefin, and an $\alpha$-$C_{2-10}$ olefin-cyclic olefin copolymer).

(8) Acrylic Resin

The acrylic resin includes, for example, a homo- or copolymer of a (meth)acrylic monomer (e.g., (meth)acrylic acid or an ester thereof), in addition a (meth)acrylic acid-styrene copolymer, a methyl (meth)acrylate-styrene copolymer, and others.

(9) Other Resins

As other resins, there may be exemplified a polyacetal resin, a polyphenylene sulfide resin, an aliphatic polyketone-series resin (ketone resin); a polysulfone [e.g., a thermoplastic polysulfone, a poly(ether sulfone), a poly(4,4'-bisphenol ether sulfone)]; a poly(ether ketone); a poly(ether ether ketone); a poly(ether imide); a thermoplastic polyurethane-series resin [e.g., a polymer obtainable from a reaction of a diisocyanate compound (such as tolylenediisocyanate) with the above-mentioned glycol and/or the above-mentioned diamine; and a polyurethane elastomer which may have a segment such as a polytetramethylene glycol]; a thermoplastic polyimide; a polyoxybenzylene; a thermoplastic elastomer; and the like.

These polymer compounds may be used singly or in combination.

The preferred base resin includes a polyester-series resin which may be a liquid crystalline polyester, a styrenic resin, a polyamide-series resin, a polycarbonate-series resin, a polyphenylene oxide-series resin, a vinyl-series resin, and an olefinic resin, and more preferably includes a polyester-series resin, a polyamide-series resin, a polycarbonate-series resin, a polyphenylene oxide-series resin, and a styrenic resin. In particular, a polyester-series resin (such as a PBT-series resin, a PTT-series resin, and a PET-series resin) is preferred. Moreover, a styrenic resin and at least one member selected from the group consisting of a polyester-series resin (e.g., a PBT-series resin, a PPT-series resin, and a PET-series resin), a polyamide-series resin, a polycarbonate-series resin, and a polyphenylene oxide-series resin (in particular a polyester-series resin) may be used in combination.

The number average molecular weight of the base resin is not particularly limited to a specific one, and is suitably selected depending on a kind or application of resin. For example, the number average molecular weight may be selected within the range of about $5 \times 10^3$ to $200 \times 10^4$, preferably about $1 \times 10^4$ to $150 \times 10^4$, and more preferably about $1 \times 10^4$ to $100 \times 10^4$. Moreover, in the case where the base resin is a polyester-series resin, the number average molecular weight may for example be about $5 \times 10^3$ to $100 \times 10^4$, preferably about $1 \times 10^4$ to $70 \times 10^4$, and more preferably about $1.2 \times 10^4$ to $30 \times 10^4$.

[Organic Phosphorus Compound (B)]

The organic phosphorus compound (B) includes a compound having a unit represented by the following formula (1a):

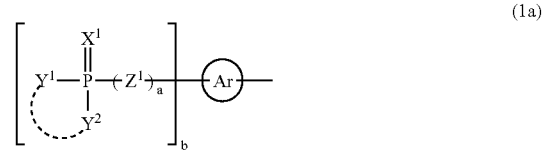

(1a)

wherein Ar represents an aromatic hydrocarbon ring, or a nitrogen-containing aromatic heterocycle; $X^1$ represents an oxygen atom, or a sulfur atom; $Y^1$ and $Y^2$ are the same or different from each other, and each represents a hydrocarbon group, an alkoxy group, an aryloxy group, or an aralkyloxy group; $Z^1$ represents an alkylene group, or a nitrogen-containing bivalent group corresponding to an alkylamine; $Y^1$ and $Y^2$ may bind to each other, and $Y^1$ and $Y^2$ together with the adjacent phosphorous atom may form a ring; "a" denotes 0 or 1; and "b" denotes an integer of 1 to 6.

Examples of such an organic phosphorus compound include a compound represented by the following formula (1):

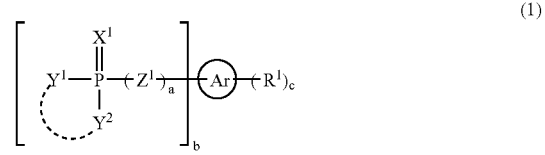

(1)

wherein $R^1$ represents an organic group; "c" denotes an integer of 0 to 9; and Ar, $X^1$, $Y^1$, $Y^2$, $Z^1$, "a", and "b" have the same meanings as defined above.

In the above formula (1), the organic group represented by $R^1$ includes a hydrocarbon group such as an alkyl group [e.g., a $C_{1-10}$alkyl group such as methyl, ethyl, n-propyl, isopropyl, n-butyl, sec-butyl, and t-butyl (e.g., a $C_{1-6}$alkyl group, particularly a $C_{1-4}$alkyl group)], a cycloalkyl group (e.g., a $C_{5-10}$cycloalkyl group such as cyclopentyl and cyclohexyl groups, particularly a $C_{5-8}$cycloalkyl group), an aryl group [e.g., a $C_{6-20}$aryl group such as phenyl and naphthyl groups (e.g., a $C_{6-14}$aryl group, particularly a $C_{6-10}$aryl group)], and an aralkyl group [e.g., a $C_{6-20}$aryl-$C_{1-6}$alkyl group such as benzyl and phenethyl groups (e.g., a $C_{6-14}$aryl-$C_{1-6}$alkyl group, particularly a $C_{6-10}$aryl-$C_{1-4}$alkyl group)]; an N-substituted amino group [e.g., an amino group (i.e., an N-substituted amino group) having one substituent hydrocarbon group (such as the above-mentioned hydrocarbon group) in which the substituent binds to the nitrogen atom of the amino group (e.g., an N-alkylamino group, and an N-arylamino group), or an amino group (i.e., an N,N-disubstituted amino group) having two substituent hydrocarbon groups (such as the above-mentioned hydrocarbon group) in which the substituents bind to the nitrogen atom of the amino group (e.g., an N,N-dialkylamino group, and an N,N-diarylamino group)]; an amino group-containing hydrocarbon group [e.g., a hydrocarbon group (e.g., a hydrocarbon group mentioned above) having one or a plurality of amino groups (e.g., 2 to 4 amino groups), such as an aminoalkyl group (e.g., an amino$C_{1-6}$ alkyl group) and an aminoaryl group (e.g., a mono- or diamino$C_{6-10}$aryl group)]; a hydroxyl group; a substituted hydroxyl group (a derivative group of the hydroxyl group in which a hydrogen atom constituting a hydroxyl group is substituted with a substituent); and others.

Examples of the substituted hydroxyl group include an alkoxy group [for example, an alkyl ether derivative group of a hydroxyl group, e.g., a $C_{1-10}$alkoxy group such as methoxy, ethoxy, n-propoxy, isopropoxy, n-butoxy, sec-butoxy, and t-butoxy (e.g., a $C_{1-6}$alkoxy group, particularly a $C_{1-4}$alkoxy group)], a cycloalkyloxy group (that is, a cycloalkyl ether derivative group of a hydroxyl group, e.g., a $C_{5-10}$cycloalkyloxy group such as cyclopentyloxy and cyclohexyloxy groups, particularly a $C_{5-8}$cycloalkyloxy group), an aryloxy group [that is, an aryl ether derivative group of a hydroxyl group, e.g., a $C_{6-20}$aryloxy group such as phenoxy and naphthyloxy groups (e.g., a $C_{6-14}$aryloxy group, particularly a $C_{6-10}$aryloxy group)], and an aralkyloxy group [that is, an aralkyl ether derivative group of a hydroxyl group, e.g., a $C_{6-20}$aryl-$C_{1-6}$alkoxy group such as benzyloxy and phenethyloxy groups (e.g., a $C_{6-14}$aryl-$C_{1-6}$alkoxy group, particularly a $C_{6-10}$aryl-$C_{1-4}$alkoxy group)]. Moreover, the substituted hydroxyl group includes a derivative group in which a hydrogen atom constituting a hydroxyl group is substituted with a substituent, for example, an ester group [e.g., an alkylcarbonyloxy group (that is, an alkylcarboxylate derivative group, such as a $C_{1-6}$alkyl-carbonyloxy group such as methylcarbonyloxy and ethylcarbonyloxy groups), an arylcarbonyloxy group (that is, arylcarboxylate derivative group, such as a $C_{6-10}$aryl-carbonyloxy group such as phenylcarbonyloxy group), an aralkylcarbonyloxy group (e.g., a $C_{6-10}$aryl-$C_{1-4}$ alkyl-carbonyloxy group such as benzylcarbonyloxy group), an alkoxycarbonyloxy group (e.g., a $C_{1-4}$alkoxy-carbonyloxy group such as methoxycarbonyloxy and ethoxycarbonyloxy groups), an aryloxycarbonyloxy group (e.g., a $C_{6-10}$aryloxy-carbonyloxy group such as phenoxycarbonyloxy group)]; an alkylene oxide-added group. [e.g., a group in which an alkylene oxide such as ethylene oxide and propylene oxide (e.g., a $C_{2-3}$alkylene oxide) is added to the hydroxyl group]; an imino ester group [e.g., an alkyliminocarbonyloxy group (e.g., a $C_{1-4}$alkyliminocarbonyloxy group such as a methyliminocarbonyloxy and ethyliminocarbonyloxy groups), an arylimino-carbonyloxy group (e.g., a $C_{6-10}$arylimino-carbonyloxy group such as phenyliminocarbonyloxy group)]; a glycidyl ether group; and others.

The preferred $R^1$ is a hydroxyl group, and a substituted hydroxyl group (e.g., an alkoxy group, an aryloxy group, and an aralkyloxy group), particularly a hydroxyl group. Moreover, it is also preferred that the ring Ar has, in addition to the hydroxyl group or substituted hydroxyl group, a hydrocarbon group [e.g., an alkyl group, an aryl group, an aralkyl group (in particular a $C_{1-6}$alkyl group and a $C_{6-10}$aryl group)] and the like.

In the formulae (1a) and (1), examples of the aromatic hydrocarbon ring represented by Ar include a $C_{6-20}$aromatic hydrocarbon ring (a $C_{6-14}$aromatic hydrocarbon ring) such as a benzene ring, a naphthalene ring, a phenanthrene ring, and a polyaryl [for example, a $C_{6-20}$bisaryl (e.g., a $C_{6-14}$bisaryl) such as a biphenyl ring; an aromatic ring corresponding to a bis $C_{6-10}$aryl-$C_{1-4}$alkane such as 2,2-biphenylpropane; and a bis $C_{6-10}$aryl sulfone such as diphenyl sulfone]. Moreover, as the nitrogen-containing aromatic heterocycle, there may be exemplified a 6 to 20-membered (e.g., 6 to 14-membered) aromatic heterocycle having one to four nitrogen atom(s) as a constituent atom of the ring, for example, a monocyclic heterocycle such as pyridine ring, pyridazine ring, pyrimidine ring, pyrazine ring, and a triazine [a triazine such as 1,2,3-triazine, 1,2,4-triazine, 1,2,5-triazine, and 1,3,5-triazine (particularly 1,3,5-triazine)]; and a polycyclic heterocycle [e.g., quinoline, isoquinoline, phthalazine, a naphthyridine (e.g., 1,8-naphthyridine ring), quinoxaline, quinazoline, cinnoline, pteridine, phenanthridine, and acridine]. The preferred aromatic ring includes a $C_{6-12}$aromatic hydrocarbon ring, a 6 to 10-membered aromatic heterocycle having one to three nitrogen atom(s) as a constituent atom of the ring, and others.

The substituent group $R^1$ on the aromatic ring Ar is usually positioned on a carbon atom constituting the ring Ar. In the case where the ring Ar is monocyclic hydrocarbon ring (benzene ring, a monocyclic nitrogen-containing ring), the group $R^1$ may be positioned at any of 2 to 6 positions to a phosphorous-containing group (a group containing the group >P(=$X^1$)— in the above formula (1)) as far as the group $R^1$ is positioned on the carbon atom. Moreover, in the case where the ring Ar is a polycyclic hydrocarbon ring (e.g., a polyaryl such as biphenyl; naphthalene, phenanthrene) or a polycyclic heterocycle, the substituent group $R^1$ may be positioned on any carbon atom of any ring constituting the polycyclic hydrocarbon ring as far as the group $R^1$ is positioned on the carbon atom. Incidentally, in the case where the ring Ar is a condensed ring (e.g., naphthalene ring, and phenanthrene ring), a hydroxyl group or substituted hydroxyl group as the substituent group(s) $R^1$ is preferably positioned on a ring having the phosphorous-containing group, and other substituent group(s) is preferably positioned on other ring.

Regarding the ring Ar, it is preferred that the group, —Ar—$R^1$, directly or indirectly bonding to the phosphorous atom, is 2,5-dihydroxyphenyl group, 2,7-dihydroxynaphthyl group (2-(1,4-dihydroxynaphthyl) group), 2-hydroxy-5-(4'-hydroxyphenyl)phenyl group, or a derivative group thereof (e.g., a derivative in which $R^1$ is the group derived from a hydroxyl group, such as the ester group, the ether group, and the alkylene oxide-added group), as represented by the following formula.

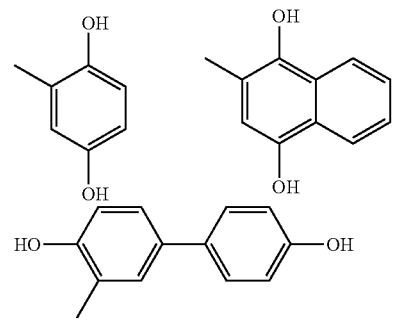

In the formulae (1a) and (1), $X^1$ is preferably an oxygen atom.

In the above formulae (1a) and (1), examples of $Y^1$ and $Y^2$ include a hydrocarbon group exemplified in the paragraph of the group $R^1$ (in particular, an alkyl group, a cycloalkyl group, an aryl group, an aralkyl group, and others), an alkoxy group, an aryloxy group, and an aralkyloxy group. From the viewpoint of flame retardancy, it is preferred that both of the groups $Y^1$ and $Y^2$ are a hydrocarbon group, or that at least one group among them is an aromatic group (that is, an aryl group, an aralkyl group, an aryloxy group, an aralkyloxy group).

The groups $Y^1$ and $Y^2$ may have about 1 to 3 substituent(s) (e.g., 1 or 2 substituent(s)), and the substituent includes one (such as an alkyl group, an amino group, an N-substituted amino group, an amino group-containing hydrocarbon group, a hydroxyl group, and an alkoxy group) exemplified in the paragraph of the group $R^1$.

As a ring which is formed from $Y^1$ and $Y^2$ with the phosphorous atom, there may be mentioned a 4 to 20-membered heterocycle, and preferably 5 to 16-membered heterocycle, which has the phosphorous atom as a hetero atom constituting the ring. The ring may be non-aromatic ring, and may be an aromatic ring. Moreover, the ring may be a bicyclo ring.

The heterocycle may have a substituent exemplified in the paragraph of the group $R^1$, e.g., a hydrocarbon group [including an alkenyl group (e.g., a $C_{2-10}$alkenyl group such as vinyl group and allyl group, particularly a $C_{2-6}$alkenyl group), a cycloalkenyl group (e.g., a $C_{5-8}$cycloalkenyl group such as cyclohexenyl group) and others, in addition to the above-mentioned alkyl group, cycloalkyl group, aryl group, and aralkyl group], an amino group, an N-substituted amino group, an amino group-containing hydrocarbon group, a hydroxyl group, a substituted hydroxyl group, and the like. The preferred substituent includes an alkyl group, a hydroxyl group, an alkoxy group, and others. The number of the substituent is not particularly limited to a specific one, and is, for example, about 1 to 9, preferably about 1 to 6, and more preferably about 1 to 4 (e.g., 1 or 2), depending on the member of the heterocycle.

In the above formulae (1a) and (1), "b" is an integer of 1 to 6, preferably an integer of 1 to 5, and more preferably an integer of 1 to 4.

In the above formula (1), "c" is integer of 0 to 9, preferably an integer of 1 to 6, and more preferably an integer of 1 to 4.

The organic phosphorus compound (B) represented by the formula (1) includes, for example, a compound represented by the following formulae (2) to (4):

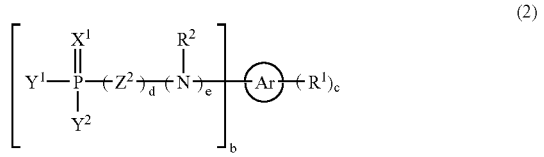

(2)

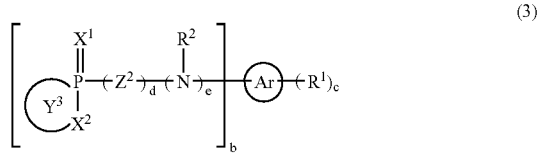

(3)

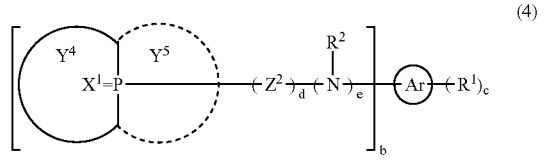

(4)

wherein $X^2$ represents an oxygen atom or a sulfur atom; $Y^3$ represents a 5 to 10-membered ring which contains P and $X^2$ as ring-constituting atoms and may have a substituent; $Y^4$ and $Y^5$ are the same or different from each other and each represents a 4 to 10-membered ring which contains P as a ring-constituting atom and may have a substituent; $Z^2$ represents an alkylene group; $R^2$ represents a hydrogen atom, an alkyl group, or a group represented by the following formula (2a), (3a) or (4a):

(2a)

(3a)

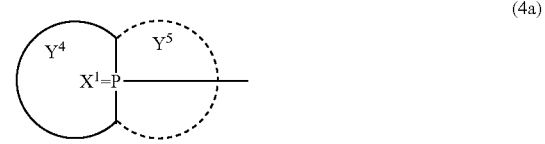

(4a)

wherein $X^1$, $X^2$, $Y^1$, $Y^2$, $Y^3$, $Y^4$ and $Y^5$ have the same meanings defined above;

"d" and "e" are the same or different from each other and each represents 0 or 1, provided that "d" is 1 when "e" is 1; and $R^1$, Ar, $X^1$, $Y^2$, "b" and "c" have the same meanings as defined above.

In the above formulae (2) to (4), $X^2$ is preferably an oxygen atom.

In the above formulae (2) to (4), the bivalent group, $-Z^2-N(R^2)-$, corresponds to the bivalent group $Z^1$ in the formula (1). Examples of an alkylene group represented by $Z^2$ include an alkylene group such as methylene, ethylene, propylene, trimethylene, and tetramethylene groups (e.g., a $C_{1-6}$alkylene group). The preferred alkylene group includes a $C_{1-4}$alkylene group (in particular a $C_{1-2}$alkylene group).

In the above formula (2), (3) or (4), as an alkyl group represented by $R^2$, there may be mentioned a $C_{1-6}$alkyl group such as methyl and ethyl groups (e.g., a $C_{1-4}$alkyl group), and others. The group $R^2$ is preferably a hydrogen atom, a $C_{1-2}$alkyl group, or a phosphorous-containing group represented by the above formula (2a), (3a) or (4a).

In the above formulae (2) to (4), "b" is preferably an integer of 1 to 4, more preferably an integer of 1 to 3, and particularly 1 or 2.

In the above formulae (2) to (4), "c" is preferably an integer of 0 to 4, more preferably an integer of 0 to 3 (e.g., 1 to 3), and particularly 1 or 2.

The organic phosphorus compound represented by the above formula (2) is preferably represented by the following formula (2b) or (2c):

(2b)

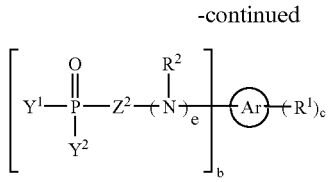

(2c)

wherein $R^1$, $R^2$, Ar, $Y^1$, $Y^2$, $Z^2$, "b", "c" and "e" have the same meanings as defined above.

In the formula (2b), "c" is preferably an integer of 1 to 3, more preferably 1 or 2, and particularly 2.

In the formula (2c), "b" is preferably an integer of 1 to 4, and more preferably an integer of 1 to 3. Moreover, when "c" is 0, "b" may be an integer of 1 to 4 (e.g., 1 or 2). In the formula (2c), "c" is preferably an integer of 0 to 3.

The organic phosphorus compound represented by the above formula (2b) includes a dialkylphosphine oxide [e.g., a $diC_{1-10}alkyl$-$C_{6-20}$arenepolyol such as dimethylphosphonyl-1,4-hydroquinone; diethylphosphonyl-1,4-hydroquinone; dipropylphosphonyl-1,4-hydroquinone; dibutylphosphonyl-1,4-hydroquinone; dioctylphosphonyl-1,4-hydroquinone; methylethylphosphonyl-1,4-hydroquinone; ethylbutylphosphonyl-1,4-hydroquinone; and a dialkylphosphonyl-naphthalenediol (e.g., dialkylphosphonyl-1,4-naphthalenediol) and a dialkylphosphonyl-dihydroxybiphenyl (e.g., a dialkylphosphonyl-4,4'-dihydroxybiphenyl), each corresponding to the above dialkylphosphonyl-hydroquinones], a dicycloalkylphosphine oxide [e.g., a $diC_{5-10}cycloalkylC_{6-20}$arenepolyol such as dicyclopentylphosphonyl-1,4-hydroquinone; dicyclohexylphosphonyl-1,4-hydroquinone; and a dicycloalkylphosphonyl-naphthalenediol (e.g., a dicycloalkylphosphonyl-1,4-naphthalenediol) and a dicycloalkylphosphonyl-dihydroxybiphenyl (e.g., a dicycloalkylphosphonyl-4,4'-dihydroxybiphenyl), each corresponding to the above dicycloalkylphosphonyl-hydroquinones], an arylphosphine oxide [for example, a mono- or $diC_{6-20}$arylphosphonyl-$C_{6-20}$ arenepolyol such as a diarylphosphonyl-hydroquinone (e.g., diphenylphosphonyl-1,4-hydroquinone, ditolylphosphonyl-1,4-hydroquinone, dixylylphosphonyl-1,4-hydroquinone, di(trimethylphenyl)phosphonyl-1,4-hydroquinone, and dinaphthylphosphonyl-1,4-hydroquinone); an alkylarylphosphonyl-hydroquinone (e.g., methylphenylphosphonyl-1,4-hydroquinone, ethylphenylphosphonyl-1,4-hydroquinone, and butylphenylphosphonyl-1,4-hydroquinone); an arylaryloxyphosphonyl-hydroquinone (e.g., phenylphenoxyphosphonyl-1,4-hydroquinone, phenyltolyloxyphosphonyl-1,4-hydroquinone, and phenylxylyloxyphosphonyl-1,4-hydroquinone); an arylphosphonyl-naphthalenediol (e.g., an arylphosphonyl-1,4-naphthalenediol) and an arylphosphonyl-dihydroxybiphenyl (e.g., arylphosphonyl-4,4'-dihydroxybiphenyl), each corresponding to the above arylphosphonyl-hydroquinones)], an aralkylphosphine oxide [e.g., a mono- or $di(C_{6-20}aryl$-$C_{1-6}alkyl)phosphonyl$-$C_{6-20}$arenepolyol such as an aralkylphosphonyl-hydroquinone (e.g., benzylphenylphosphonyl-1,4-hydroquinone, and dibenzylphosphonyl-1,4-hydroquinone); and an aralkylphosphonyl-naphthalenediol (e.g., an aralkylphosphonyl-1,4-naphthalenediol) and an aralkylphosphonyl-dihydroxybiphenyl (e.g., aralkylphosphonyl-4,4'-dihydroxybiphenyl), each corresponding to the above aralkylphosphonyl-hydroquinones], and others.

Among the organic phosphorus compounds represented by the formula (2b), a diarylphosphonyl-polyhydroxyarene (e.g., diphenylphosphonyl-1,4-hydroquinone, and diphenylphosphonyl-1,4-naphthalenediol), a dialkylphosphonyl-polyhydroxyarene (e.g., diethylphosphonyl-1,4-hydroquinone, and diethylphosphonyl-1,4-naphthalenediol) are particularly preferred.

In the compound represented by the above formula (2c), examples of the organic phosphorus compound in which "e" is 0 include, to take a compound whose Ar is benzene as an example, a mono- or bis[$(diC_{1-10}alkylphosphonyl)C_{1-4}alkyl$] benzene such as 1,3- or 1,4-bis[(diethylphosphonyl)methyl] benzene; a mono- or bis[$(diC_{6-20}arylphosphonyl)C_{1-4}alkyl$] benzene such as 1,3- or 1,4-bis[(diphenylphosphonyl) methyl]benzene; and others. Among these compounds, a benzyl derivative or a xylylene derivative in which $Z^2$ is methylene is preferred.

In the formula (2c), among compounds whose "e" is 0, an aromatic heterocycle compound in which Ar has a nitrogen atom as ring-constituting atom includes an aromatic heterocycle corresponding to the compound whose Ar is benzene ring, for example, a $(diC_{1-10}alkylphosphonyl)C_{1-4}alkylaromatic$ heterocycle; a $(diC_{6-20}arylphosphonyl)C_{1-4}alkylaromatic$ heterocycle; and others.

In the formula (2c), among compounds whose "e" is 1, a compound in which Ar is benzene includes an N-mono- or N,N-bis[$(diC_{1-10}alkylphosphonyl)C_{1-4}alkyl$]aminobenzene, an N-mono- or N,N-bis[$(diC_{6-20}arylphosphonyl)C_{1-4}alkyl$] aminobenzene, and others.

In the formula (2c), among compounds whose "e" is 1, an aromatic heterocycle compound in which Ar has a nitrogen atom as ring-constituting atom includes, to take a compound whose Ar is triazine as an example, an N-mono- or N,N-bis [$(diC_{1-10}alkylphosphonyl)C_{1-4}alkyl$]aminotriazine, an N-mono- or N,N-bis [$(diC_{6-20}arylphosphonyl)C_{1-4}alkyl$] aminotriazine, and others.

The organic phosphorus compound represented by the above formula (3) is preferably represented by the following formula (3b) or (3c):

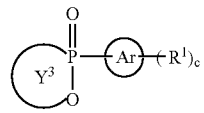

(3b)

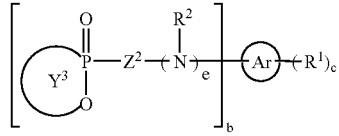

(3c)

wherein $R^1$, $R^2$, Ar, $Y^3$, $Z^2$, "b", "c" and "e" have the same meanings as defined above.

In the formula (3b), "c" is preferably 1 to 3, more preferably 1 or 2, and particularly 2.

In the formula (3c), "b" is preferably an integer of 1 to 4, and more preferably an integer of 1 to 3. Moreover, when "c" is 0, "b" may be an integer of 1 to 4 (e.g., 1 or 2). In the formula (3c), "c" is preferably 0 to 3, more preferably 0 to 2, and particularly 0 or 1.

In the formulae (3) and (3a) to (3c), a ring containing P and $X^2$ as ring-constituting atoms, which is represented by $Y^3$, corresponds to a heterocycle formed by $Y^1$, $Y^2$ and phosphorus atom in the above formula (1), and is a 5 to 10-membered heterocycle containing P and $X^2$ as hetero atoms, preferably a 5 to 8-membered heterocycle, and particularly a 5 or 6-membered heterocycle. The ring is preferably a non-aromatic ring.

The non-aromatic heterocycle $Y^3$ may have 1 or 2 carbon-carbon unsaturated bond(s). The ring $Y^3$ may have a substituent as exemplified above.

Moreover, about 1 to 3 (particularly about 1 or 2) of an aromatic ring as a substituent [an aromatic ring (a $C_{6-10}$ aromatic ring such as benzene and naphthalene rings, particularly benzene ring) corresponding to an aryl group exemplified in the paragraph of $R^1$ mentioned above] may be condensed to the ring $Y^3$ (ortho-condensed and ortho and peri-condensed, particularly ortho-condensed).

The aromatic ring condensed to the heterocycle $Y^3$ may have about 1 to 4 substituent(s), preferably about 1 to 3 (e.g., about 1 or 2) substituent(s) [for example, an organic group such as a hydroxyl group; an alkyl group, a cycloalkyl group, an aryl group, an aralkyl group, and an alkoxy group, exemplified in the paragraph of the $R^1$; an acyl group (e.g., a $C_{1-4}$ alkyl-carbonyl group such as acetyl group); a cyano group].

As a phosphorus-containing group which is formed from $X^1$ and the aromatic ring-condensed ring $Y^3$ in which such an aromatic ring is condensed, for example, 10H-9-oxa-10-phosphaphenanthrene oxide group, in which $X^1$ is an oxygen atom, represented by the following formula is preferred.

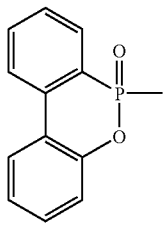

In this formula, each aromatic ring may have about 1 to 4 organic substituent(s) (particularly, the organic group mentioned above, e.g., an alkyl group, a cycloalkyl group, an aryl group, an aralkyl group, an acyl group, and a cyano group).

The organic phosphorus compound represented by the formula (3b) includes, to take a compound having hydroxyl group as $R^1$ as an example, a 10-(mono- or polyhydroxy $C_{6-20}$ aryl)-10H-9-oxa-10-phosphaphenanthrene-10-oxide [e.g., 10-(2,5-dihydroxyphenyl)-10H-9-oxa-10-phosphaphenanthrene-10-oxide, 10-(3,4-dihydroxyphenyl)-10H-9-oxa-10-phosphaphenanthrene-10-oxide, 10-(2,4,5-trihydroxyphenyl)-10H-9-oxa-10-phosphaphenanthrene-10-oxide, 10-(2,7-dihydroxynaphthyl)-10H-9-oxa-10-phosphaphenanthrene-10-oxide, 10-[2-hydroxy-5-(4'-hydroxyphenyl)phenyl]-10H-9-oxa-10-phosphaphenanthrene-10-oxide, 2,5-bis(9,10-dihydro-9-oxa-10-oxide-10-phosphaphenanthren-10-yl)-1,4-hydroquinone, and 2-hydroxy-5-methyl-1,3-bis[(9,10-dihydro-9-oxa-10-oxide-10-phosphaphenanthren-10-yl)methyl]benzene], a 10-(mono- or polyhydroxy-$C_{1-6}$alkyl-$C_{6-20}$aryl)-10H-9-oxa-10-phosphaphenanthrene-10-oxide [e.g., 10-(2,5-dihydroxy-4-methylphenyl)-10H-9-oxa-10-phosphaphenanthrene-10-oxide, and 10-(2,5-dihydroxy-4-t-butylphenyl)-10H-9-oxa-10-phosphaphenanthrene-10-oxide], a 10-(mono- or polyhydroxy-$C_{6-20}$aryl$C_{1-4}$alkyl)-10H-9-oxa-10-phosphaphenanthrene-10-oxide [e.g., 10-(3,5-di-t-butyl-4-hydroxybenzyl)-9,10-dihydro-9-oxa 10-phosphaphenanthrene-10-oxide, and 10-(2,6-dimethyl-4-t-butyl-3-hydroxybenzyl)-9,10-dihydro-9-oxa-10-phosphaphenanthrene-10-oxide], and others.

Among the organic phosphorus compounds represented by the above formula (3b), particularly preferred compounds include a 10-(polyhydroxyaryl)-10H-9-oxa-10-phosphaphenanthrene-10-oxide such as 10-(2,5-dihydroxyphenyl)-10H-9-oxa-10-phosphaphenanthrene-10-oxide, 10-(2,7-dihydroxynaphthyl)-10H-9-oxa-10-phosphaphenanthrene-10-oxide, 10-[2-hydroxy-5-(4'-hydroxyphenyl)phenyl]-10H-9-oxa-10-phosphaphenanthrene-10-oxide, 2,5-bis(9,10-dihydro-9-oxa-10-oxide-10-phosphaphenanthren-10-yl)-1,4-hydroquinone, and 2-hydroxy-5-methyl-1,3-bis[(9,10-dihydro-9-oxa-10-oxide-10-phosphaphenanthren-10-yl)methyl]benzene.

In the compound represented by the above formula (3c), examples of the organic phosphorus compound in which "e" is 0 include, to take a compound whose Ar is benzene as an example, a mono- or bis[(9,10-dihydro-9-oxa-10-oxide-10-phosphaphenanthren-10-yl)$C_{1-4}$alkyl]benzene such as [(9,10-dihydro-9-oxa-10-oxide-10-phosphaphenanthren-10-yl)methyl]benzene, [(9,10-dihydro-9-oxa-10-oxide-10-phosphaphenanthren-10-yl)methyl]aniline, and 1,3- or 1,4-bis[(9,10-dihydro-9-oxa-10-oxide-10-phosphaphenanthren-10-yl)methyl]benzene. Among these compounds, a benzyl derivative or a xylylene derivative in which $Z^2$ is methylene is preferred.

In the above formula (3c), among compounds whose "e" is 0, an aromatic heterocycle compound in which Ar has a nitrogen atom as ring-constituting atom includes an aromatic heterocycle corresponding to the compound whose Ar is benzene ring, for example, a [(9,10-dihydro-9-oxa-10-oxide-10-phosphaphenanthren-10-yl)$C_{1-4}$alkyl]aromatic heterocycle such as 2-[(9,10-dihydro-9-oxa-10-oxide-10-phosphaphenanthren-10-yl)methyl]pyridine.

In the formula (3c), among compounds whose "e" is 1, a compound in which Ar is benzene includes an N-mono- or N,N-bis[(9,10-dihydro-9-oxa-10-oxide-10-phosphaphenanthren-10-yl)$C_{1-4}$alkyl]aminobenzene such as N-mono- or N,N-bis[(9,10-dihydro-9-oxa-10-oxide-10-phosphaphenanthren-10-yl)methyl]aniline, 1,3- or 1,4-[N-mono- or N,N-bis[mono- or bis[(9,10-dihydro-9-oxa-10-oxide-10-phosphaphenanthren-10-yl)methyl]amino]benzene, and 1-mono- or 1,3-diamino-3,5-bis or 5-mono[N-mono- or N,N-bis[(9,10-dihydro-9-oxa-10-oxide-10-phosphaphenanthren-10-yl)methyl]amino]benzene.

In the formula (3c), among compounds whose "e" is 1, an aromatic heterocycle compound in which Ar has a nitrogen atom as ring-constituting atom includes, to take a compound whose Ar is triazine as an example, an N-mono- or N,N-bis[(9,10-dihydro-9-oxa-10-oxide-10-phosphaphenanthren-10-yl)$C_{1-4}$alkyl]aminotriazine such as 2-mono, 2,4-bis or 2,4,6-tris[N-mono- or N,N-bis[(9,10-dihydro-9-oxa-10-oxide-10-phosphaphenanthren-10-yl)methyl]amino]-1,3,5-triazine, 2-mono- or 2,4-bis[N-mono- or N,N-bis[(9,10-dihydro-9-oxa-10-oxide-10-phosphaphenanthren-10-yl)methyl]amino]-6-phenyl-1,3,5-triazine, and 2-mono- or 2,4-bis[N-mono- or N,N-bis[(9,10-dihydro-9-oxa-10-oxide-10-phosphaphenanthren-10-yl)methyl]amino]-6-methyl-1,3,5-triazine.

Among the organic phosphorus compounds represented by the above formula (3c), a mono- or bis[(9,10-dihydro-9-oxa-10-oxide-10-phosphaphenanthren-10-yl)$C_{1-4}$alkyl]benzene, an N-mono- or N,N-bis[(9,10-dihydro-9-oxa-10-oxide-10-phosphaphenanthren-10-yl)$C_{1-4}$alkyl]aminotriazine, and others are particularly preferred.

The organic phosphorus compound represented by the above formula (4) is preferably represented by the following formula (4b) or (4c):

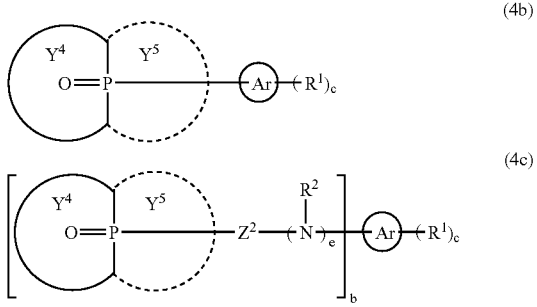

wherein $R^1$, $R^2$, Ar, $Y^4$, $Y^5$, $Z^2$, "b", "c" and "e" have the same meanings as defined above.

In the formula (4b), "c" is preferably an integer of 1 to 3, more preferably 1 or 2, and particularly 2.

In the above formula (4c), "b" is preferably an integer of 1 to 4, and more preferably an integer of 1 to 3. Moreover, when "c" is 0, "b" may be an integer of 1 to 4 (e.g., 1 or 2). In the formula (4c), "c" is preferably an integer of 0 to 3.

In the above formulae (4), (4a), (4b), and (4c), a ring represented by $Y^4$ (or $Y^5$), which contains a phosphorus atom as a ring-constituting atom, includes a 4 to 10-membered heterocycle, preferably a 4 to 8-membered heterocycle, and more preferably 5 to 7-membered heterocycle, containing the phosphorus atom as a hetero atom, and is preferably an nonaromatic ring. In particular, it is preferred to form a bicyclo ring with the rings $Y^4$ and $Y^5$, and the phosphorus atom. The hetero rings $Y^4$ and $Y^5$ may have a substituent as exemplified above.

Examples of the organic phosphorus compound represented by the above formula (4b) include an alkylenephosphonyl-hydroquinone [e.g., a $C_{2-8}$alkylenephosphonyl-hydroquinone such as propylenephosphonyl-1,4-hydroquinone, butylenephosphonyl-1,4-hydroquinone, pentamethylenephosphonyl-1,4-hydroquinone, and hexamethylenephosphonyl-1,4-hydroquinone], and an alkylenephosphonyl-naphthalenediol (e.g., an alkylenephosphonyl-1,4-naphthalenediol) and an alkylenephosphonyl-dihydroxybiphenyl (e.g., an alkylenephosphonyl-4,4'-dihydroxybiphenyl), each corresponding to these alkylenephosphonyl-hydroquinones (e.g., a $C_{2-8}$alkylenephosphonyl-polyhydroxy$C_{6-20}$arene); a cycloalkylenephosphonyl-hydroquinone [e.g., a $C_{5-8}$cycloalkylenephosphonyl-hydroquinone such as 1,4-cyclopentylenephosphonyl-1,4-hydroquinone, 1,4-cyclooctylenephosphonyl-1,4-hydroquinone, 1,5-cyclooctylenephosphonyl-1,4-hydroquinone, 1,4-, 1,5- or 5,8-dimethyl-1,4-cyclooctylenephosphonyl-1,4-hydroquinone, and 1,4-, 1,5- or 4,8-dimethyl-1,5-cyclooctylenephosphonyl-1,4-hydroquinone], and a cycloalkylenephosphonyl-naphthalenediol (e.g., a cycloalkylenephosphonyl-1,4-naphthalenediol) and a cycloalkylenephosphonyl-dihydroxybiphenyl (e.g., a cycloalkylenephosphonyl-4,4'-dihydroxybiphenyl such as 1,4-cyclooctylenephosphonyl-4,4'-dihydroxybiphenyl, and 1,5-cyclooctylenephosphonyl-4,4'-dihydroxybiphenyl), each corresponding to the cycloalkylenephosphonyl-hydroquinone (e.g., a $C_{5-8}$cycloalkylenephosphonyl-polyhydroxy$C_{6-20}$arene).

Among the organic phosphorus compounds represented by the above formula (4b), a cycloalkylenephosphonyl-polyhydroxyarene (e.g., 1,4- or 1,5-cyclooctylenephosphonyl-1,4-hydroquinone, and 1,4- or 1,5-cyclooctylenephosphonyl-1,4-naphthalenediol) is particularly preferred.

In the compound represented by the above formula (4c), examples of the organic phosphorus compound in which "e" is 0 include, to take a compound whose Ar is benzene as an example, a mono- or bis[($C_{2-10}$alkylenephosphonyl)$C_{1-4}$alkyl]benzene such as (propylenephosphonylmethyl)benzene, 1,3- or 1,4-bis[(propylenephosphonyl)methyl]benzene, 1,3- or 1,4-bis[(butylenephosphonyl)methyl]benzene, 1,3- or 1,4-bis[(pentamethylenephosphonyl)methyl]benzene, and 1,3- or 1,4-bis[(hexamethylenephosphonyl)methyl]benzene; a mono- or bis[($C_{5-10}$cycloalkylenephosphonyl)$C_{1-4}$alkyl]benzene such as 1,3- or 1,4-bis[(1',4'-cyclopentylenephosphonyl)methyl]benzene, [(1',4'-cyclooctylenephosphonyl)methyl]benzene, 1,3- or 1,4-bis[(1',4'-cyclooctylenephosphonyl)methyl]benzene, [(1',5'-cyclooctylenephosphonyl)methyl]benzene, 1,3- or 1,4-bis[(1',5'-cyclooctylenephosphonyl)methyl]benzene, mono- or bis[(1',4'-, 1',5'- or 5',8'-dimethyl-1',4'-cyclooctylenephosphonyl)methyl]benzene, and mono- or bis[(1',4'-, 1',5'- or 4',8'-dimethyl-1',5'-cyclooctylenephosphonyl)methyl]benzene; and others. Among these compounds, a benzyl derivative or a xylylene derivative in which $Z^2$ is methylene is preferred.

In the formula (4c), among compounds whose "e" is 0, an aromatic heterocycle compound in which Ar has a nitrogen atom as a ring-constituting atom includes an aromatic heterocycle corresponding to the compound whose Ar is benzene ring, for example, a ($C_{2-10}$alkylenephosphonyl)$C_{1-4}$alkylaromatic heterocycle; a ($C_{5-8}$cycloalkylenephosphonyl)$C_{1-4}$alkylaromatic heterocycle, and others.

In the formula (4c), among compounds whose "e" is 1, a compound in which Ar is benzene includes an N-mono- or N,N-bis[($C_{2-10}$alkylenephosphonyl)$C_{1-4}$alkyl]aminobenzene, an N-mono- or N,N-bis[($C_{5-8}$cycloalkylenephosphonyl)$C_{1-4}$alkyl]aminobenzene, and others.

In the above formula (4c), among compounds whose "e" is 1, an aromatic heterocycle compound in which Ar has a nitrogen atom as a ring-constituting atom includes, to take a compound whose Ar is triazine as an example, an N-mono- or N,N-bis[($C_{2-10}$alkylenephosphonyl)$C_{1-4}$alkyl]aminotriazine, an N-mono- or N,N-bis[($C_{5-8}$cycloalkylenephosphonyl)$C_{1-4}$alkyl]aminotriazine [e.g., 2-mono, 2,4-bis or 2,4,6-tris[N-mono- or N,N-bis(1',4'- or 1',5'-cyclooctylenephosphonylmethyl)amino]-1,3,5-triazine, 2-mono- or 2,4-bis[N-mono- or N,N-bis(1',4'- or 1',5'-cyclooctylenephosphonylmethyl)amino]-6-phenyl-1,3,5-triazine, 2-mono, 2,4-bis or 2,4,6-tris[N-mono- or N,N-bis(1',4'-, 1',5'-, 4',8'- or 5',8'-dimethyl-1',4'- or 1',5'-cyclooctylenephosphonylmethyl)amino]-1,3,5-triazine, and 2-mono or 2,4-bis[N-mono- or N,N-bis(1',4'-, 1',5'-, 4',8'- or 5',8'-dimethyl-1',4'- or 1',5'-cyclooctylenephosphonylmethyl)amino]-6-phenyl-1,3,5-triazine], and others.

Among the organic phosphorus compound represented by the above formula (4c), a mono- or bis[(cycloalkylenephosphonyl)$C_{1-4}$alkyl]benzene, and an N-mono- or N,N-bis[(cycloalkylenephosphonyl)$C_{1-4}$alkyl]aminotriazine, in particular, a mono- or bis[(bicycloalkylenephosphonyl)$C_{1-4}$alkyl]benzene, an N-mono- or N,N-bis[(bicycloalkylenephosphonyl)$C_{1-4}$alkyl]aminotriazine, and others, are preferred.

These organic phosphorus compounds (B) may be used singly or in combination.

The organic phosphorus compound (B) may be obtained by a conventional manner, for example, by allowing a compound corresponding to Ar—$(R^1)_c$ or $X^3$—$(Z^1)_a$—Ar—$(R^1)_c$ in the above formula (1) to react with a precursor, for example, represented by the following formula in an inert solvent under heating.

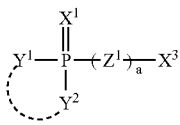

Wherein $X^3$ represents a hydrogen atom, a hydroxyl group, or a halogen atom (e.g., chlorine or bromine atom); and $X^1$, $Y^1, Y^2, Z^1$ and "a" have the same meanings as defined above).

For example, a compound having a hydroxyl group (or substituted hydroxyl group) as $R^1$ may be obtained by allowing to react a quinone [for example, benzoquinone (e.g., 1,4-benzoquinone, and 1,2-benzoquinone), a naphthoquinone (e.g., 1,4-naphthoquinone, 1,2-naphthoquinone, and 2,6-naphthoquinone), 4,4'-diphenoxyquinone, 2,2'-diphenoxyquinone, and 3,10-perylenequinone] corresponding to $Ar—(OH)_c$ in the above formula (1) (in the formula, Ar and "c" have the same meanings as defined above) with a precursor (e.g., a 9,10-dihydro-9-oxa-10-phosphaphenanthrene-10-oxide, a secondary phosphine oxide, a phosphinous ester) in an inert solvent under heating.

The inert solvent includes, for example, an aromatic hydrocarbon (e.g., benzene, toluene, xylene, ethylbenzene, cumene, pseudocumene, cymene, and methylnaphthalene), a halogenated hydrocarbon (e.g., chlorobenzene, and chloronaphthalene), an ether (e.g., an aromatic ether such as anisole; a cyclic ether such as dioxane, a cellosolve (e.g., methyl cellosolve, and ethyl cellosolve), and others.

The preparation of the organic phosphorus compound having a hydroxyl group or substituted hydroxyl group as $R^1$ may for example be referred to Japanese Patent Application Laid-Open No. 236787/1986 (JP-61-236787A), Japanese Patent Application Laid-Open No. 185992/1988 (JP-63-185992A), Japanese Patent Application Laid-Open No. 66195/1989 (JP-64-66195A), Japanese Patent Application Laid-Open No. 331179/1993 (JP-5-331179A), WO02/00667 publication, Japanese Patent Application Laid-Open No. 302685/2001 (JP-2001-302685A), and others. Moreover, such a compound may be available as brand name "HCA-HQ" (10-(2,5-dihydroxyphenyl)-10H-9-oxa-10-phosphaphenanthrene oxide: manufactured by Sanko Co., Ltd.), brand name "CPHO-HQ" (manufactured by Nippon Chemical Industrial Co., Ltd.), and others. Among the organic phosphorus compounds represented by the above formula (3c), a preparation of a compound in which "e" is 0 may for example be referred to Japanese Patent Application Laid-Open No. 106619/1999 (JP-11-106619A) and others, and a preparation of a compound in which "e" is 1 may for example be referred to Japanese Patent Application Laid-Open No. 78874/1976 (JP-51-78874A), Japanese Patent Application Laid-Open No. 3081/1979 (JP-54-3081A), Japanese Patent Application Laid-Open No. 16566/1979 (JP-54-16566A) and others.

The organic phosphorus compound (B) also includes a condensate (e.g., an oligomer or a polymer) of a compound in which $R^1$ is a hydroxyl group or a substituted hydroxyl group (e.g., an ester-formable derivative group such as an alkoxy group) and "c" is not less than 1 (particularly not less than 2), of compounds represented by at least the above formulae (1) to (4), (2b), (3b) and (4b). Examples of such a compound include a polyester-series (particularly, a polyarylate-series), a polycarbonate-series, a polyurethane-series and an epoxy-series oligomer or polymer.

Among such oligomers or polymers (hereinafter, these are sometimes referred to as simply a polymer), a phosphorus-containing polyester-series polymer is obtainable by a condensation reaction between a phosphorus-containing polyhydroxy compound in which "c" is not less than 2 in the above formulae (1) to (4), (2b), (3b) and (4b), and a dicarboxylic acid (particularly, a dicarboxylic acid component containing at least an aromatic dicarboxylic acid). Moreover, the phosphorus-containing polycarbonate-series polymer is obtainable by a reaction of the phosphorus-containing polyhydroxy compound with phosgene, and the phosphorus-containing polyurethane-series polymer is obtainable by a condensation reaction between the phosphorus-containing polyhydroxy compound and a polyisocyanate compound. The phosphorus-containing epoxy-series polymer is obtainable by a condensation reaction between the phosphorus-containing polyhydroxy compound and epichlorohydrin. The phosphorus-containing polyhydroxy compound may be used singly or in combination.

The dicarboxylic acid includes a dicarboxylic acid (an aliphatic dicarboxylic acid, an alicyclic dicarboxylic acid, an aromatic dicarboxylic acid) exemplified in the paragraph of the polyester-series resin. The dicarboxylic acid may be used singly or in combination. In particular, a phosphorus-containing polyarylate-series polymer obtainable from the phosphorus-containing polyhydroxy compound and a dicarboxylic acid component containing at least an aromatic dicarboxylic acid is preferred. The aromatic dicarboxylic acid includes, for example, a $C_{8-16}$ aromatic dicarboxylic acid such as phthalic acid, isophthalic acid, terephthalic acid, naphthalenedicarboxylic acid (e.g., 1,4-naphthalenedicarboxylic acid, and 2,6-naphthalenedicarboxylic acid), 4,4'-diphenyldicarboxylic acid, diphenyl ether-4,4'-dicarboxylic acid, 4,4'-diphenylmethanedicarboxylic acid, and 4,4'-diphenyl ketone dicarboxylic acid. Among them, a $C_{8-12}$ aromatic dicarboxylic acid such as phthalic acid, isophthalic acid, terephthalic acid, and naphthalenedicarboxylic acid (in particular, isophthalic acid, and terephthalic acid) are preferred. If necessary, the dicarboxylic acid component may be used in combination with an aliphatic dicarboxylic acid and an alicyclic dicarboxylic acid as exemplified in the paragraph of the polyester-series resin, or a polycarboxylic acid such as trimellitic acid and pyromellitic acid.

For the phosphorus-containing polyarylate-series polymer, other copolymerizable component [for example, other polyhydroxy compound (e.g., a diol) or an hydroxycarboxylic acid] may be further used as far as effects of the phosphorus-containing polyarylate-series polymer are not deteriorated. As other polyhydroxy compound, for example, there may be mentioned an alkylene glycol (a $C_{2-6}$ alkylene glycol such as ethylene glycol, trimethylene glycol, propylene glycol, and 1,4-butanediol), a polyoxyalkylene glycol having a repeating oxyalkylene unit of about 2 to 4 [a glycol containing a poly(oxy$C_{2-4}$alkylene) unit, such as diethylene glycol and a polytetramethylene glycol], an alicyclic diol such as 1,4-cyclohexane dimethanol, an aromatic diol [e.g., a $C_{6-10}$ aromatic diol such as hydroquinone, resorcinol, 1,4-naphthalenediol, and 2,6-naphthalenediol; biphenol; a bisphenol such as 2,2-bis(4-hydroxyphenyl)propane (bisphenol A), bisphenol F, 2,2-bis(4-(2-hydroxyethoxy)phenyl)propane, xylylene glycol, and bis(4-carboxyphenyl)ether], and others. The hydroxycarboxylic acid includes, for example, an hydroxycarboxylic acid such as hydroxybenzoic acid, hydroxynaphthoic acid, hydroxyphenylacetic acid, glycolic acid and hydroxycaproic acid, or a derivative thereof. These copolymerizable components may be used singly or in combination.

The preferred organic phosphorus polymer compound includes a phosphorus-containing polyarylate-series polymer, in particular a phosphorus-containing polyarylate-series polymer which is obtained by a polymerization of at least one polyhydroxy (particularly, dihydroxy) monomer component selected from the preferred organic phosphorus compounds (2b), (3b) and (4b) [particularly, a 10-(polyhydroxyaryl)-10H-9-oxa-10-phosphaphenanthrene-10-oxide, a diarylphosphonyl-polyhydroxyarene, and a cycloalkylenephosphonyl-polyhydroxyarene], and at least one aromatic dicarboxylic acid component selected from terephthalic acid, isophthalic acid and phthalic acid (particularly, terephthalic acid and isophthalic acid).

The number average molecular weight of the phosphorus-containing polyarylate-series polymer is not particularly limited to a specific one, and is, for example, about 100 to $5 \times 10^4$, preferably about 500 to $1 \times 10^4$, and more preferably about $1 \times 10^3$ to $1 \times 10^4$.

Such a phosphorus-containing polyarylate-series polymer may be produced in accordance with a conventional aromatic polyester-producing manner, for example, a melt polymerization method, a solid-phase polymerization method, an interfacial polycondensation method, or a solution polymerization method. In particular, it is preferred to use an acetate method in which a polyacetate compound (diacetate compound) of a phosphorus-containing aromatic polyhydroxy compound (e.g., a phosphorus-containing aromatic dihydroxy compound), and an aromatic dicarboxylic acid are subjected to a melt polymerization in the presence of a polymerization catalyst. The preparation of the phosphorus-containing polymer (organic phosphorus polymer compound) may for example be referred to Japanese Patent Application Laid-Open No. 78832/1986 (JP-61-78832A), Japanese Patent Application Laid-Open No. 261320/1986 (JP-61-261320A), Japanese Patent Application Laid-Open No. 5143/1989 (JP-64-5143A), and others.

[Flame-retardant Auxiliary (C)]

In the present invention, the flame-retardant auxiliary (or flame-retardant synergist) (C) includes (C1) a phosphorus-containing compound [e.g., (c-1) an inorganic phosphorus compound, (c-2) an orthophosphoric ester or a condensate thereof, (c-3) a phosphoric acid ester amide, (c-4) a phosphonitrilic compound, (c-5) a phosphorous ester having a phosphonyl group or a phosphinico group, or a metal salt thereof, and (c-6) an organic hypophosphorous acid compound having a phosphonyl group or a phosphinico group, or a metal salt thereof], (C2) an aromatic resin, (C3) a nitrogen-containing compound (e.g., a nitrogen-containing cyclic compound having no phosphorus atom, or a salt thereof), (C4) an inorganic metal compound, (C5) a silicon-containing compound, (C6) a sulfur-containing compound, and others. These flame-retardant auxiliaries may be used singly or in combination.

(C1) Phosphorous-containing Compound

Examples of the phosphorous-containing compound (C1) includes a phosphorus compound other than the organic phosphorus compound (B), for example, (c-1) an inorganic phosphorus compound, a monomeric organic phosphorus compound [e.g., (c-2) an orthophosphoric ester or a condensate thereof, (c-3) a phosphoric ester amide, (c-4) a phosphonitrilic compound, (c-5) a phosphorous ester having a phosphonyl group ($>P(=O)H$) or a phosphinico group ($>P(=O)OH$), or a metal salt thereof, (c-6) an organic hypophosphorous acid compound having a phosphonyl group or a phosphinico group, or a metal salt thereof, and (c-7) a phosphine oxide (e.g., triphenylphosphine oxide, and tricresyl phosphine oxide)], a polymeric organic phosphorus compound which is a condensate of the monomeric organic phosphorus compound. These phosphorous-containing compounds may be used singly or in combination.

(c-1) Inorganic Phosphorus Compound

The inorganic phosphorus compound includes, for example, a red phosphorus, a (poly)phosphate [for example, an ammonium salt or metal salt (e.g., Ca, Mg, Zn, Ba, and Al salt) of a non-condensed phosphoric acid or condensed phosphoric acid, e.g., orthophosphoric acid, phosphorous acid, hypophosphorous acid, a polyphosphoric acid (e.g., metaphosphoric acid, pyrophosphoric acid, triphosphoric acid, and tetraphosphoric acid), and a polyphosphorous acid (e.g., metaphosphorous acid, and pyrophosphorous acid)], a boron phosphate, and others.

The red phosphorus has high flame-retarding effect, and can impart flame retardancy to a resin at a small amount of addition. Moreover, since the red phosphorus exerts such an effect at a small amount of addition, the red phosphorus imparts flame retardancy to a resin without deteriorating resin properties (e.g., mechanical and electrical properties). As the red phosphorus, usually, a red phosphorus which has undergone stabilization treatment, that is, a stabilized red phosphorus, is preferably employed. Particularly preferred are a red phosphorus which is obtained by being finely dividing without pulverization and formation of the pulverized surface highly reactive to water or oxygen, and a red phosphorus whose surface is coated with one member or a combination of two or more members selected from resins (e.g., thermosetting resins, thermoplastic resins), metals, metal compounds (e.g., metal hydroxides, metal oxides).

Exemplified as the thermosetting resin for coating the surface of the red phosphorus are a phenolic resin, amelamine-series resin, a urea-based resin, an alkyd resin, an unsaturated polyester-series resin, an epoxy resin, and a silicone-series resin, and examples of the thermoplastic resin are a polyester-series resin, a polyamide-series resin, an acrylic resin, an olefinic resin, and others. Examples of the metal hydroxide are aluminum hydroxide, magnesium hydroxide, calcium hydroxide, zinc hydroxide, and titanium hydroxide. Examples of the metal oxide are aluminum oxide, magnesium oxide, zinc oxide, titanium oxide, zirconium oxide, copper oxide, iron oxide, molybdenum oxide, tungsten oxide, manganese oxide, and tin oxide.

Further, a process for coating, with a metal, the surface of the red phosphorus for stabilization includes, for example, a coating process with a metal (e.g., iron, nickel, copper, aluminum, zinc, manganese, tin, titanium, and zirconium) or an alloy thereof through electroless plating. Other processes for coating the surface of red phosphorus include a process in which red phosphorus is treated with a solution of a metal salt (e.g., a salt with aluminum, magnesium, zinc, titanium, copper, silver, iron, nickel) to form a metal phosphorus compound on the red phosphorus surface for stabilization of the red phosphorus.

In particular, with the use of a process comprising pulverizing the red phosphorus without forming a crushed surface thereon, the red phosphorus may be subjected to coating treatment with a plurality of layers being a combination of a layer(s) of a metal component(s) (e.g., metal hydroxide, metal oxide) and a resin layer(s), particularly with a metal component layer covered by a plurality of resin layers. Such stabilized red phosphorus is excellent in heat stability and hydrolysis resistance and the amount of a phosphine produced upon decomposition in the presence of moisture or under high temperatures is so extremely small that they are preferable from the viewpoint of safety in the course of producing the resin composition of the present invention and a shaped article molded therefrom.

As the red phosphorus, a stabilized one in the form of particles may be usually employed. The mean particle size of the stabilized red phosphorus is, for example, about 0.01 to 100 µm, preferably about 0.1 to 70 µm, and more preferably about 0.1 to 50 µm.

(c-2) Orthophosphoric Ester

As the orthophosphoric ester, there may be mentioned an aliphatic orthophosphoric ester [for example, a tri$C_{1-10}$alkyl orthophosphate such as trimethyl phosphate, triethyl phosphate, tripropyl phosphate, triisopropyl phosphate, tributyl phosphate, triisobutyl phosphate, and pentaerythritol phosphate [e.g., NH-1197 (manufactured by Great Lakes Chemical Corporation), a bicyclophosphoric ester described in Japanese Patent Application Laid-Open No. 106889/2001 (JP-2001-106889A)]; a di$C_{1-10}$alkyl orthophosphate and mono$C_{1-10}$alkyl orthophosphate corresponding to the above-mentioned orthophosphoric triester], an aromatic orthophosphoric ester [for example, a tri$C_{6-20}$aryl orthophosphate such as triphenyl phosphate, tricresyl phosphate, trixylyl phosphate, diphenyl cresyl phosphate, tri(isopropylphenyl)phosphate and diphenyl ethylcresyl phosphate], an aliphatic-aromatic orthophosphoric ester [e.g., methyl diphenyl phosphate, phenyl diethyl phosphate, a spiro ring-containing aromatic orthophosphoric ester (e.g., diphenyl pentaerythritol diphosphate, dicresyl pentaerythritol diphosphate, dixylyl pentaerythritol diphosphate)], and others.

(c-3) Phosphoric Ester Amide

As the phosphoric ester amide, there may be used a phosphoric ester amide including bond styles of a phosphoric ester and a phosphoric acid amide, and a phosphoric ester amide described in Japanese Patent Application Laid-Open No. 354684/2001 (JP-2001-354684A), Japanese Patent Application Laid-Open No. 139823/2001 (JP-2001-139823A), Japanese Patent Application Laid-Open No. 154277/2000 (JP-2000-154277A), Japanese Patent Application Laid-Open No. 175985/1998 (JP-10-175985A), Japanese Patent Application Laid-Open No. 59888/1996 (JP-8-59888A), and Japanese Patent Application Laid-Open No. 235363/1988 (JP-63-235363A).

The preferred phosphoric ester amide includes a condensed phosphoric ester amide. As such a phosphoric ester amide, for example, there may be mentioned an N-(diaryloxyphosphinyl)-substituted alkyleneamine [e.g., N,N'-bis(diphenoxyphosphinyl)piperazine, N,N'-bis(ditolyloxyphosphinyl)piperazine, N,N'-bis(dixylyloxyphosphinyl)piperazine, N,N'-bis(di- or trimethylphenyloxyphosphinyl)piperazine]; a bis- to tetrakis[(diaryloxyphosphinyl)amino]-substituted aromatic compound [e.g., 1,3- or 1,4-bis[(diphenoxyphosphinyl)amino]benzene, 1,3- or 1,4-bis[(ditolyloxyphosphinyl)amino]benzene, 1,3- or 1,4-bis[(dixylyloxyphosphinyl)amino]benzene, 1,3- or 1,4-bis[(di- or trimethylphenyloxyphosphinyl)amino]benzene, 1,3- or 1,4-bis[(diphenoxyphosphinyl)aminomethyl]benzene, 1,3- or 1,4-bis[(ditolyloxyphosphinyl)aminomethyl]benzene, 1,3- or 1,4-bis[(dixylyloxyphosphinyl)aminomethyl]benzene, 1,3- or 1,4-bis[(di- or trimethylphenyloxyphosphinyl)aminomethyl]benzene]; an N-(cyclic alkylenedioxyphosphinyl)-substituted alkyleneamine [e.g., N,N'-bis(neopentylenedioxyphosphinyl)piperazine]; a bis to tetrakis[(cyclic alkylenedioxyphosphinyl)amino]-substituted aromatic compound {e.g., 1,3- or 1,4-bis[(neopentylenedioxyphosphinyl)amino]benzene, 1,3- or 1,4-bis[(neopentylenedioxyphosphinyl)aminomethyl]benzene}; an N-(cyclic arylenedioxyphosphinyl)-substituted alkyleneamine [e.g., N,N'-bis(phenylene-1,2-dioxyphosphinyl)piperazine, 1,3- or 1,4-bis[(biphenylene-2,2'-dioxyphosphinyl)aminomethyl]piperazine]; a bis to tetrakis[(cyclic arylenedioxyphosphinyl)amino]-substituted aromatic compound {e.g., 1,3- or 1,4-bis[(phenylene-1,2-dioxyphosphinyl)amino]benzene, 1,3- or 1,4-bis[(biphenylene-2,2'-dioxyphosphinyl)aminomethyl]benzene}, and a 3,9-bis(N-substituted amino)-2,4,8,10-tetraoxa-3,9-diphosphaspiro[5.5]-undecane-3,9-dioxide [e.g., a Spiro ring-containing phosphoric ester amide of which the N-substituted amino group is a dialkylamino group (e.g., diethylamino group), a cyclic amino group (e.g., piperidino group, pipecolino group, dimethylpiperidino group, morpholino group), an arylamino group (e.g., phenylamino group), or an alkylarylamino group (e.g., methylphenylamino group)], and others.

The phosphoric ester amide is commercially available as trade name "PHOSPHORIC ESTER AMIDE FLAME RETARDANT SP SERIES (e.g., SP-601, SP-670, SP-703, SP-720)" (manufactured by Shikoku Chemicals Corp.).

(c-4) Phosphonitrilic Compound

Examples of the phosphonitrilic compound (or phosphonitrile compound) include a cyclic or chain aryloxyphosphazene such as a (poly)phenoxyphosphazene, a (poly)tolyloxyphosphazene, a (poly)xylyloxyphosphazene, and a (poly)methylnaphthyloxyphosphazene; a cyclic or chain alkoxyaryloxyphosphazene such as a (poly)methoxyphenoxyphosphazene, a (poly)methoxytolyloxyphosphazene, and a (poly)methoxynaphthyloxyphosphazene; and a cyclic or chain alkoxyphosphazene such as a (poly)methoxyphosphazene. Moreover, the phosphonitrilic compound also includes a derivative of an aryloxyphosphazene or that of an alkoxyphosphazene (e.g., a cyclic and/or chain phenoxyphosphazene modified with hydroquinone, resorcinol, biphenol, or a bisphenol).

(c-5) Organic Phosphorous Acid Compound

The organic phosphorous acid (or phosphonic acid) compound includes a phosphorous ester (or phosphite) having a phosphonyl group (>P(=O)H) or a phosphinico group (>P(=O)OH), or a metal salt thereof. Moreover, the organic phosphorous acid compound also includes a phosphorous triester, a phosphonocarboxylic ester, or a metal salt thereof, and others. These organic phosphorous acid compounds may be used singly or in combination.

Examples of the phosphorous ester (phosphate) having a phosphonyl group include a phosphorous di- or monoester having a phosphonyl group [for example, an aromatic phosphorous diester (e.g., a di$C_{6-20}$aryl phosphite in which the aryl group is phenyl, cresyl, xylyl group, or the like); an aliphatic phosphorous diester (e.g., a di$C_{1-10}$alkyl phosphite in which the alkyl group is methyl, ethyl, propyl, butyl, t-butyl, hexyl group, or the like); an aromatic or aliphatic phosphorous monoester corresponding to the phosphorous diester (e.g., a mono$C_{1-10}$alkyl phosphite)], and others.

Other organic phosphorous ester having a phosphinico group includes an alkyl-substituted phosphorous monoester [e.g., a mono$C_{1-6}$alkyl eater of a $C_{1-6}$alkylphosphorous acid in which the alkyl group is methyl, ethyl, propyl, butyl, t-butyl group, or the like; a mono$C_{6-10}$aryl ester of a $C_{1-6}$alkylphosphorous acid in which the aryl group is phenyl, naphthyl group, or the like, corresponding to the monoalkyl ester of an alkylphosphorous acid], an aryl-substituted phosphorous monoester [e.g., a mono$C_{1-6}$alkyl or $C_{6-10}$aryl ester of a $C_{6-10}$arylphosphorous acid in which the aryl group is phenyl, naphthyl group, or the like, corresponding to the monoalkyl or aryl ester of an alkylphosphorous acid (e.g., 10-hydroxy-9,10-dihydro-9-oxa-10-phenanthrene-10-oxide)], and others.

The organic phosphorous ester also includes, for example, a diester of an alkylphosphorous acid such as a di$C_{1-6}$alkyl ester of a $C_{1-6}$alkylphosphorous acid (e.g., an ester of a spiro ring-containing alkylphosphorous acid such as pentaerythritol bis(methylphosphonate), pentaerythritol bis(ethylphosphonate), pentaerythritol bis(propylphosphonate), and pentaerythritol bis(butylphosphonate)), a $diC_{6-10}$aryl ester of a $C_{1-6}$alkylphosphorous acid, and a $C_{1-6}$alkyl$C_{6-10}$aryl ester of a $C_{1-6}$alkylphosphorous acid, of which the alkyl group is the above-exemplified alkyl group and the aryl group is phenyl, cresyl, xylyl, or others; and others.

As the phosphorous triester, there may be mentioned an aromatic phosphorous triester (e.g., a $triC_{6-20}$aryl phosphite in which the aryl group is phenyl, cresyl, xylyl group, or the like), an aliphatic phosphorous triester (e.g., a $triC_{1-10}$alkyl phosphite in which the alkyl group is methyl, ethyl, propyl, butyl, t-butyl, hexyl group, or the like), and others.

Examples of the phosphonocarboxylic ester (phosphonocarboxylate) include a phosphonocarboxylic triester such as a $diC_{1-6}$alkyl $C_{1-4}$alkoxycarbonyloxy$C_{1-4}$alkylphosphonate (e.g., dimethyl methoxycarbonylmethylphosphonate) or a $diC_{6-10}$aryl($C_{1-4}$alkoxycarbonyloxy$C_{1-4}$alkyl)phosphonate.

Moreover, the metal salt of the organic phosphorous acid compound includes a metal salt (for example, a Ca, Mg, Zn, Ba, or Al salt) of the phosphorous monoester or phosphonocarboxylic acid (e.g., a monoalkyl alkylphosphite, a monoaryl alkylphosphite, a monoalkyl arylphosphite, and a monoaryl arylphosphite). Moreover, the metal salt of the organic phosphorous acid compound also includes a metal salt (for example, a Ca, Mg, Zn, Ba, or Al salt) of an alkylphosphorous acid or arylphosphorous acid. For example, the details about representative compounds of such a metal salt of an organic phosphorous acid may be referred to Japanese Patent Application Laid-Open No. 139394/1984 (JP-59-139394A), Japanese Patent Application Laid-Open No. 22866/1988 (JP-63-22866A), Japanese Patent Application Laid-Open No. 226891/1989 (JP-1-226891A), Japanese Patent Application Laid-Open No. 234893/1992 (JP-4-234893A), Japanese Patent Application Laid-Open No. 245659/1996 (JP-8-245659A), Japanese Patent Application Laid-Open No. 272759/1997 (JP-9-272759A), Japanese Patent Application Laid-Open No. 139586/2001 (JP-2001-139586A).

(c-6) Organic Hypophosphorous Acid Compound

The organic hypophosphorous acid compound having a phosphonyl group includes a hypophosphorous ester which may be mono-substituted with an alkyl group such as a $C_{1-4}$alkyl group or an aryl group such as a $C_{6-10}$aryl group (e.g., a $C_{1-6}$alkyl hypophosphite such as methyl hypophosphite, a $C_{6-10}$aryl hypophosphite such as phenyl hypophosphite [a cyclic hypophosphorous ester such as 10-$C_{1-30}$alkyl-substituted-9,10-dihydro-9-oxa-10-phosphaphenanthrene-10-oxide]), and others.

The organic hypophosphorous acid compound having a phosphinico group includes an organic hypophosphorous acid which is mono- or di-substituted with the alkyl group(s) or the aryl group(s) (e.g., a mono- or $diC_{1-6}$alkylhypophosphorous acid such as methylhypophosphorous acid, dimethylhypophosphorous acid, diethylhypophosphorous acid, and methylethylhypophosphorous acid; a mono- or $diC_{6-10}$arylhypophosphorous acid such as phenylhypophosphorous acid and diphenylhypophosphorous acid), a phosphinicocarboxylic ester [e.g., a $C_{1-6}$alkyl or $C_{6-10}$aryl ester of a phosphinicocarboxylic acid, such as 3-methylphosphinicopropionic ester and 3-phenylphosphinicopropionic ester], and others.

The metal salt of the organic hypophosphorous acid includes a metal salt (for example, a Ca, Mg, Zn, Ba, or Al salt) of an organic hypophosphorous acid which has a substituent such as the alkyl group or aryl group mentioned above. Typical compounds of these metal salts of the organic hypophosphorous acid may for example be referred to Japanese Patent Application Laid-Open No. 5979/1980 (JP-55-5979A), Japanese Patent Application Laid-Open No. 60924/1999 (JP-11-60924A), Japanese Patent Application Laid-Open No. 140228/1999 (JP-11-140288A), Japanese Patent Application Laid-Open No. 236392/1999 (JP-11-236392A), Japanese Patent Application Laid-Open No. 2686/2001 (JP-2001-2686A), Japanese Patent Application Laid-Open No. 513784/2001 (JP-2001-513784A), Japanese Patent Application Laid-Open No. 513784/2001 (JP-2001-513784A), Japanese Patent Application Laid-Open No. 513786/2001 (JP-2001-513786A), U.S. Pat. No. 5,973,194 specification, U.S. Pat. No. 6,011,172 specification, U.S. Pat. No. 6,248,921 specification, and others.

(Polymeric Organic Phosphorus Compound)

As the polymeric organic phosphorus compound, there may be used a condensate (or condensation product) of a monomeric organic phosphorus compound, for example, a polymeric phosphoric ester (that is, a condensed phosphoric ester, e.g., a condensate of the orthophosphoric mono-alkyl or aryl ester).

The condensate of the orthophosphoric mono-alkyl or aryl ester includes a condensate of the orthophosphoric monoester (particularly phenyl phosphate, cresyl phosphate, xylyl phosphate, and others) and a diol, for example, a resorcinol phosphate (e.g., a condensate of resorcinol and phenyl phosphate, a condensate of resorcinol and cresyl phosphate, a condensate of resorcinol and xylenyl phosphate), a hydroquinone phosphate (e.g., a condensate of hydroquinone and phenyl phosphate, a condensate of hydroquinone and cresyl phosphate, a condensate of hydroquinone and xylenyl phosphate), a biphenol phosphate (e.g., a condensate of biphenol and phenyl phosphate, a condensate of biphenol and cresyl phosphate, a condensate of biphenol and xylenyl phosphate), a bisphenol phosphate (e.g., a condensate of bisphenol A and phenyl phosphate, a condensate of bisphenol A and cresyl phosphate, a condensate of bisphenol A and xylenyl phosphate), and others. Typical process for producing such a polymeric phosphoric ester may be referred to U.S. Pat. No. 261,687 specification, U.S. Pat. No. 2,636,876 specification, U.S. Pat. No. 4,482,693 specification, Japanese Patent Application Laid-Open No. 91147/1973 (JP-48-91147A), Japanese Patent Application Laid-Open No. 255786/1997 (JP-9-255786A), Polymer, Vol. 29, p 756 (1988), and others.

Moreover, the polymeric organic phosphorus compound may be a phosphoric ester of a polymer having a hydroxyl group (such as a phenolic resin). Further, the polymeric organic phosphorus compound also includes a homo- or copolymer of the organic hypophosphorous acid compound (e.g., a polyphosphinicocarboxylic ester), and a polyphosphorous acid amide.

Among these phosphorus-containing compounds (C1), the preferred compounds include an inorganic phosphorus compound (e.g., a red phosphorus, an ammonium (poly)phosphate, and a metal salt of a phosphoric acid), a orthophosphoric ester (e.g., a bicyclo-aliphatic phosphoric ester, a spiro ring-containing aromatic phosphoric ester, an aromatic phosphoric ester, and a condensed phosphoric ester), a phosphoric ester amide, a phosphonitrilic compound, an organic phosphorous ester (e.g., a metal salt of an organic phosphorous acid), and an organic hypophosphorous acid compound (e.g., a metal salt of a dialkylhypophosphorous acid), and, in particular, include an inorganic phosphorus compound, a condensed phosphoric ester, a phosphoric ester amide, a phosphonitrilic compound, and a metal salt of a dialkylhypophosphorous acid.

(C2) Aromatic Resin

The aromatic resin includes a carbonizable or char-formable aromatic resin such as a polyphenylene sulfide-series resin, a polyphenylene oxide-series resin, a polycarbonate-series resin, a polyarylate-series resin, an aromatic nylon, a polyether imide-series resin, an aromatic epoxy resin, a novolak resin, an aralkyl resin, and an aromatic vinyl resin. As the polyphenylene oxide-series resin and the polycarbonate-series resin, there may be used the same resin as exemplified in the paragraph on the above-mentioned base resin. As the aromatic resin, an aromatic resin different in species from the base resin is usually employed.

(Polyphenylene Sulfide-series Resin)

The polyphenylene sulfide-series resin (polyphenylene thioether-series resin) includes a homopolymer or copolymer having a polyphenylene sulfide backbone, —($Ar^1$—S—)— (wherein $Ar^1$ represents a phenylene group). As the phenylene group (—$Ar^1$—), there may be mentioned, for example, p-phenylene group, m-phenylene group, o-phenylene group, a substituted phenylene group (e.g., an alkylphenylene group having substituent(s) such as a $C_{1-5}$alkyl group, an arylphenylene group having substituent(s) such as phenyl group), p,p'-diphenylenesulfone group, p,p'-biphenylene group, p,p'-diphenylene ether group, and p,p'-diphenylenecarbonyl group. The polyphenylene sulfide-series resin may be a homopolymer obtained from a homogeneous repeating unit among the phenylene sulfide groups comprising such a phenylene group, or in view of workability of the composition, may be a copolymer containing a heterogeneous repeating unit among the phenylene sulfide groups comprising such a phenylene group.

As the homopolymer, a substantially linear polymer comprising p-phenylene sulfide group as a repeating unit is preferably used. The copolymer may be obtained from two or more different kinds of phenylene sulfide groups among the phenylene sulfide groups. Among others, a copolymer comprising p-phenylene sulfide group as a main repeating unit in combination with m-phenylene sulfide group is preferred. From the viewpoint of physical properties such as heat resistance, moldability, and mechanical property, a substantially linear copolymer comprising not less than 60 mol % (preferably 70 mol %) of p-phenylene sulfide group is particularly preferred.

The polyphenylene sulfide resin may be a polymer obtained by allowing a relative low molecular weight of a linear polymer to crosslink with oxidation or heating for increasing the melt viscosity of the polymer thereby improving molding processability (mold-processability), or a high molecular weight polymer having a substantially linear structure which polymer is obtained by condensation polymerization from a monomer mainly comprising a bifunctional monomer. From the viewpoint of physical properties of the resultant shaped article, a polymer having a substantially linear structure, which is obtained by condensation polymerization is more preferred. Moreover, as the polyphenylene sulfide resin, in addition to the above-mentioned polymer, a branched or crosslinked polyphenylene sulfide resin obtained by a polymerization of the monomer in combination with a monomer having not less than three of functional groups, or a resin composition obtained by blending the resin to the above-mentioned linear polymer may be also used.

As the polyphenylene sulfide-series resin, there may be used a polyphenylene sulfide or a polybiphenylene sulfide (PBPS), in addition a polyphenylene sulfide ketone (PPSK), a polybiphenylene sulfide sulfone (PPSS), or others. These polyphenylene sulfide-series resins may be used singly or in combination.

The number average molecular weight of the polyphenylene sulfide-series resin is, for example, about 300 to $30\times10^4$, and preferably about 400 to $10\times10^4$.

(Aromatic Nylon)

As the aromatic nylon constituting the flame retardant, a resin different in kind from the polyamide resin of the base resin is used. As such a resin, there may be used a compound having a unit represented by the following formula (5):

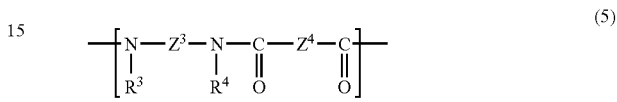

wherein $Z^3$ and $Z^4$ are the same or different, each selecting from an aliphatic hydrocarbon group, an alicyclic hydrocarbon group, and an aromatic hydrocarbon group, and at least one of $Z^3$ and $Z^4$ is an aromatic hydrocarbon group; $R^3$ and $R^4$ are the same or different, each selecting from a hydrogen group, an alkyl group, and an aryl group; and $R^3$ and $R^4$ may be connected directly with each other to form a ring.

Such an aromatic nylon includes a polyamide derived from a diamine and a dicarboxylic acid, in which at least one component of the diamine component and the dicarboxylic acid component is an aromatic compound; and a polyamide obtained from an aromatic aminocarboxylic acid, and if necessary a diamine and/or a dicarboxylic acid in combination. The aromatic nylon also includes a copolyamide derived from at least two different kinds of polyamide constituent components.

The diamine includes, for example, an aromatic diamine, for example, phenylenediamine, diaminotoluene, 2,4-diaminomesitylene, 3,5-diethyl-2,6-diaminotoluene, xylylenediamine (in particular, metaxylylenediamine, paraxylylenediamine), bis(2-aminoethyl)benzene, biphenylenediamine, a diamine having a biphenyl backbone (e.g., 4,4-diamino-3,3'-ethylbiphenyl), a diamine having a diphenylalkane backbone [e.g., diaminodiphenylmethane, bis(4-amino-3-ethyl)diphenylmethane, bis(4-amino-3-methylphenyl)methane, 3,3'-dichloro-4,4'-diaminodiphenylmethane, 2,2'-bis(4-aminophenyl)propane], bis(4-aminophenyl)ketone, bis(4-aminophenyl)sulfone, or 1,4-naphthalenediamine, and an N-substituted aromatic diamine thereof. Moreover, the aromatic diamine may be used in combination with an alicyclic diamine such as 1,3-cyclopentanediamine, 1,4-cyclohexanediamine, and bis(4-amino-3-methylcyclohexyl)methane; an aliphatic amine, such as trimethylenediamine, tetramethylenediamine, pentamethylenediamine, hexamethylenediamine, 2,2,4-trimethylhexamethylenediamine, 2,4,4-trimethylhexamethylenediamine, and octamethylenediamine, and an N-substituted aliphatic diamine thereof; or others. These diamines may be used singly or in combination. As the diamine, it is preferred to use an aromatic diamine (in particular xylylenediamine, N,N'-dialkyl-substituted xylylenediamine).

The dicarboxylic acid includes, for example, a $C_{2-20}$aliphatic dicarboxylic acid such as oxalic acid, malonic acid, succinic acid, glutaric acid, adipic acid, pimelic acid, suberic acid, azelaic acid, sebacic acid, undecanedicarboxylic acid, dodecanedicarboxylic acid, hexadecanedicarboxylic acid, and octadecanedicarboxylic acid; an aromatic dicarboxylic acid such as phthalic acid, phthalic anhydride, isophthalic acid, terephthalic acid, or naphthalenedicarboxylic acid; an alicyclic dicarboxylic acid such as cyclohexane-1,4-dicarboxylic acid and cyclohexane-1,3-dicarboxylic acid; a dimerized fatty acid (e.g., dimeric acid); or others. These dicarboxylic acids may be used singly or in combination. As the dicarboxylic acid, it is preferred to use an aliphatic dicarboxylic acid (in particular a $C_{6-20}$ aliphatic dicarboxylic acid such as adipic acid).

As the aromatic or alicyclic aminocarboxylic acid, there may be exemplified phenylalanine, tyrosine, anthranilic acid, aminobenzoic acid, or the like. These aminocarboxylic acids may be also used singly or in combination.

Moreover, as the aromatic nylon, a condensate of a lactam and/or an α,ω-aminocarboxylic acid may be used insofar as characteristics of a flame retardant is not deteriorated. The lactam includes a $C_{3-12}$lactam such as propiolactam, butyrolactam, valerolactam, and caprolactam (e.g., ε-caprolactam), and others. The α,ω-aminocarboxylic acid includes 7-aminoheptanoic acid, 10-aminodecanoic acid, and others.

The accessory ingredient of other aromatic nylon includes a monobasic acid (for example, acetic acid, propionic acid, caproic acid, nicotinic acid), a monoamine (for example, ethylamine, butylamine, benzylamine), a dibasic acid (for example, adipic acid, sebacic acid, terephthalic acid, isophthalic acid, cinchomeronic acid), a diamine (for example, tetramethylenediamine, hexamethylenediamine), a lactam or others, and at least one member selected therefrom may be used as a viscosity adjustment (or viscosity controller).

The aromatic nylon includes a polyamide in which the diamine component is an aromatic compound (for example, a polyamide or copolyamide comprising xylylenediamine as a diamine component), preferably a polyamide obtained from an aromatic diamine and an α,ω-$C_{2-12}$dicarboxylic acid [for example, a polyamide obtained from adipic acid and metaxylylenediamine (MXD6), a polyamide obtained from suberic acid and metaxylylenediamine, a polyamide obtained from adipic acid and paraxylylenediamine (PMD6), a polyamide obtained from suberic acid and paraxylylenediamine, a polyamide obtained from adipic acid and N,N'-dimethylmetaxylylenediamine, a polyamide obtained from suberic acid and N,N'-dimethylmetaxylylenediamine, a polyamide obtained from adipic acid and 1,3-phenylenediamine, a polyamide obtained from adipic acid and 4,4'-diaminodiphenylmethane, a copolyamide obtained from adipic acid, metaxylylenediamine and paraxylylenediamine, and a copolyamide obtained from adipic acid, metaxylylenediamine and N,N'-dimethylmetaxylylenediamine]. The particularly preferred aromatic nylon includes a polyamide obtained from an aromatic diamine (in particular xylylenediamine) and an α,ω-$C_{2-12}$aliphatc dicarboxylic acid, especially MXD6. These polyamides may be used singly or in combination.

The aromatic nylon is prepared by a direct method under atmospheric pressure or a melt polymerization based on, for example, Japanese Patent Publication No. 22510/1969 (JP-44-22510B), Japanese Patent Publication No. 51480/1972 (JP-47-51480B), Japanese Patent Application Laid-Open No. 200420/1982 (JP-57-200420A), Japanese Patent Application Laid-Open No. 111829/1983 (JP-58-111829A), Japanese Patent Application Laid-Open No. 283179/1987 (JP-62-283179A), Kogyokagaku Zasshi (Journal of the Chemical Society of Japan, Industrial Chemistry) Vol. 74, No. 4, page 786 (1971), Kogyokagaku Zasshi (Journal of the Chemical Society of Japan, Industrial Chemistry) Vol. 74, No. 10, page 2185 (1971), Engineering Plastic Jiten (Engineering Plastic Dictionary) page 74 (Gihodo Shuppan Co., Ltd., 1998), and references described in these documents.

The number average molecular weight of the aromatic nylon is not particularly limited to a specific one, and for example may be selected from the range of about 300 to $10 \times 10^4$, and preferably about 500 to $5 \times 10^4$.

(Polyarylate-series Resin)

As the polyarylate-series resin, there may be employed a compound having a structural unit represented by the following formula (6):

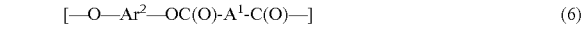

[—O—Ar²—OC(O)-A¹-C(O)—]  (6)

wherein $Ar^2$ stands for an aromatic group and $A^1$ stands for an aromatic, alicyclic, or aliphatic group.

Such a polyarylate-series resin may be produced by a fusion polymerization method, a solution polymerization method, or an interfacial polymerization method with utilizing, as a way of polyesterification, a transesterification method (e.g., acetate method, phenyl ester method), an acid chloride method, a direct method, or an addition polymerization method.

The polyarylate-series resin may be obtained through a reaction of an aromatic polyol component with a polycarboxylic acid component (e.g., an aromatic polycarboxylic acid component, an aliphatic polycarboxylic acid component, an alicyclic polycarboxylic acid component). The polycarboxylic acid component usually contains at least an aromatic polycarboxylic acid component.

Usually employed as the aromatic polyol (monomer) is a diol such as a monocyclic aromatic diol and a polycyclic aromatic diol, or a reactive derivative thereof [e.g., a salt (e.g., sodium salt, potassium salt) of an aromatic polyol, an ester of an aromatic polyol (e.g., an ester of acetic acid), a silyl-protected aromatic polyol (e.g., trimethylsilylated aromatic polyol)].

Exemplified as the monocyclic aromatic diol is an diol having an aromatic ring of about 6 to 20 carbon atoms, such as a benzenediol (e.g., resorcinol, hydroquinone, m-xylene glycol, p-xylylene glycol) and a naphthalenediol.

As the polycyclic aromatic diol, there may be mentioned, a bis(hydroxyaryl) (a bisphenol), for example, 4,4'-dihydroxybiphenyl, 2,2'-biphenyl, 3,3',5,5'-tetramethyl-4,4'-dihydroxybiphenyl, a dihydroxydiarylalkane exemplified in the paragraph on the above-mentioned $Z^3$ and $Z^4$, in addition a bis(hydroxyaryl)$C_{1-6}$alkane such as bisphenol F; a bis(hydroxyaryl)cycloalkene [for example, a bis(hydroxyaryl)$C_{3-12}$ cycloalkane such as bis(hydroxyphenyl)cyclohexane]; a bis (hydroxyaryl)carboxylic acid [for example, a bis(hydroxyaryl)$C_{2-6}$carboxylic acid such as bis-4,4-(hydroxyphenyl)butanoic acid]; and others. Moreover, other polycyclic aromatic diols also include compounds having a bis(hydroxyaryl)backbone, such as di(hydroxyphenyl)ether, di(hydroxyphenyl)ketone and di(hydroxyphenyl)sulfoxide exemplified in the paragraph on the above-mentioned $Z^3$ and $Z^4$, and di(hydroxyphenyl)thioether, a bis($C_{1-4}$alkyl-substituted hydroxyphenyl)alkane [e.g., bis(3-methyl-4-hydroxyphenyl) methane, bis(3-methyl-4-hydroxyphenyl)propane, bis(3,5-dimethyl-4-hydroxyphenyl)methane, bis(3,5-dimethyl-4-hydroxyphenyl)propane] and a terpene diphenol (e.g., 1,4-di ($C_{1-4}$alkyl-substituted hydroxyphenyl)-p-menthane).

These aromatic polyols may be used singly or in combination.

The preferred aromatic polyol includes a benzenediol and a bisphenol, for example, a bis(hydroxyaryl)$C_{1-6}$alkane (e.g., bisphenol A, bisphenol F, bisphenol AD), or others.

Incidentally, the aromatic polyol may be used together with an aliphatic or alicyclic polyol. Examples of the aliphatic polyol are a $C_{1-10}$ aliphatic polyol such as ethylene glycol, propylene glycol, butanediol, pentanediol, hexanediol and neopentyl glycol. Moreover, examples of the aliphatic polyol also include an aliphatic polyol having a $C_{3-10}$ aliphatic ring, such as 1,4-cyclohexanedimethanol. As the alicyclic polyol, there may be mentioned, for example, a $C_{3-10}$ alicyclic polyol such as cyclohexanediol.

Exemplified as the aromatic polycarboxylic acid are a dicarboxylic acid such as a monocyclic aromatic dicarboxylic acid and a polycyclic aromatic dicarboxylic acid, or a reactive derivative thereof [for example, an aromatic polycarboxylic acid halide (e.g., an aromatic polycarboxylic acid chloride), an aromatic polycarboxylic ester (e.g., an alkyl ester, an aryl ester), and an aromatic polycarboxylic acid anhydride].

Examples of the monocyclic aromatic dicarboxylic acid are an aromatic carboxylic acid exemplified in the paragraph on the aromatic nylon (an aryldicarboxylic acid having 8 to 20 carbon atoms, e.g., a benzenedicarboxylic acid and a naphthalenedicarboxylic acid). Incidentally, the benzenedicarboxylic acid and naphthalenedicarboxylic acid (particularly, benzenedicarboxylic acid) may have one or two $C_{1-4}$alkyl group(s) as a substituent.

Examples of the polycyclic aromatic dicarboxylic acid are a bis(arylcarboxylic acid), for example, biphenyldicarboxylic acid, a bis(carboxyaryl)$C_{1-6}$alkane such as bis(carboxyphenyl)methane; a bis(carboxyaryl)$C_{3-12}$cycloalkane such as bis(carboxyphenyl)cyclohexane; a bis(carboxyaryl)ketone such as bis(carboxyphenyl)ketone; a bis(carboxyaryl)sulfoxide such as bis(carboxyphenyl)sulfoxide; a bis(carboxyaryl) ether such as bis(carboxyphenyl)ether; and a bis(carboxyaryl)thioether such as bis(carboxyphenyl)thioether.

The preferred aromatic polycarboxylic acid component includes a monocyclic aromatic dicarboxylic acid (particularly, a benzenedicarboxylic acid such as phthalic acid, isophthalic acid and terephthalic acid), a bis(carboxyaryl)$C_{1-6}$alkane, and others.

The aliphatic polycarboxylic acid (monomer) includes an aliphatic dicarboxylic acid exemplified in the paragraph on the aromatic nylon (in particular a $C_{2-20}$ aliphatic dicarboxylic acid), and may be a dicarboxylic acid having a $C_{3-10}$aliphatic ring, such as dicarboxymethylcyclohexane. The alicyclic polycarboxylic acid includes an alicyclic dicarboxylic acid exemplified in the paragraph on the aromatic nylon (in particular a $C_{3-20}$alicyclic dicarboxylic acid).

Preferred as the polyarylate-series resin are, for example, a polyarylate resin wherein the aromatic polyol is a benzenediol and/or a bisphenol, such as a polyester of a benzenediol (e.g., hydroquinone, resorcinol) and/or a bisphenol (e.g., bisphenol A, bisphenol AD, bisphenol F, biphenol, 3,3',5,5'-tetramethyl-4,4-dihycroxyphenyl) with a benzenedicarboxylic acid (e.g., isophthalic acid, terephthalic acid), and a polyester of the benzenediol and/or bisphenol with a bis (arylcarboxylic acid) [e.g., a bis(carboxyaryl)$C_{1-4}$alkane such as bis(carboxyphenyl)methane, bis(carboxyphenyl) ethane and bis(carboxyphenyl)propane]. These polyarylate-series resins may be used singly or in combination.

Moreover, the polyarylate-series resin may be a resin using, if necessary an aromatic triol, an aromatic tetraol [e.g., 1,1,2,2-tetrakis(hydroxyphenyl)ethane], an aromatic tricarboxylic acid, an aromatic tetracarboxylic acid, or a hydroxycarboxylic acid (e.g., hydroxybenzoic acid, hydroxynaphthoic acid), in addition to the aromatic diol and the aromatic dicarboxylic acid.

The terminal (or end) of the polyarylate-series resin may be blocked with (bonded to) an alcohol, or a carboxylic acid (particularly, a monohydric alcohol, a monofunctional carboxylic acid). Examples of the monohydric alcohol for blocking the terminal of the polyarylate-series resin are a monohydric aryl alcohol (e.g., a monohydric phenol which may be substituted with a $C_{1-10}$alkyl group and/or a $C_{6-10}$aryl group, for example, phenol, an alkylphenol having one or two $C_{1-4}$alkyl group(s) (such as methyl group) at o-, m- or p-position; an arylphenol having phenyl, benzyl or cumyl group at o-, m- or p-position), a monohydric alkyl alcohol (e.g., a $C_{1-20}$alkyl monoalcohol such as methanol, ethanol, propanol, butanol, hexanol and stearyl alcohol), a monohydric aralkyl alcohol (e.g., a $C_{7-20}$aralkyl monoalcohol such as benzyl alcohol and phenethyl alcohol), and others.

Examples of the monofunctional carboxylic acid for blocking the terminal of the polyarylate-series resin include a monofunctional aliphatic carboxylic acid (a $C_{1-20}$ aliphatic monocarboxylic acid such as acetic acid, propionic acid and octanoic acid), a monofunctional alicyclic carboxylic acid (e.g., a $C_{4-20}$ alicyclic monocarboxylic acid such as cyclohexanecarboxylic acid) and a monofunctional aromatic carboxylic acid (a $C_{7-20}$ aromatic monocarboxylic acid such as benzoic acid, toluic acid, o-, m-, or p-tert-butylbenzoic acid and p-methoxyphenylacetic acid). The carboxylic acid may be a monofunctional aliphatic carboxylic acid substituted with an aromatic group such as phenylacetic acid (particularly, a $C_{1-10}$ aliphatic monocarboxylic acid substituted with a $C_{6-20}$ aromatic group).

Moreover, the polyarylate-series resin may constitute a polymer alloy with a resin other than the polyarylate-series resin, such as a polymer alloy with a polycarbonate, a polyethylene terephthalate, a polyamide or the like. The polymer alloy includes not only a simple mixture but also a transesterified polymer alloy or a polymer alloy containing a compatibilizing agent.

The number average molecular weight of the polyarylate-series resin is, for example, about 300 to $30 \times 10^4$, and preferably about 500 to $10 \times 10^4$.

(Aromatic Epoxy Resin)

Examples of the aromatic epoxy resin include an ether-series epoxy resin [for example, a biphenyl-based epoxy resin (e.g., 3,3',5,5'-tetramethylbiphenol-based epoxyresin), a bisphenol-based epoxy resin, a novolak epoxy resin, an epoxy resin modified with an unsaturated cyclic hydrocarbon compound (e.g., a (di)cyclopentadiene-series epoxy resin), and a stilbene-based epoxy resin], and an amine-series epoxy resin formed with an aromatic amine component.

Examples of the bisphenol constituting a bisphenol-based epoxy resin are similar to the bis(hydroxyaryl) listed above. The preferred bisphenol-based epoxy resin includes a glycidyl ether of a bis(hydroxyaryl)$C_{1-6}$alkane, particularly bisphenol A, bisphenol AD, bisphenol F or the like. Moreover, examples of the bisphenol-based epoxy resin also include the above-mentioned bisphenol glycidyl ether of high molecular weight (that is, a phenoxy resin).

Examples of the novolak resin constituting a novolak epoxy resin include a novolak resin in which an alkyl group (e.g., a $C_{1-20}$alkyl group, preferably a $C_{1-4}$ alkyl group such as methyl group and ethyl group) may be substituted on the aromatic ring (e.g., a phenol-novolak resin, a cresol-novolak resin). The preferred novolak epoxy resin includes a glycidyl ether of a novolak resin which may be substituted with a $C_{1-2}$alkyl group.

Examples of the aromatic amine component constituting an amine-series epoxy resin are a monocyclic aromatic amine (e.g., aniline, toluidine), a monocyclic aromatic diamine (e.g., diaminobenzene, xylylenediamine), a monocyclic aromatic aminoalcohol (e.g., aminohydroxybenzene), a polycyclic aromatic diamine (e.g., diaminodiphenylmethane), and a polycyclic aromatic amine.

The number average molecular weight of the aromatic epoxy resin is, for example, about 200 to $5 \times 10^4$, preferably about 300 to $1 \times 10^4$, and more preferably about 400 to 6,000. Moreover, the number average molecular weight of the phenoxy resin is, for example, about 500 to $5 \times 10^4$, and preferably 1,000 to $4 \times 10^4$.

The aromatic epoxy resin may be used in a cured state, and the curing is effected by the use of a curing agent, e.g., an amine-series curing agent (e.g., an aliphatic amine such as ethylenediamine; an aromatic amine such as metaphenylenediamine and xylylenediamine), a polyaminoamide-series curing agent, an acid and acid anhydride-series curing agent.

These resin components may be used singly or in combination.

(Resin Containing Aromatic Ring Having Hydroxyl Group and/or Amino Group)

The resin containing an aromatic ring having a hydroxyl group and/or an amino group includes a resin of which the main chain or side chain contains the aromatic ring. Among these resins, as the resin of which the main chain contains the aromatic ring, for example, there may be mentioned a novolak resin, an aralkyl resin, a phenol resin modified with an unsaturated cyclic hydrocarbon compound [e.g., a (di) cyclopentadiene-series phenol resin; a phenol resin described in Japanese Patent Application Laid-Open No. 291616/1986 (JP-61-291616A), Japanese Patent Application Laid-Open No. 201922/1987 (JP-62-201922A), and Japanese Patent Application Laid-Open No. 49181/1994 (JP-6-49181A)]. As the resin of which the side chain contains the aromatic ring, there may be mentioned an aromatic vinyl resin.

(1) Novolak Resin

The novolak resin has a repeating unit represented by the following formula (7):

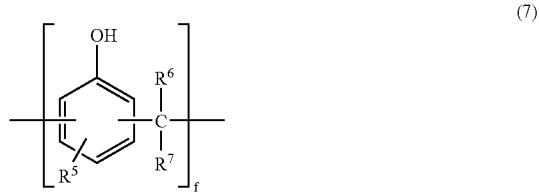

(7)

wherein $R^5$ to $R^7$ are the same or different, each representing a hydrogen atom, an alkyl group, or an aryl group, "f" denotes an integer of not less than 1.

The alkyl group includes a $C_{1-20}$alkyl group (such as methyl, ethyl, butyl, t-butyl, hexyl, octyl, nonyl, and dodecyl), preferably a $C_{1-12}$alkyl group, and more preferably a $C_{1-6}$alkyl group. The aryl group includes a $C_{6-20}$aryl group (such as phenyl and naphthyl), a substituted aryl group (e.g., a $C_{1-4}$alkyl-substituted aryl group such as methylphenyl group and ethylphenyl group, and hydroxyphenyl group).

The novolak resin (particularly a random novolak resin) is usually obtainable by a reaction of a phenol with an aldehyde. As the phenol, for example, there may be mentioned phenol, p- or m-cresol, 3,5-xylenol, an alkyl phenol (e.g., a $C_{1-20}$alkyl phenol such as t-butyl phenol, p-octyl phenol, and nonyl phenol), an aryl phenol (e.g., phenyl phenol, benzyl phenol, cumyl phenol), and others. These phenols may be used singly or in combination.

The aldehyde includes, for example, an aliphatic aldehyde such as formaldehyde, acetaldehyde and propionaldehyde, and an aromatic aldehyde such as phenylacetaldehyde. The preferred aldehyde includes formaldehyde. Moreover, a condensate of formaldehyde such as trioxane and paraformaldehyde may be also used. The ratio of the phenol relative to the aldehyde (the former/the latter) is about 1/0.5 to 1/1 (molar ratio).

The condensation reaction of the phenol with the aldehyde is usually carried out in the presence of an acid catalyst. As the acid catalyst, for example, there may be mentioned an inorganic catalyst (e.g., hydrochloric acid, sulfuric acid, phosphoric acid), and an organic catalyst (e.g., p-toluenesulfonic acid, oxalic acid).

In particular, a phenol novolak resin having decreased content of a monomer or dimer of a phenol is preferred. Such a phenol novolak resin is, for example, available as trade name "SUMILITE RESIN PR-53647", "SUMILITE RESIN PR-NMD-100 series", or "SUMILITE RESIN PR-NMD-200 series" from Sumitomo Durez Co., Ltd.

Moreover, as the novolak resin, a high-orthonovolak resin having an ortho/para ratio of not less than 1 may be used.

In particular, as the novolak resin, it is preferred to use a novolak resin having an ortho/para ratio of not less than 1, for example, about 1 to 20 (particularly about 1 to 15), so-called a high-orthonovolak resin. Such a high-orthonovolak resin is procurable from Sumitomo Durez Co., Ltd. as "SUMILITE RESIN HPN SERIES".

The process for producing these novolak resins may be referred to Japanese Patent Application Laid-Open No. 172348/2001 (JP-2001-172348A), Japanese Patent Application Laid-Open No. 273133/2000 (JP-2000-273133A), Japanese Patent Application Laid-Open No. 273132/2000 (JP-2000-273132A), Japanese Patent Application Laid-Open No. 226423/2000 (JP-2000-226423A), Japanese Patent Application Laid-Open No. 246643/1999 (JP-11-246643A), Japanese Patent Application Laid-Open No. 204139/1998 (JP-10-204139A), Japanese Patent Application Laid-Open No. 195158/1998 (JP-10-195158A).

Incidentally, there may be also used a co-condensate of the above-mentioned phenol with a co-condensable component such as a dioxybenzene, a naphthol, a bisphenol (e.g., the bisphenol exemplified in the item on the $Z^3$ and $Z^4$), an alkylbenzene (e.g., toluene, ethylbenzene, xylene, mesitylene), an aniline, a furfural, a urea or a triazine (e.g., urea, cyanuric acid, isocyanuric acid, melamine, guanamine, acetoguanamine, benzoguanamine), a terpene, a cashew nut, and a rosin. In particular, an aminotriazine novolak resin modified with a triazine is a preferred co-condensate. Such an aminotriazine novolak may be obtained by condensation of a phenol, a triazine and a formaldehyde in the presence or absence of an basic catalyst (e.g., ammonia, triethylamine, triethanolamine) and/or an acid catalyst (e.g., oxalic acid) [for example, DIC Technical Review No. 3, p47 (1997), Japanese Patent Application Laid-Open No. 253557/1996 (JP-8-253557A), Japanese Patent Application Laid-Open No. 279657/1998 (JP-10-279657A)]. An aminotriazine novolak is available from Dainippon Ink And Chemicals, Inc. as trade name "PHENOLITE".

Moreover, a modified novolak resin (e.g., a phosphoric acid-modified novolak resin or a boric acid-modified novolak resin) may be also employed, and the resin is a novolak resin (random novolak resin, high-ortho novolak resin) in which phenolic hydroxyl groups are partially or wholly modified with at least one compound selected from phosphorus-containing compounds (e.g., a phosphoric acid such as phosphoric acid, phosphorous acid, an organic phosphorous acid and an organic hypophosphorous acid, an acid anhydride, halide, salt or ester (in particular, an aliphatic ester) thereof) and boron-containing compounds (e.g., a boric acid such as boric acid, an organic boronic acid and an organic borinic acid, and an acid anhydride, halide, salt or ester thereof). The hydroxyl group in the novolak resin is usually modified to a phosphoric ester or a boric ester.

Further, a modified novolak resin being a novolak resin (random novolak resin and high-ortho novolak resin) in which the hydrogen atom of the phenolic hydroxyl group is partially or wholly modified (or substituted) with a metal ion, a silyl group, an organic group (e.g., an alkyl group, an alkanoyl group, a benzoyl group, glycidyl group) is also available.

Preferred as the novolak resins are, for example, phenol-formaldehyde novolak resin, an alkylphenol-formaldehyde novolak resin (e.g., a t-butylphenol-formaldehyde novolak resin, a p-octylphenol-formaldehyde resin), a co-condensate thereof (an aminotriazine-novolak resin), and a mixture thereof.

There is no particular restriction as to the number average molecular weight of the novolak resin (random novolak resin and high-ortho novolak resin), and it may be selected within the range of 300 to $5 \times 10^4$, and preferably 300 to $1 \times 10^4$.

(2) Aralkyl Resin

The aralkyl resin has a structural unit represented by the following formula (8):

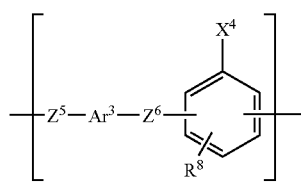

wherein $Ar^3$ represents an aromatic group, $Z^5$ and $Z^6$ are the same or different, each representing an alkylene group, $R^8$ represents a hydrogen atom or an alkyl group, and $X^4$ represents a hydroxyl group, an amino group, or an N-substituted amino group.

The aromatic group represented by $Ar^3$ includes an aromatic group having 6 to 20 carbon atoms, for example, a phenylene group (e.g., o-phenylene group, m-phenylene group, p-phenylene group), and naphthylene group, preferably a phenylene group (in particular p-phenylene group).

The alkylene group represented by $Z^5$ and $Z^6$ includes a $C_{1-6}$alkylene group (such as methylene, ethylene, propylene, tetramethylene and hexamethylene), and preferably a $C_{1-4}$alkylene group (particularly a $C_{1-2}$alkylene group). The alkyl group represented by $R^8$ includes a $C_{1-20}$alkyl group such as methyl, ethyl, propyl, butyl, t-butyl, hexyl, octyl, nonyl and dodecyl (in particular a $C_{1-4}$alkyl group).

The N-substituted amino group represented by $X^4$ includes a mono- or di$C_{1-4}$alkylamino group, for example, dimethylamino group and diethylamino group.

In many cases, a phenol aralkyl resin having a hydroxyl group as $X^4$ is used as an aralkyl resin. The preferred phenol aralkyl resin includes a resin having methylene groups as $Z^5$ and $Z^6$, a phenylene group as $Ar^3$, a hydrogen atom as $R^8$ in the above formula (8), and a p-xylene-substituted phenol represented by the following formula (9) as a repeating unit.

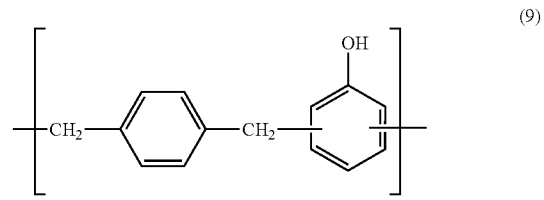

The aralkyl resin may be usually obtained by reacting a compound represented by the formula (10) with a phenol or an aniline. A phenolalkyl resin is formed through the use of a phenol, and an anilinearalkyl resin is formed through the use of an aniline.

$$Y^6\text{-}Z^5\text{-}Ar^3\text{-}Z^6\text{-}Y^6 \qquad (10)$$

In the formula, $Y^6$ represents an alkoxy group, an acyloxy group, a hydroxyl group, or a halogen atom, and $Ar^3$, $Z^5$ and $Z^6$ have the same meanings as defined above.

In the formula (10), an alkoxy group represented by $Y^6$ includes a $C_{1-4}$alkoxy group such as methoxy, ethoxy, propoxy and butoxy group. Examples of the acyloxy group include an acyloxy group having about 2 to 5 carbon atoms, such as acetoxy group. Moreover, examples of the halogen atom include chlorine, bromine, and iodine atom.

The compound represented by the formula (10), for example, includes an aralkyl ether such as a xylylene glycol $C_{1-4}$alkyl ether (e.g., p-xylylene glycol dimethyl ether, p-xylylene glycol diethyl ether), an acyloxyaralkyl such as p-xylylene-α,α'-diacetate, an aralkyldiol such as p-xylylene-α,α'-diol, an aralkyl halide such as p-xylylene-α,α'-dichloride and p-xylylene-α,α'-dibromide.

The phenol includes a phenol and an alkylphenol exemplified in the section on the novolak resin. These phenols may be used either singly or in combination.

Examples of the aniline are aniline, an alkylaniline (e.g., a $C_{1-20}$alkylaniline such as toluidine, xylidine, octylaniline and nonylaniline), and an N-alkylaniline (e.g., an N—$C_{1-4}$alkylaniline such as N,N-dimethylaniline and N,N-diethylaniline). These anilines may be used either singly or in combination.

The ratio of the compound represented by the formula (10) relative to the phenol or aniline (the former/the latter) is, for example, about 1/1 to 1/3 (molar ratio), preferably about 1/1 to 1/2.5 (molar ratio).

The softening point of the aralkyl resin thus obtained is, for example, about 40 to 160° C., preferably about 50 to 150° C., and more preferably about 55 to 140° C. Incidentally, as other aralkyl resin, there may be used an aralkyl resin described in Japanese Patent Application Laid-Open No. 351822/2000 (JP-2000-351822A).

If necessary, the aralkyl resin may be cured or modified. Curing or modification may be usually effected by a conventional method, such as methylene-crosslinking with the use of a polyamine (e.g., hexamethylenetetramine) and epoxy-modification with the use of an epoxy compound (e.g., epichlorohydrin).

(3) Aromatic Vinyl Resin

The aromatic vinyl resin includes, for example, a resin having a structural unit represented by the following formula (11):

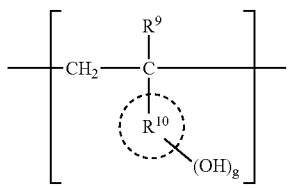

(11)

wherein $R^9$ represents a hydrogen atom or a $C_{1-3}$alkyl group, $R^{10}$ represents an aromatic ring, and "g" denotes an integer of 1 to 3.

In the formula (11), the preferred $C_{1-3}$alkyl group includes methyl group. As the aromatic ring, there may be mentioned a $C_{6-20}$aromatic ring such as benzene ring and naphthalene ring. Incidentally, the aromatic ring may have a substituent (e.g., a hydroxyl group; the alkyl group exemplified in the item on the above-mentioned $R^5$ to $R^7$; the alkoxy group exemplified in the item on the above-mentioned $Y^6$).

In the formula (11), the hydrogen atom of the hydroxyl group may be protected by a metal ion, a silyl group, or an organic group (or protecting group) such as an alkyl group, an alkanoyl group, a benzoyl group and glycidyl group.

A resin obtained from such a derivative has, for example, a structural unit represented by the following formula (12):

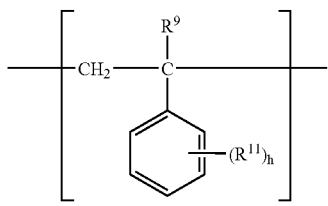

(12)

wherein $R^9$ has the same meaning as defined above, $R^{11}$ is a group selected from the group consisting of —OH, —OSi $(R^{12})_3$ and —OM ("M" represents a metal cation, $OR^{12}$ and $OCOR^{12}$, and $R^{12}$ represents an alkyl group having 1 to 5 carbon atom(s) or aryl group), and "h" denotes an integer of 1 to 3.

In the formula, "M" may be either a monovalent alkali metal cation (e.g., sodium, lithium, potassium), a bivalent alkaline earth metal cation (e.g., magnesium, calcium), or a transition metal cation.

It is sufficient that the substituent $R^{11}$ in the formula is positioned in any one of ortho-position, meta-position and para-position. Further, in addition to the substituent $R^{11}$, a pendant aromatic ring may have a $C_{1-4}$alkyl group as a substituent.

The aromatic vinyl-series resin includes a homo- or copolymer of an aromatic vinyl monomer having a hydroxyl group, corresponding to the above-mentioned structural unit (11), or a copolymer with other copolymerizable monomer.

As the aromatic vinyl monomer, for example, there may be mentioned a hydroxyl group-containing aromatic vinyl monomer such as vinylphenol, dihydroxystyrene and vinylnaphthol. These aromatic vinyl monomers may be used singly or in combination.

Examples of the other copolymerizable monomer are a (meth)acrylic monomer [e.g., (meth)acrylic acid, a (meth) acrylate (e.g., a $C_{1-8}$alkyl(meth)acrylate such as methyl (meth)acrylate, ethyl(meth)acrylate, butyl(meth)acrylate and 2-ethylhexyl(meth)acrylate, a hydroxyl group-containing monomer such as 2-hydroxyethyl(meth)acrylate, glycidyl (meth)acrylate), (meth)acrylamide, (meth)acrylonitrile], a styrenic monomer (e.g., styrene, vinyltoluene, α-methylstyrene, chlorostyrene, vinylnaphthalene, vinylcyclohexane), a polymerizable polycarboxylic acid (e.g., fumaric acid, maleic acid), a maleimide-series monomer (e.g., maleimide, N-alkylmaleimide, N-phenylmaleimide), a diene-series monomer (e.g., isoprene, 1,3-butadiene, 1,4-hexadiene, dicyclopentadiene), and a vinyl-series monomer (e.g., a vinyl ester such as vinyl acetate and vinyl propionate; a vinyl ketone such as methyl vinyl ketone and methyl isopropenyl ketone; a vinyl ether such as vinyl isobutyl ether and vinyl methyl ether; a nitrogen-containing vinyl monomer such as N-vinylcarbazole, and N-vinylpyrrolidone, N-vinylimidazole). These copolymerizable monomers may be used either singly or in combination.

The ratio of the vinyl monomer relative to the copolymerizable monomer is, for example, about 10/90 to 100/0 (% by weight), preferably about 30/70 to 100/0 (% by weight), and more preferably about 50/50 to 100/0 (% by weight).

The preferred aromatic vinyl resin includes a vinylphenol homopolymer (a polyhydroxystyrene), particularly a p-vinylphenol homopolymer.

There is no particular restriction as to the number average molecular weight of the aromatic vinyl-series resin, and it may be selected within the range of, for example, 300 to $50 \times 10^4$, and preferably 400 to $30 \times 10^4$.

Among the aromatic resins, a polyphenylene oxide-series resin, a polycarbonate-series resin, a polyarylate-series resin, a novolak resin, an aralkyl resin, and an aromatic vinyl resin, particularly a polyphenylene oxide-series resin, a polycarbonate-series resin and a novolak resin, are preferred.

(C3) Nitrogen-containing Compound

The nitrogen-containing compound to be used as a flame-retardant auxiliary includes a nitrogen-containing cyclic compound having no phosphorus atom (or a non-phosphorus nitrogen-containing cyclic compound) (for example, a nitrogen-containing cyclic compound having no phosphorus-containing group in the molecule, e.g., a non-phosphorus nitrogen-containing cyclic compound having an amino group, or a salt of the compound, a cyclic urea compound, and a tetrazole compound) or a salt thereof, differing from the organic phosphorus compound. Moreover, a (poly)phosphoric acid amide or a non-cyclic urea compound may be used as the nitrogen-containing compound (C3). Such a nitrogen-containing compound (C3) may be used singly or in combination.

The nitrogen-containing cyclic compound having an amino group, or a salt thereof includes (a) a nitrogen-containing cyclic compound having an amino group, (b) a salt of the nitrogen-containing cyclic compound having an amino group with an oxygen acid (oxyacid), (c) a salt of the nitrogen-containing cyclic compound having an amino group with an organic phosphoric acid, (d) a salt of the nitrogen-containing cyclic compound having an amino group with a nitrogen-containing cyclic compound having a hydroxyl group, and others.

(a) Non-phosphorus Nitrogen-containing Cyclic Compound Having Amino Group

The non-phosphorus nitrogen-containing cyclic compound having an amino group includes a heterocyclic compound having at least one amino group, and at least one nitrogen atom as a hetero atom of a heterocycle. The heterocycle may have other hetero atom(s) such as sulfur and oxygen other than nitrogen. Such a nitrogen-containing heterocycle includes a 5- or 6-membered unsaturated nitrogen-containing heterocycle having a plurality of nitrogen atoms as constituent atoms of the ring. The 5- or 6-membered unsaturated nitrogen-containing heterocycle includes, for example, a nitrogen-containing 5-membered ring (e.g., pyrrole, pyrazoline, imidazole, and triazole), a nitrogen- and sulfur-containing 5-membered ring (e.g., thiazoline, thiazole, thiadiazole, and thiadiazoline), a nitrogen- and oxygen-containing 5-membered ring (e.g., oxazoline, and furazan), a nitrogen-containing 6-membered ring (e.g., pyridine, pyrazine, pyridazine, and triazine), a nitrogen- and oxygen-containing 6-membered ring (e.g., oxazine), a nitrogen- and sulfur-containing 6-membered ring (e.g., thiazine, and thiadiazine), and a condensed heterocycle (e.g., indol, indazole, quinoline, and purine). Among such nitrogen-containing rings, a 5- or 6-membered unsaturated nitrogen-containing ring having a plurality of nitrogen atoms as constituent atoms of the ring is preferred, and in particular, triazole and triazine are preferred.

As the triazole compound, there may be mentioned a 1,2,3-triazole (e.g., a 1H-1,2,3-triazole; a 2H-1,2,3-triazole), a 1,2,4-triazole (e.g., a 1H-1,2,4-triazole such as guanazole; a 4H-1,2,4-triazole such as guanazine), and the like. The arbitrary site(s) of a triazole ring (nitrogen atom and carbon atom, particular carbon atom) may have an amino group(s) as substituent(s). The number of the amino group is not particularly limited to a specific one, and is about 1 to 3, and particularly about 1 to 2.

The triazine compound includes a variety of aminotriazines: a 1,3,5-triazine [for example, a melamine or a derivative thereof such as melamine, a substituted melamine (e.g., an alkylmelamine such as 2-methylmelamine, guanylmelamine), a condensation product of a melamine (melamine condensate) (e.g., melam, melem, melon), and a copolycondensed resin of a melamine (e.g., a melamine-formaldehyde resin, a phenol-melamine resin, a benzoguanamine-melamine resin, an aromatic polyamine-melamine resin); a cyanuricamide (e.g., ammeline, ammelide); a guanamine or a derivative thereof (e.g., guanamine, methylguanamine, acetoguanamine, benzoguanamine, succinoguanamine and CTU guanamine)], an amino group-containing 1,2,3-triazine (e.g., 1,2,3-triazine having an amino group(s) as substituent(s) at 5-position, 4,5-positions or 4,5,6-positions, 4-amino-benzo-1,2,3-triazine), and an amino group-containing 1,2,4-triazine (e.g., 1,2,4-triazine having an amino group(s) as substituent(s) at 3-position, 5-position or 3,5-positions). The arbitrary site(s) of a triazine ring (nitrogen atom and carbon atom, particularly carbon atom) may have an amino group(s) as substituent(s). The number of the amino group is not particularly limited to a specific one, and is about 1 to 4, especially about 1 to 3 (for example about 1 to 2).

Among them, the amino group-containing triazine compound, particularly the amino group-containing 1,3,5-triazine, is preferred.

(b) Salt of Non-phosphorus Nitrogen-containing Cyclic Compound Having Amino Group with Oxygen Acid As the nitrogen-containing cyclic compound having an amino group, there may be used a nitrogen-containing cyclic compound similar to the above-mentioned (a).

The nitrogen-containing cyclic compound having an amino group may form a salt with an oxygen acid at a nitrogen atom site (imino group) constituting a ring. It is usually preferred to form a salt of at least one amino group which is a substituent of a ring with an oxygen acid. In the case having a plurality of amino groups, all amino groups may form a salt with the oxygen acid. Moreover, a plurality of nitrogen-containing compounds which are the same or different kind (the above-mentioned nitrogen-containing cyclic compound, or other nitrogen-containing compound which contains an amino group) may form a salt with one poly acid to form a double salt (or complex salt) of a polyacid.

(Oxygen Acid)

The oxygen acid includes nitric acid, a chloric acid (such as perchloric acid, chloric acid, chlorous acid, hypochlorous acid), a phosphoric acid, a sulfuric acid, a sulfonic acid, a boric acid, a chromic acid, an antimonic acid, a molybdic acid, a tungstic acid, stannic acid, and silicic acid. The preferred oxygen acid includes a phosphoric acid (polyphosphoric acid), a sulfuric acid, a sulfonic acid, and a boric acid.

(1) Phosphate of Non-phosphorus Nitrogen-containing Cyclic Compound Having Amino Group The phosphoric acid includes a non-condensed phosphoric acid such as peroxophosphoric acid, orthophosphoric acid, metaphosphoric acid, phosphorous acid (phosphonic acid), and hypophosphorous acid (phosphinic acid); a condensed phosphoric acid (polyphosphoric acid) such as a polymetaphosphoric acid $(HPO_3)_j$ (wherein, "j" shows an integer of not less than 2), hypophosphoric acid, and phosphoric anhydride (diphosphorus pentaoxide). Moreover, the polyphosphoric acid also includes a condensed phosphoric acid represented by the following formula (13):

(13)

wherein "k" denotes an integer of not less than 2.

In the formula, "k" is preferably an integer of 2 to 2000, and more preferably an integer of 3 to 1000.

Moreover, the polyphosphoric acid also includes pyrophosphoric acid, triphosphoric acid, tetraphosphoric acid, and others.

In a phosphoric acid having a plurality of salifiable sites, at least part of the sites may form a partial salt with other amino group-containing compound such as an amine and a urea (e.g., a partial salt of a condensed acid such as an ammonium polyphosphate and a urea polyphosphate; and a partial salt of non-condensed acid such as a urea orthophosphate).

As a phosphate of a nitrogen-containing cyclic compound having an amino group, there may be exemplified a phosphate of an amino group-containing triazine compound, for example, a non-condensed phosphate (e.g., a melamine salt of a non-condensed phosphoric acid such as melamine orthophosphate and melamine phosphite; a melem, melam, melon and guanamine salt corresponding to the melamine salt), a polyphosphate [e.g., a melamine pyrophosphate (melamine pyrophosphate, dimelamine pyrophosphate), a melamine polyphosphate (such as a triphosphate and tetraphosphate) corresponding to the melamine pyrophosphate; and a melem, melam, melon and guanamine salt corresponding to the melamine polyphosphate]. Moreover, the polyphosphate may contain a sulfur atom derived from sulfuric acid. There may be also used a triazole salt corresponding to the above-mentioned triazine salt.

The polyphosphate also includes a double salt (complex salt) of polyphosphoric acid with melamine, melam and melem (or a melamine.melam.melem double salt of polyphosphoric acid), a melamine.melam.melem double salt of metaphosphoric acid, in addition a melamine.melam.melem double salt of the above-mentioned polyacid containing a sulfur atom (a polyacid containing a sulfur atom, an oxygen atom and others in addition to a phosphorus atom). The details of these double salts can be referred to Japanese Patent Application Laid-Open No. 306081/1998 (JP-10-306081A), Japanese Patent Application Laid-Open No. 306082/1998 (JP-10-306082A), and others.

(2) Sulfate of Non-phosphorus Nitrogen-containing Compound Having Amino Group

The sulfuric acid includes a non-condensed sulfuric acid such as peroxomonosulfuric acid, sulfuric acid and sulfurous acid, a condensed sulfuric acid such as peroxodisulfuric acid and pyrosulfuric acid, and others.

As a sulfate of a nitrogen-containing compound having an amino group, there may be mentioned a sulfate of an amino group-containing triazine compound, for example, a condensed sulfate [for example, a melamine salt of a non-condensed sulfuric acid such as a melamine sulfate (e.g., melamine sulfate, dimelamine sulfate, guanylmelamine sulfate), and a melamine sulfite corresponding to the melamine sulfate; and a melem salt, melam salt, melon salt or guanamine salt corresponding to the melamine salt of a non-condensed sulfuric acid)], a condensed sulfate [for example, a melamine pyrosulfate (e.g., melamine pyrosulfate, dimelamine pyrosulfate), and a melem salt, melam salt, melon salt or guanamine salt corresponding to the melamine pyrosulfate]. Moreover, a triazole salt corresponding to the triazine salt may be also used.

For example, the melamine sulfate may be obtained by a method described in Japanese Patent Application Laid-Open No. 231517/1996 (JP-8-231517A). For example, the dimelam pyrosulfate may be obtained by a method described in A.C.S. Symposium Series No. 425 "Fire and Polymers", Chapter 15, p. 211-238 (American Chemical Society, Washington D.C., 1990), Japanese Patent Application Laid-Open No. 306082/1998 (JP-10-306082A), or the like. Such a sulfate of a nitrogen-containing cyclic compound (triazine compound) is, for example, procurable from Sanwa Chemical Co., Ltd. as "Apinon 901".

(3) Sulfonate of Non-phosphorus Nitrogen-containing Cyclic Compound Having Amino Group The sulfonic acid includes an organic sulfonic acid such as a $C_{1-10}$alkanesulfonic acid (e.g., methanesulfonic acid, ethanesulfonic acid, ethanedisulfonic acid), and a $C_{6-20}$arenesulfonic acid (e.g., benzenesulfonic acid, toluenesulfonic acid).

As the sulfonate of a nitrogen-containing cyclic compound having an amino group, there may be mentioned a sulfonate of an amino group-containing triazine compound (e.g., melamine, melam, melem, melon, guanamine, acetoguanamine, benzoguanamine) [for example, a melamine sulfonate (melamine methanesulfonate, melam methanesulfonate, melem methanesulfonate, a melamine.melam.melem double salt of methanesulfonic acid, guanamine methanesulfonate)], or others. Such an organic sulfonate of a nitrogen-containing cyclic compound (triazine compound) is, for example, procurable from Nissan Chemical Industries, Ltd. as "MELAM METHANESULFONATE MMS-200".

(4) Borate of Non-phosphorus Nitrogen-containing Cyclic Compound Having Amino Group The boric acid includes a non-condensed boric acid such as orthoboric acid and metaboric acid; a condensed boric acid such as tetraboric acid and boric anhydride; and others.

As a borate of a nitrogen-containing cyclic compound having an amino group, there may be mentioned a borate of an amino-group containing triazine compound, for example, a non-condensed borate [a salt of an orthoboric acid such as a melamine orthoborate (a melamine orthoborate such as mono- to trimelamine orthoborate), a melem salt, melam salt, melon salt or guanamine salt corresponding to the melamine orthoborate; a metaborate corresponding to the orthoborate], a polyborate [a melamine salt of a condensed boric acid (e.g., melamine boric anhydride, melamine tetraborate), a melem salt, melam salt, melon salt or guanamine salt corresponding to the melamine borate].

Such a borate of a nitrogen-containing cyclic compound (triazine compound) is, for example, available as "melapur" from DMS, as "STORFLAM MLB" from Joseph Storey & Co LTD, or as "BUDIT 313" from Budenheim Iberica Comercial.

These salts of an oxygen acid may be used singly or in combination.

The ratio of the nitrogen-containing cyclic compound having an amino group relative to the oxygen acid is not particularly limited to a specific one, and the former/the latter (molar ratio) is, for example, about 1/20 to 20/1, preferably about 1/10 to 10/1 (e.g., about 1/5 to 10/1), and particularly about 1/2 to 8/1. The equivalence ratio of an amino group contained in the nitrogen-containing cyclic compound relative to a salifiable site of the oxygen acid is also not particularly limited to a specific one, and is, for example, about 10/1 to 1/2, preferably about 5/1 to 1/1, and particularly about 4/1 to 1/1.

(c) Salt of Non-phosphorus Nitrogen-containing Cyclic Compound Having Amino Group with Organic Phosphoric Acid As a nitrogen-containing cyclic compound having an amino group, there may be exemplified the nitrogen-containing cyclic compound having an amino group similar to the above-mentioned (a).

As the organic phosphoric acid, for example, there may be mentioned a partial ester of the non-condensed phosphoric acid exemplified in the paragraph on the foregoing (b) [e.g., a phosphoric acid (orthophosphoric acid), a phosphorous acid], and a phosphorous acid or hypophosphorous acid having a substituent organic group. The organic phosphoric acid need only comprise at least one site capable of forming a salt with the nitrogen-containing cyclic compound having an amino group.

The phosphoric ester (organic orthophosphoric acid) includes a phosphoric mono- or diester of an alcohol (a mono- or polyhydric alcohol, a mono- or polyhydric phenol) The alcohol includes a monohydric alcohol and an aliphatic polyol exemplified in the paragraph on the polyarylate-series resin (in particular a $C_{1-10}$aliphatic monool), in addition a $C_{1-10}$aliphatic polyol such as glycerol and pentaerythritol; a $C_{2-10}$aliphatic polyol having a hetero atom, such as nitrilotrimethanol; a $C_{5-8}$alicyclic monool such as cyclopentanol and cyclohexanol (preferably a $C_{5-6}$cycloalkanol); a $C_{5-8}$ alicyclic diol such as cyclohexanediol (preferably a $C_{5-6}$cycloalkanediol); a monohydric phenol such as phenol, an alkylphenol (e.g., a mono- to tri$C_{1-20}$alkylphenol such as p- or m-cresol, 3,5-xylenol, trimethylphenol, t-butylphenol, p-octylphenol, and nonylphenol), an arylphenol (e.g., phenylphenol, benzylphenol, cumylphenol), naphthol, or hydroxybiphenyl; a monohydric aralkyl alcohol and aromatic cyclic diol exemplified in the paragraph on the polyarylate-series resin; and others.

Such a phosphate includes a mono- or di$C_{1-10}$alkyl phosphate such as methyl phosphate and dibutyl phosphate; a mono- to tetraphosphate of a $C_{2-10}$ aliphatic polyhydric alcohol such as ethylene glycol monophosphate and pentaerythritol bisphosphate; a phosphate of a monohydric phenol which may have a substituent (such as a $C_{1-4}$alkyl group) (e.g., a mono- or di$C_{6-14}$aryl phosphate which may have a $C_{1-4}$alkyl group), such as monophenyl phosphate, monocresyl phosphate, monoxylenyl phosphate, monotrimethylphenyl phosphate, diphenyl phosphate, dicresyl phosphate, dixylenyl phosphate and ditrimethylphenyl phosphate; a mono- or diphosphate of a polyhydric phenol which may have a substituent (such as a $C_{1-4}$alkyl group) (e.g., a $C_{6-14}$arylene mono- or diphosphate which may have a $C_{1-4}$alkyl group), such as phenylene bisphosphate; an alkyl-aryl phosphate [e.g., a $C_{1-10}$alkyl $C_{6-14}$aryl phosphate such as methyl phenyl phosphate (preferably a $C_{1-6}$alkyl $C_{6-10}$aryl phosphate)].

The organic phosphorous acid includes a phosphorous monoester corresponding to the above-mentioned phosphate, an organic phosphorous acid in which a hydrogen atom directly bonded to a phosphorus atom of phosphorous acid is substituted by an organic group (such as an aliphatic hydrocarbon group, an alicyclic hydrocarbon group, an aromatic hydrocarbon group), and an organic phosphorous monoester of the alcohol.

The organic phosphorous acid includes an aliphatic phosphorous acid [e.g., an alkylphosphorous acid such as methylphosphorous acid, ethylphosphorous acid, propylphosphorous acid and butylphosphorous acid; a mono or diphosphorous ester of an aliphatic polyol such as 1-hydroxyethylidene-1-phosphorous acid and 1-hydroxyethylidene-1,1-diphosphorous acid; a $C_{1-10}$alkyl-substituted phosphorous acid in which the $C_{1-10}$alkyl group may have a substituent (e.g., a hydroxyl group, a carboxyl group, an ester group), for example, a phosphonocarboxylic acid such as a phosphono$C_{1-10}$aliphatic carboxylic acid (e.g., a phosphonoacetic acid, 3-phosphonopropionic acid) or a carboxylic ester thereof (e.g., a carboxylate of a phosphonocarboxylic acid such as ethyl phosphonoacetate and ethyl 3-phosphonopropionate) (preferably a $C_{1-6}$ alkyl-substituted phosphorous acid); a $C_{1-10}$ alkylenediphosphorous acid such as ethylenebisphosphorous acid; a phosphorous acid which has a substituent aliphatic polyfunctional group having a hetero atom such as nitrilotris(methylphosphorous acid) (or [nitrilotris(methylene)]trisphosphorous acid)], an aromatic phosphorous acid [for example, a $C_{6-10}$ arylphosphorous acid such as phenylphosphorous acid and tolylphosphorous acid; a phosphonocarboxylic acid such as a phosphono$C_{7-15}$aromatic carboxylic acid (such as phosphonobenzoic acid) or a carboxylic ester thereof (e.g., a carboxylate of a phosphono aromatic carboxylic acid such as ethyl phosphonobenzoate); a phosphorous acid having a substituent aromatic polyfunctional group which may have a substituent (e.g., a $C_{1-4}$alkyl group), such as phenylenebisphosphorous acid]. Moreover, the organic phosphorous acid may be a phosphorous acid bonded to a polymer (e.g., a polyvinylphosphorous acid).

The organic phosphorous monoester includes a monoester of the above-mentioned organic phosphorous acid with the alcohol exemplified in the item on the above-mentioned phosphate, for example, a $C_{1-10}$alkylphosphorous acid mono$C_{1-6}$ alkyl ester such as methylphosphorous acid monomethyl ester; a phosphonocarboxylic acid diester (e.g., a $C_{2-6}$alkoxycarbonyl$C_{1-6}$alkylphosphorous mono$C_{1-6}$alkyl ester such as monoethyl ethoxycarbonylmethylphosphite or monoethyl ethoxycarbonylethylphosphite); a $C_{1-10}$ alkylphosphorous mono$C_{6-10}$aryl ester such as methylphosphorous monophenyl ester; a $C_{6-10}$aryl phosphorous $C_{1-6}$alkyl ester such as phenylphosphorous monomethyl ester; and a $C_{6-10}$arylphosphorous mono$C_{6-10}$aryl ester such as phenylphosphorous monophenyl ester. Incidentally, the phosphorous ester may be a cyclic phosphorous ester (e.g., 9,10-dihydro-10-hydroxy-10-oxo-9-oxa-10-phosphaphenanthrene).

The organic hypophosphorous acid includes an organic hypophosphorous acid in which an organic group (hydrocarbon group such as an aliphatic hydrocarbon group, an alicyclic hydrocarbon group and an aromatic hydrocarbon group) is bonded to phosphorus atom of the hypophosphorous acid. As such a organic hypophosphorous acid, there may be mentioned a substituted hypophosphorous acid corresponding to the substituted phosphorous acid, for example, a mono- or di$C_{1-10}$alkylhypophosphorous acid such as methylethylhypophosphorous acid and diethylhypophosphorous acid; a $C_{1-10}$alkyl$C_{6-10}$ arylhypophosphorous acid such as methylphenylhypophosphorous acid; a $C_{6-10}$ arylhypophosphorous acid such as phenylhypophosphorous acid; a phosphinicocarboxylic acid [e.g., a phosphinicodi$C_{1-6}$aliphatic carboxylic acid such as phosphinicodiacetic acid; a $C_{1-6}$alkylphosphinico-mono$C_{1-6}$ aliphatic carboxylic acid such as 3-(methylphosphinico)propionic acid, a $C_{6-10}$ arylphosphinico-mono$C_{1-6}$aliphatic carboxylic acid such as 3-(phenylphosphinico)propionic acid, a carboxylic ester of the phosphinicocarboxylic acid; a phosphinicomono- or di$C_{6-10}$arylcarboxylic acid or an carboxylic ester thereof]; a hydroxyphosphine oxide (e.g., 1-hydroxydihydrophosphonyl oxide, 1-hydroxyphosphorane oxide); and others.

The organic phosphate may be a salt of the nitrogen-containing cyclic compound having an amino group at part or whole of salifiable site(s), and both of the salts may be used. Such an organic phosphate includes a salt of an amino group-containing triazine compound, for example, a melamine salt of an organic phosphoric ester (e.g., salt of pentaerythritol bisphosphate with melamine, salt of pentaerythritol bisphosphate with dimelamine), a melamine salt of a $C_{1-6}$alkyl-substituted phosphorous acid, a melamine salt of a mono- or diphosphorous ester of a $C_{1-6}$aliphatic diol (e.g., salt of 1-hydroxyethylidene-1,1-diphosphorous acid with dimelamine, salt of 1-hydroxyethylidene-1,1-diphosphorous acid with tetramelamine), a melamine salt of a phosphorous acid which has a substituent aliphatic polyfunctional group having a hetero atom [e.g., tetramelamine salt of nitrilotris(methylphosphonic acid), hexamelamine salt of nitrilotris(methylphosphonic acid)], and a melamine salt of a $C_{6-10}$arylphosphorous acid, (melamine salt of phenylphosphorous acid, dimelamine salt of phenylphosphorous acid), a melamine salt of a phosphinicocarboxylic acid (a melamine salt of an arylphosphinicocarboxylic acid such as melamine salt of 3-(phenylphosphinico)propionic acid and dimelamine salt of 3-(phenylphosphinico)propionic acid); a melem salt, a melam salt, a melon salt or a guanamine salt, each corresponding to the melamine salt; and a double salt corresponding to the melamine salt, such as salt of pentaerythritol bisphosphate with melamine and melem). Moreover, a triazole salt corresponding to the above-mentioned salt of a triazine compound may be also used. Such an organic phosphate may be used singly or in combination.

A production method of such an organic phosphate of a nitrogen-containing compound having an amino group (in particular, an amino group-containing triazine compound) is not particularly limited to a specific one, and for example comprises stirring and mixing a solution or dispersion liquid containing the nitrogen-containing compound and the organic phosphoric acid (e.g., an aqueous solution or suspension such as a water-acetone mixed system and a water-alcohol mixed system) at an appropriate temperature (for example, about 50 to 100° C.), and separating and drying the produced precipitate to give an object product.

(d) Salt of Non-phosphorus Nitrogen-containing Cyclic Compound Having Amino Group with Nitrogen-containing Cyclic Compound Having Hydroxyl Group As a nitrogen-containing cyclic compound having an amino group, there may be mentioned the nitrogen-containing cyclic compound having an amino group mentioned in the paragraph of the above (a).

A nitrogen-containing cyclic compound having a hydroxyl group includes a compound composed of at least one hydroxyl group and a heterocycle having at least one nitrogen atom as a hetero atom thereof. As the heterocycle, there may be mentioned a heterocycle corresponding to the above nitrogen-containing cyclic compound having an amino group. The preferred nitrogen-containing ring is a 5- or 6-membered unsaturated nitrogen-containing ring having a plurality of nitrogen atoms as constituent atoms of the ring, in particular triazine, as described above.

As the triazine compound, there may be mentioned a hydroxyl group-containing triazine compound corresponding to the triazine compound exemplified in the item on the nitrogen-containing cyclic compound having an amino group. The arbitrary site(s) of a triazine ring (nitrogen atom and carbon atom, particular carbon atom) may have a hydroxyl group(s) as substituent(s). The number of the hydroxyl group is not particularly limited to a specific one, and is about 1 to 4, and particularly about 1 to 3 (e.g., about 2 to 3). The preferred hydroxyl group-containing triazine compound includes a hydroxyl group-containing 1,3,5-triazine, in particular a cyanuric acid or a derivative thereof such as cyanuric acid, isocyanuric acid, ammeline, and ammelide.

The salt of the nitrogen-containing cyclic compound having an amino group with the nitrogen-containing cyclic compound having a hydroxyl group includes a salt of a triazine with a cyanuric acid or a derivative thereof, for example, a melamine salt of cyanuric acid such as melamine cyanurate; and a melem salt, melam salt or guanamine salt (e.g., guanamine cyanurate, acetoguanamine cyanurate, benzoguanamine cyanurate) corresponding to the melamine salt.

These salts may be used singly or in combination.

The ratio of the nitrogen-containing cyclic compound having an amino group relative to the nitrogen-containing cyclic compound having a hydroxyl group is not particularly limited to a specific one, and for example the former/the latter (molar ratio) is about 1/2 to 3/1, and preferably about 1/1 to 2/1.

(e) Compound Having a Urea Unit

The compound having a urea unit (or urea compound) includes a cyclic compound having a urea unit (or cyclic urea compound). Moreover, a non-cyclic compound having a urea unit (or non-cyclic urea compound) may be also used. The urea compound may be used singly or in combination.

(Cyclic Compound Having a Urea Unit)

The cyclic compound having a urea unit (or cyclic urea compound) is not particularly limited to a specific one as far as the compound comprises at least one urea unit (—NH—CONH—) as a constituent unit of a ring thereof, and may be any of a monocyclic compound, and a condensed ring or crosslinked ring with an aromatic hydrocarbon ring. Such a cyclic urea compound includes a cyclic monoureide, a cyclic diureide, and others. These cyclic urea compounds may be used singly or in combination.

As the cyclic monoureide, for example, there may be mentioned an alkyleneurea [e.g., a $C_{1-10}$alkyleneurea such as methyleneurea, ethyleneurea and crotonylideneurea (CDU) (preferably, a $C_{1-6}$alkyleneurea)], an alkenyleneurea (e.g., a $C_{2-10}$alkenyleneurea such as vinyleneurea and cytosine), an alkynyleneurea [e.g., a $C_{2-10}$alkynyleneurea (preferably, a $C_{2-6}$alkynyleneurea)], an aryleneurea (e.g., imesatin), a ureide of a dicarboxylic acid (e.g., parabanic acid, dimethylparabanic acid, barbituric acid, 5,5-diethylbarbituric acid, dilituric acid, dialuric acid, alloxan, alloxanic acid, isocyanuric acid, uramil), a ureide of a β-aldehydic acid (e.g., uracil, 5-methyluracil (thymine), dihydrouracil, urazole, benzolyene urea), a ureide of an α-hydroxy acid [e.g., a hydantoin compound such as hydantoin, 5,5-dimethylhydantoin, 1,1-methylenebis(5,5-dimethylhydantoin) and allantoin], or a derivative thereof.

As the cyclic diureide, for example, there may be mentioned uric acid, 3-methyluric acid, pseudouric acid, acetyleneurea (glycoluril), a diureide of a α-hydroxy acid [e.g., 1,1-methylenebis(5,5-dimethylhydantoin), allantoin], a diurea such as p-urazine, a diureide of a dicarboxylic acid (e.g., alloxantin, purpuric acid), or a derivative thereof.

Among the cyclic urea compounds, the preferred compound includes a cyclic diureide having two urea units as a constituent unit of a ring thereof, in particular acetyleneurea, uric acid, and a derivative thereof.

(Non-cyclic Compound Having a Urea Unit)

The non-cyclic compound having a urea unit (non-cyclic urea compound) includes urea, an N-substituted urea which has a substituent (such as an alkyl group) [for example, an N—$C_{1-6}$alkyl form (e.g., N-methyl form, N-ethyl form), an alkylenediurea (e.g., a $C_{1-6}$alkylenediurea such as methylenediurea)], a non-cyclic ureide compound [e.g., a ureido-acid of a $C_{2-6}$dicarboxylic acid such as oxaluric acid, a ureido group-containing $C_{1-6}$monocarboxylic acid such as ureidoacetic acid, a carbamide group-containing $C_{2-6}$dicarboxylic acid such as ureidosuccinic acid, or a monoureide of a derivative thereof (such as amide, ester); a diureide of a $C_{2-6}$carboxylic acid such as allantoic acid], a non-cyclic urea condensate [e.g., a dimer of urea (such as biuret and biurea), a polymer of urea, a condensate of urea and an aldehyde compound].

(f) Tetrazole Compound

Tetrazole compound includes an amine salt or a metal salt of a monotetrazole (e.g., 5-phenyltetrazole) and a bitetrazole (e.g., 5,5'-bitetrazole). Examples of the amine salt include an amine salt of 5-phenyltetrazole and 5,5'-bitetrazole (e.g., a 2-ammonium salt, a 2-guanidine salt, a piperazine salt, a melamine salt, a guanamine salt, and a xylylenediamine salt), and others. The metal salt includes a metal salt of 5,5'-bitetrazole (e.g., an alkali metal salt such as a Na salt and a K salt; an alkaline earth metal salt such as a Ca salt, a Mg salt and a Ba salt; a Zn salt, and an Al salt), and others.

The details about these tetrazole compounds may be referred to Japanese Patent Application Laid-Open No. 51476/1993 (JP-5-51476A), Japanese Patent Application Laid-Open No. 166678/1994 (JP-6-166678A), Japanese Patent Application Laid-Open No. 294497/2001 (JP-2001-294497A), and others.

(g) (Poly)Phosphoric Acid Amide

The (poly)phosphoric acid amide is a polymer compound containing a nitrogen of an amide form and includes a condensate of a phosphoric acid exemplified in the paragraph on the oxygen acid and a compound having a unit represented by —N=C=N— or —N=C(—N<)$_2$ (such as a cyanamide derivative). Such a (poly)phosphoric acid amide is usually obtained by heating (such as burning) the above-mentioned phosphoric acid and the cyanamide derivative in the presence of at least one member (or binding agent) selected from a urea and a urea polyphosphate.

As the above-mentioned phosphoric acid, it is preferred to use a non-condensed phosphoric acid (e.g., orthophosphoric acid, metaphosphoric acid), a polyphosphoric acid, a partial ester of a phosphoric acid (e.g., ammonium polyphosphate, urea phosphate) or the like. These phosphoric acids may be used singly or in combination.

The cyanamide derivative includes a cyclic cyanamide derivative such as an amino group-containing triazine (e.g., an amino group-containing 1,3,5-triazine such as melamine, melam, melem, melon, guanamine, acetoguanamine, or benzoguanamine, an amino group-containing 1,2,4-triazine such as 3-amino-1,2,4-triazine) and an amino group-containing triazole (e.g., an amino group-containing 1,3,4-triazole such as 2,5-diamino-1,3,4-triazole); a non-cyclic cyanamide derivative such as a guanidine compound [e.g., guanidine, a guanidine derivative such as dicyandiamide or guanylurea)]; or others. The preferred cyanamide derivative includes an amino group-containing 1,3,5-triazine, and guanidine or a derivative thereof, in particular melamine. Such a cyanamide derivative may be used singly or in combination.

These (poly)phosphoric acid amides may be used singly or in combination. For example, the polyphosphoric acid amide may be referred to Japanese Patent Application Laid-Open No. 138463/1995 (JP-7-138463A). Such a polyphosphoric acid amide may be produced by methods described in Japanese Patent Publication No. 2170/1978 (JP-53-2170B), Japanese Patent Publication No. 15478/1978 (JP-53-15478B), Japanese Patent Publication No. 49004/1980 (JP-55-49004B), Japanese Patent Application Laid-Open No. 126091/1986 (JP-61-126091A), Japanese Patent Application Laid-Open No. 81691/1998 (JP-10-81691A), U.S. Pat. No. 4,043,987, or others. The polyphosphoric acid amide is commercially available as "SUMISAFE PM" (manufactured by Sumitomo Chemical Co., Ltd.), "Taien S" (manufactured by Taihei Chemical Industrial Co., Ltd.), "APINON MPP" (manufactured by Sanwa Chemical Co., Ltd.), "Melapur" (manufactured by DSM), "Exolit" (manufactured by Clariant Ltd.), and "AMGARD" (manufactured by Albright & Wilson Corp.).

Among these nitrogen-containing compounds (C3), preferred are a salt of a non-phosphorus amino group-containing compound having a triazine backbone with a component selected from the group consisting of cyanuric acid, isocyanuric acid, sulfuric acid, a (poly)phosphoric acid, sulfonic acid, an organic phosphorous acid and an organic hypophosphorous acid (for example, melamine cyanurate, a melamine salt of a polyphosphoric acid, a melamine.melam.melem double salt (or complex) of a polyphosphoric acid, melamine sulfate, melam methanesulfonate, a melamine salt of an organic phosphorous acid, and a melamine salt of an organic hypophosphorous acid), a cyclic diureide (e.g., uric acid, and acetyleneurea), a bitetrazole (e.g., a 2-ammonium salt, 2-aminoguanidine salt, a piperazine salt, a melamine salt, an alkaline earth metal salt, a Zn salt, or an Al salt of 5,5'-bitetrazole), and a reaction product (salt) of a (poly)phosphoric acid and a cyanamide or a derivative thereof (e.g., a polyphosphoric acid amide).

These nitrogen-containing compounds (C3) may be treated with the use of a surface-modifying agent such as an epoxy-series compound, a coupling agent (e.g., a silane-series compound, a titanate-series compound, an aluminum-series compound), and a chromium-series compound. Moreover, the nitrogen-containing compound (C3) may be coating-treated with a metal, a glass, a cyanurate of a triazine derivative, a thermosetting resin (e.g., a phenol resin, a urea resin, a melamine resin, an aniline resin, a furan resin, a xylene resin, or a co-condensed resin thereof, an unsaturated polyester resin, an alkyd resin, a vinyl ester resin, a diallylphthalate resin, an epoxy resin, a polyurethane resin, a silicon-containing resin, a polyimide), a thermoplastic resin, or the like. Among these coat-treatments, the nitrogen-containing compound is usually coating-treated with a thermosetting resin (e.g., a phenol resin, an epoxy resin). For example, a coat-treatment method for the nitrogen-containing compound (C3) may be referred to Japanese Patent Application Laid-Open No. 125489/1977 (JP-52-125489A), Japanese Patent Application Laid-Open No. 21704/1987 (JP-62-21704A), Japanese Patent Application Laid-Open No. 110254/1988 (JP-63-110254A), Japanese Patent Application Laid-Open No. 53569/1996 (JP-8-53569A), Japanese Patent Application Laid-Open No. 53574/1996 (JP-8-53574A), Japanese Patent Application Laid-Open No. 169120/2000 (JP-2000-169120A), Japanese Patent Application Laid-Open No. 131293/2001 (JP-2001-131293A), and others. The proportion of the nitrogen-containing compound (C3) relative to a coating component is not particularly limited to a specific one. For example, the coating component is about 0.1 to 20% by weight, and preferably about 0.1 to 10% by weight (e.g., about 0.1 to 8% by weight), relative to a flame retardant to be coated.

(C4) Inorganic Metal Compound

The inorganic metal compound includes a metal salt of an inorganic acid, a metal oxide, a metal hydroxide, a metal sulfide, and others. As the inorganic acid constituting the metal salt of the inorganic acid, there may be used various inorganic acids such as a phosphoric acid, a boric acid, a stannic acid, a molybdic acid, and a tungstic acid.

The metal forming a salt with the inorganic acid includes an alkali metal (e.g., potassium, sodium); an alkaline earth metal (e.g., magnesium, calcium, barium); a transition metal [e.g., the metal of the Group 3A of the Periodic Table of Elements (such as scandium); the metal of the Group 4A of the Periodic Table of Elements (such as titanium); the metal of the Group 5A of the Periodic Table of Elements (such as vanadium); the metal of the Group 6A of the Periodic Table of Elements (such as chromium and molybdenum); the metal of the Group 7A of the Periodic Table of Elements (such as manganese); the metal of the Group 8 of the Periodic Table of Elements (such as iron, cobalt, nickel and palladium); and the metal of the Group 1B of the Periodic Table of Elements (such as copper and silver)], the metal of the Group 2B of the Periodic Table of Elements (such as zinc), the metal of the Group 3B of the Periodic Table of Elements (such as aluminum), the metal of the Group 4B of the Periodic Table of Elements (such as tin and lead), and the metal of the Group 5B of the Periodic Table of Elements (such as antimony and bismuth). These metals may be used singly or in combination.

(Metal Phosphate)

The phosphoric acid includes a non-condensed phosphoric acid [such as orthophosphoric acid, metaphosphoric acid, phosphorous acid, and hypophosphorous acid], and a condensed phosphoric acid [such as hypophosphoric acid salt, pyrophosphoric acid salt, a polyphosphoric acid salt (e.g., triphosphoric acid salt, tetraphosphoric acid salt), a polymetaphosphoric acid, and an anhydrous phosphoric acid salt]. In particular, a non-condensed phosphoric acid is preferred.

Examples of the metal include an alkali metal salt (e.g., a Li salt, a Na salt, and a K salt), an alkaline earth metal salt (e.g., a Mg salt, and a Ca salt), a metal salt of the Group 2B of the Periodic Table of Elements (e.g., a Zn salt), and a metal salt of the Group 3B of the Periodic Table of Elements (e.g., an Al salt). Among them, the metal preferably includes a polyvalent metal, for example, the alkaline earth metal, the transition metal and the metals of the Groups 2B and 3B of the Periodic Table of Elements, particularly the alkaline earth metal.

As the metal phosphate (or metal salt of a phosphoric acid), there may be mentioned a salt of the phosphoric acid with the polyvalent metal, in addition a hydrogenphosphate corresponding to the polyvalent metal phosphate. The metal salt may have a ligand (e.g., hydroxo, halogen).

As the metal phosphate, there may be used, for example, a pyrophosphate (such as $Ca_2P_2O_7$), a polymetaphosphate (such as $Ca_3(P_3O_9)_2$), a salt of anhydrous phosphoric acid (such as $Ca_2(P_4O_{12})$ and $Ca_5(P_3O_{10})_2$), in addition a condensed phosphate (such as $Ca_5(PO_4)_3(OH)$ and $Ca_5(PO_4)_3(F, Cl)$) or an aluminum (hypo)phosphite, and there is preferably used a hydrogenphosphate.

Such a hydrogenphosphate includes, for example, a non-condensed hydrogenphosphate such as an alkaline earth metal hydrogenphosphate [e.g., a magnesium hydrogen orthophosphate (such as magnesium hydrogenphosphate and magnesium dihydrogenphosphate), a calcium hydrogen orthophosphate (such as calcium dihydrogenphosphate and calcium secondary phosphate)]; a transition metal hydrogenphosphate [e.g., manganese hydrogenphosphate (such as manganese (III) hydrogenphosphate), iron hydrogenphosphate (such as $Fe(H_2PO_4)_3$)]; a hydrogenphosphate of the metal of the Group 2B of the Periodic Table of Elements (such as zinc hydrogenphosphate and cadmium hydrogenphosphate); a hydrogenphosphate of the metal of the Group 3B of the Periodic Table of Elements (such as aluminum hydrogenphosphate); and a hydrogenphosphate of the metal of the Group 4B of the Periodic Table of Elements (such as tin hydrogenphosphate). Among them, a substantially anhydrous metal hydrogenphosphate, particularly an alkaline earth metal hydrogenphosphate [such as magnesium dihydrogenphosphate, calcium dihydrogenphosphate and calcium secondary phosphate ($CaHPO_4$)], is preferred.

(Metal Borate)

The boric acid preferably includes a non-condensed boric acid such as orthoboric acid and metaboric acid; a condensed boric acid such as pyroboric acid, tetraboric acid, pentaboric acid and octaboric acid; and a basic boric acid.

As the metal, the alkali metal may be used, and it is preferred to use a polyvalent metal such as the alkaline earth metal, the transition metal and the metal of the Group 2B of the Periodic Table of Elements.

The metal borate is usually a hydrous salt and includes, for example, a non-condensed borate [e.g., a non-condensed borate of an alkaline earth metal (such as calcium orthoborate and calcium metaborate); a non-condensed borate of a transition metal (such as manganese orthoborate and copper metaborate); a non-condensed borate of the metal of the Group 2B of the Periodic Table of Elements (such as zinc metaborate and cadmium metaborate), in particular metaborate], a condensed borate [e.g., a condensed borate of an alkaline earth metal (such as trimagnesium tetraborate and calcium pyroborate); a condensed salt of a transition metal (such as manganese tetraborate and nickel diborate); a condensed borate of the metal of the Group 2B of the Periodic Table of Elements (such as zinc tetraborate and cadmium tetraborate)], and a basic borate (e.g., a basic borate of the metal of the Group 2B of the Periodic Table of Elements, such as basic zinc borate and basic cadmium borate). Moreover, a hydrogenborate corresponding to the borate (e.g., manganese hydrogenorthoborate) may be also employed. In particular, a borate of the alkaline earth metal or metal of the Group 2B of the Periodic Table of Elements (a non-condensed or condensed borate) (particularly a (hydrous) zinc borate, a (hydrous) calcium borate) is preferred.

(Metal Stannate)

Exemplified as a stannic acid is stannic acid, metastannic acid, orthostannic acid, hexahydroxostannic acid, or others. As a metal, there may be exemplified an alkali metal, or a polyvalent metal such as an alkaline earth metal, a transition metal, and the metal of the Group 2B of the Periodic Table of Elements. The metal stannate is usually a hydrous salt and includes, for example, an alkali metal stannate (e.g., sodium stannate, potassium stannate), an alkaline earth metal stannate (e.g., magnesium stannate), a transition metal stannate (e.g., cobalt stannate), and a stannate of the metal of the Group 2B of the Periodic Table of Elements (e.g., zinc stannate). Among these metal stannates, a stannate of the metal of the Group 2B of the Periodic Table of Elements, in particular a (hydrous) zinc stannate, is preferred.

(Metal Molybdate)

As the metal molybdate, there may be used various metal salts corresponding to the above-mentioned metal phosphates and metal borates.

For example, the metal molybdate includes (hydrous) zinc molybdate [e.g., trade name BOWEN "SK-26", "SKN-301", "SKN-545", "SKR-803" and "SKR-805" (manufactured by Kikuchi Color & Chemicals Corporation), and others.

(Metal Tungstate)

As the metal tungstate, there may be used various metal salts corresponding to the above-mentioned metal phosphates and metal borates.

The metal tungstate includes, for example, (hydrous) zinc tungstate.

As a metal salt of an inorganic acid (oxygen acid) other than a phosphoric acid, a boric acid, a stannic acid, molybdic acid, and tungstic acid, there may be used various metal salts corresponding to the metal phosphate and metal borate.

Among the inorganic metal compounds, the metal oxide includes, for example, molybdenum oxide, tungstic oxide, titanium oxide, zirconium oxide, tin oxide, copper oxide, zinc oxide, aluminum oxide, nickel oxide, iron oxide, manganese oxide, antimony trioxide, antimony tetraoxide, antimony pentoxide, and others.

The metal hydroxide includes, for example, aluminum hydroxide, magnesium hydroxide, tin hydroxide, and zirconium hydroxide.

As the metal sulfide, for example, there may be mentioned molybdenum sulfide, tungstic sulfide, zinc sulfide, and others.

These inorganic metal compounds (C4) may be used singly or in combination.

(C5) Sulfur-containing Compound

The sulfur-containing compound includes an organic sulfonic acid [for example, an alkanesulfonic acid, a perfluoroalkanesulfonic acid (e.g., perfluorobutanesulfonic acid), an arenesulfonic acid (e.g., benzenesulfonic acid, toluenesulfonic acid, naphthalenesulfonic acid, solfobenzoic acid, sulfophthalic acid, sulfonaphthoic acid, phenolsulfonic acid, naphtholsulfonic acid, and diphenylsulfone-3-sulfonic acid), and a sulfonated polymer (e.g., a sulfonated polystyrene, a sulfonated polysulfone, a sulfonated polyethersulfone, and a sulfonated polyphenylene oxide)], sulfamic acid, an organic sulfamic acid, a salt of an organic sulfonic acid amide (e.g., an ammonium salt, an alkali metal salt, an alkaline earth metal salt), and others.

(C6) Silicon-containing Compound

The silicon-containing compound includes a (poly)organosiloxane (e.g., a resin, an elastomer, and an oil), a zeolite, and others. As the (poly)organosiloxane, there may be mentioned a homopolymer such as a dialkylsiloxane (e.g., dimethylsiloxane), an alkylarylsiloxane (e.g., phenylmethylsiloxane), a diarylsiloxane, and a monoorganosiloxane (for instance, a polydimethylsiloxane, a polyphenylmethylsiloxane); or a copolymer; or others. Moreover, there may be also used a branched organosiloxane (a polyorganosilsesquioxane such as a polymethylsilsesquioxane, a polymethylphenylsilsesquioxane, and a polyphenylsilsesquioxane) [e.g., trade name "XC99-B5664" (manufactured by Toshiba Silicone Co., Ltd.), trade names "X-40-9243", "X-40-9244" and "X-40-9805" (manufactured by Shin-Etsu Chemical Co., Ltd.), Japanese Patent Application Laid-Open No. 41219/2001 (JP-2001-41219A), compounds described in Japanese Patent Application Laid-Open No. 159995/2000 (JP-2000-159995A), Japanese Patent Application Laid-Open No. 158363/1999 (JP-11-158363A), Japanese Patent Application Laid-Open No. 182832/1998 (JP-10-182832A), and Japanese Patent Application Laid-Open No. 139964/1998 (JP-10-139964A)], a modified (poly)organosiloxane (for example, a modified silicone) having substituent(s) such as epoxy group, hydroxyl group, carboxyl group, amino group, and ether group in the end or main chain of the molecule [e.g., Trade names "Si POWDER "DC4-7051", "DC4-7105", "DC1-9641"" (manufactured by Dow Corning Toray Silicone Co., Ltd.)].

[Proportion of Each Component]

(Proportion of Organic Phosphorus Compound (B) to be Used)

In the present invention, since the specific organic phosphorus compound (B) is used as a flame retardant, high flame retardancy can be imparted to a wide variety of base resins at a small amount of the flame retardant. The proportion of the organic phosphorus compound (B) is about 0.1 to 100 parts by weight, preferably about 1 to 80 parts by weight, and more preferably 5 to 70 parts by weight, relative to 100 parts by weight of the base resin (A). In the case where the amount of the organic phosphorus compound (B) is too large relative to the base resin (A), the mechanical properties of the resin composition is deteriorated.

(Proportion of Flame-retardant Auxiliary (C) to be Used)

The proportion of the flame-retardant auxiliary (C) is about 0.01 to 500 parts by weight, preferably about 0.1 to 300 parts by weight, and more preferably about 1 to 200 parts by weight, relative to 100 parts by weight of the base resin (A).

The proportion of the phosphorus-containing compound (C1) is about 0.1 to 100 parts by weight, preferably about 1 to 50 parts by weight, and more preferably about 3 to 30 parts by weight, relative to 100 parts by weight of the base resin (A).

As the base resin (A) and the aromatic resin (C2), different kinds of resins from each other are usually employed. In such a case, the proportion (weight ratio) of the base resin relative to the aromatic resin [the base resin/the aromatic resin] is about 50/50 to 100/0, preferably about 55/45 to 100/0, and more preferably about 60/40 to 100/0.

The proportion of the nitrogen-containing compound (C3) is about 0.1 to 100 parts by weight, preferably about 1 to 90 parts by weight, and more preferably about 3 to 80 parts by weight, relative to 100 parts by weight of the base resin (A).

The proportion of the inorganic metal compound (C4) is about 0.1 to 100 parts by weight, preferably about 0.1 to 50 parts by weight, and more preferably about 3 to 45 parts by weight, relative to 100 parts by weight of the base resin (A).

The proportion of the sulfur-containing compound (C5) is about 0.001 to 50 parts by weight, preferably about 0.01 to 30 parts by weight, and more preferably about 0.1 to 10 parts by weight, relative to 100 parts by weight of the base resin (A).

The proportion of the silicon-containing compound (C6) is about 0.001 to 50 parts by weight, preferably about 0.01 to 30 parts by weight, and more preferably about 0.1 to 10 parts by weight, relative to 100 parts by weight of the base resin (A).

The total amount of the organic phosphorus compound (B) and the flame-retardant auxiliary (C) is about 0.01 to 300 parts by weight, preferably about 0.1 to 200 parts by weight, and more preferably about 1 to 200 parts by weight (e.g., about 5 to 150 parts by weight), relative to 100 parts by weight of the base resin (A).

The proportion (weight ratio) of the organic phosphorus compound (B) relative to the flame-retardant auxiliary (C) [the former/the latter] may be selected from the wide range of about 1/100 to 10000/100 (e.g., about 1/100 to 1000/100). For example, the ratio is about 5/100 to 1000/100, preferably about 10/100 to 700/100, and more preferably about 15/100 to 500/100.

[Additive]

If necessary, the flame-retardant resin composition of the present invention may comprise a variety of additives (for example, other flame-retardant, a dripping inhibitor, an antioxidant, a stabilizer). The total content of the additive(s) is about 0.01 to 50 parts by weight, preferably about 0.1 to 30 parts by weight, and more preferably about 1 to 20 parts by weight, relative to 100 parts by weight of the base resin (A).

(Other Flame Retardant)

Incidentally, the flame-retardant resin composition of the present invention may comprise, in order to further impart flame retardancy to the composition, other flame retardant(s), for example an alcohol-based flame retardant, an inorganic flame retardant, a radical-generating organic flame retardant, and others.

Examples of the alcohol-based flame retardant include a polyhydric alcohol (e.g., pentaerythritol), an oligomeric polyhydric alcohol (e.g., dipentaerythritol, tripentaerythritol), an esterified polyhydric alcohol, a substituted alcohol, a cellulose compound (e.g., cellulose, hemicellulose, lignocellulose, pectocellulolse, adipocellulose), and a saccharide compound (e.g., a monosaccharide, a polysaccharide).

The radical-generating organic flame retardant includes a benzyl radical-generating compound [e.g., 2,3-diphenyl-2,3-dimethylbutane, a poly($\alpha,\alpha,\alpha',\alpha'$-tetramethyl-1,3-xylylene), and a poly($\alpha,\alpha,\alpha',\alpha'$-tetramethyl-1,4-xylylene)], a nitroxide-generating compound [2,2,6,6-tetramethyl-1,4-dihydroxypiperidine, 1-methoxy-2,2,6,6-tetramethyl-4-hydroxy-piperidine, or a carboxylic ester derivative thereof], and others. The inorganic flame retardant also includes an expansive graphite.

These other flame retardants may be used singly or in combination.

The content of other flame retardant may for example be selected within the range of about 0.01 to 50 parts by weight, preferably about 0.05 to 30 parts by weight, and particularly about 0.1 to 20 parts by weight, relative to 100 parts by weight of the base resin (A).

Moreover, the flame retardant resin composition of the present invention may comprise an antioxidant or a stabilizer to maintain thermal stability of the composition for a long term. The antioxidant or the stabilizer includes a phenol-series (e.g., hindered phenols), amine-series (e.g., hindered amines), phosphorous-series, sulfur-series, hydroquinone-series, or quinoline-series antioxidant (or stabilizer), and others.

The phenol-series (phenolic) antioxidant preferably includes a hindered phenol, e.g., a $C_{2-10}$ alkanediol-bis[3-(3,5-di-branched $C_{3-6}$alkyl-4-hydroxyphenyl)propionate] such as 1,6-hexanediol-bis[3-(3,5-di-t-butyl-4-hydroxyphenyl) propionate]; e.g., a di- or trioxy$C_{2-4}$alkanediol-bis[3-(3,5-di-branched $C_{3-6}$alkyl-4-hydroxyphenyl)propionate] such as triethylene glycol-bis[3-(3-t-butyl-5-methyl-4-hydroxyphenyl) propionate]; e.g., a $C_{3-8}$alkanetriol-bis[3-(3,5-di-branched $C_{3-6}$alkyl-4-hydroxyphenyl)propionate] such as glycerin-tris [3-(3,5-di-t-butyl-4-hydroxyphenyl)propionate]; and e.g., a $C_{4-8}$alkylene tetraol-tetrakis[3-(3,5-di-branched $C_{3-6}$alkyl-4-hydroxyphenyl)propionate] such as pentaerythritol-tetrakis [3-(3,5-di-t-butyl-4-hydroxyphenyl)propionate].

The amine-series antioxidant includes a hindered amine, for example, a tri- or tetra$C_{1-3}$alkylpiperidine or a derivative thereof [e.g., 2,2,6,6-tetramethylpiperidine which may have a substituent (such as methoxy, benzoyloxy or phenoxy group) at 4-position], a bis (tri-, tetra- or penta$C_{1-3}$alkylpiperidine) $C_{2-20}$alkanedicarboxylic ester [e.g., bis(2,2,6,6-tetramethyl-4-piperidyl)oxalate, a melonate, adipate, sebacate or terephthalate corresponding to the oxalate; and bis(1,2,2,6,6-pentamethyl-4-piperidyl)sebacate], 1,2-bis(2,2,6,6-tetramethyl-4-piperidyloxy)ethane, phenylnaphthylamine, N,N'-diphenyl-1,4-phenylenediamine, and N-phenyl-N'-cyclohexyl-1,4-phenylenediamine.

The phosphorus-containing stabilizer (or antioxidant) includes, for example, triisodecyl phosphite, trisnonylphenyl phosphite, diphenylisodecyl phosphite, phenyldiisodecyl phosphite, 2,2-methylenebis(4,6-di-t-butylphenyl)octyl phosphite, 4,4'-butylidenebis(3-methyl-6-t-butylphenyl) ditridecyl phosphite, a tris(branched $C_{3-6}$alkylphenyl)phosphite [e.g., tris(2,4-di-t-butylphenyl)phosphite, tris(2-t-butyl-4-methylphenyl)phosphite, tris(2,4-di-t-amylphenyl) phosphite], a (branched $C_{3-6}$alkylphenyl)phenyl phosphite [e.g., bis(2-t-butylphenyl)phenyl phosphite, 2-t-butylphenyl-diphenyl phosphite], tris(2-cyclohexylphenyl)phosphite, a bis($C_{1-9}$alkylaryl)pentaerythritol diphosphite [e.g., bis(2,4-di-t-butylphenyl)pentaerythritol diphosphite, bis(2,4-di-t-butyl-4-methylphenyl)pentaerythritol diphosphite, bis(2,6-di-t-butyl-4-methylphenyl)pentaerythritol diphosphite, bis (nonylphenyl)pentaerythritol diphosphite], a triphenyl phosphate-series stabilizer (e.g., 4-phenoxy-9-α-(4-hydroxyphenyl)-p-cumenyloxy-3,5,8,10-tetraoxa-4,9-diphosphaspiro[5.5]undecane, tris(2,4-di-t-butylphenyl)phosphate], and a diphosphonite-series stabilizer (e.g., tetrakis(2, 4-di-t-butyl)-4,4'-biphenylene diphosphonite). The phosphorus-containing stabilizer usually has a branched $C_{3-6}$alkylphenyl group (particularly, t-butylphenyl group).

The hydroquinone-series antioxidant includes, for example, 2,5-di-t-butylhydroquinone, and the quinoline-series antioxidant includes, for example, 6-ethoxy-2,2,4-trimethyl-1,2-dihydroquinone. The sulfur-series antioxidant includes, for example, dilaurylthiodipropionate, distearylthiodiproionate, and others.

These antioxidants may be used singly or in combination. The content of the antioxidant may for example be selected within the range of about 0.01 to 5 parts by weight, preferably about 0.05 to 3 parts by weight, and particularly about 0.1 to 2 parts by weight, in the resin of the flame-retardant resin composition.

Further, to the flame-retardant resin composition of the present invention may be added a dripping inhibitor such as a fluorine-containing resin. Dripping of kindling material and a molten upon combustion is inhibited by the addition of a dripping inhibitor. As the fluorine-containing resin, there may be mentioned a homo- or copolymer of a fluorine-containing monomer such as tetrafluoroethylene, chlorotrifluoroethylene, vinylidene fluoride, hexafluoropropylene and perfluoroalkyl vinyl ether; and a copolymer of the fluorine-containing monomer and a copolymerizable monomer such as ethylene, propylene and acrylate. Examples of the fluorine-containing resin (or fluorine-series resin) are a homopolymer such as a polytetrafluoroethylene, a polychlorotrifluoroethylene and a polyvinylidene fluoride; and a copolymer such as a tetrafluoroethylene-hexafluoropropylene copolymer, a tetrafluoroethylene-perfluoroalkyl vinyl ether copolymer, an ethylene-tetrafluoroethylene copolymer and an ethylene-chlorotrifluoroethylene copolymer. These fluorine-containing resins may be used singly or in combination.

The fluorine-containing resin may be used in the form of particles, and the mean particle size may for example be about 10 to 5,000 μm, preferably about 100 to 1,000 μm, and more preferably about 100 to 700 μm.

The content of the fluorine-containing resin is, for example, about 0.01 to 18 parts by weight, preferably about 0.1 to 5 parts by weight, and more preferably about 0.1 to 3 parts by weight, in the flame-retardant resin composition.

Further, the flame-retardant resin composition of the present invention may comprise other additive(s) for any purpose. As other additive(s), there may be mentioned a stabilizer (e.g., an ultraviolet ray absorbing agent, a heat stabilizer, a weather-resistant stabilizer), a lubricant, a mold-release agent (releasing agent), a coloring agent (colorant), a plasticizer, a nucleating agent, an impact resistance improver (impact modifier), a slip-(friction/wear) improving agent, a foaming agent, a reactive polymer modifier [e.g., an ethylene-(meth)acrylate-glycidyl (meth)acrylate copolymer (such as an ethylene-methacrylate-glycidyl methacrylate copolymer, and an ethylene-ethyl acrylate-glycidyl methacrylate copolymer), and an epoxy-modified polystyrene (e.g., EGMA-g-PS4)].

[Filler]

The flame-retardant resin composition of the present invention may be modified with the use of a filler to further improve mechanical strength, rigidity, thermal stability, electrical property and others. The filler includes a fibrous filler, and a non-fibrous filler (such as a plate-like one and a particulate one).

As the fibrous filler, there may be mentioned a glass fiber, an asbestos fiber, a carbon fiber, a silica fiber, a fibrous wollastonite, a silica-alumina fiber, a zirconia fiber, a potassium titanate fiber, a metal fiber, and an organic fiber having high melting point (e.g., an aliphatic or aromatic polyamide, an aromatic polyester, a fluorine-containing resin, an acrylic resin such as a polyacrylonitrile).

Among the non-fibrous fillers, the plate-like (or layered) filler includes a kaolin, a talc, a glass flake, a mica, a graphite, a variety of metal foil, a layered phosphate (e.g., zirconium phosphate, and titanium phosphate), and others.

The particulate or amorphous filler includes a carbon black, a white carbon, a silicon carbide, a silica, a powder of quartz, a glass bead, a glass powder, a milled fiber (such as a milled glass fiber), a silicate [e.g., a calcium silicate, an aluminum silicate, a clay, a diatomite), a metal oxide (e.g., an iron oxide, a titanium oxide, a zinc oxide, an alumina), a metal carbonate (e.g., a calcium carbonate, a magnesium carbonate), a metal sulfate (e.g., a calcium sulfate, a barium sulfate), and a metal powder.

The preferred fibrous filler includes a glass fiber and a carbon fiber. The preferred non-fibrous filler includes a particulate or plate-like filler, in particular a glass bead, a mild fiber, a kaolin, a talc, a mica, and a glass flake.

Moreover, the particularly preferred filler includes a glass fiber, for example, a glass fiber having high strength and rigidity (e.g., chopped strand).

In the case using the filler, the proportion of the filler in the flame-retardant resin composition is, for example, about 1 to 60% by weight, preferably about 1 to 50% by weight, and more preferably about 1 to 45% by weight.

On the occasion of use of the filler, a sizing agent or surface-treatment agent may be optionally employed. Such a sizing agent or surface-treatment agent includes a functional compound. As the functional compound, there may be mentioned, for example, an epoxy-series compound, silane-series compound, a titanate-series compound, and preferably an epoxy-series compound (particularly, a bisphenol A-based epoxy resin, a novolak epoxy resin).

The filler may be size-treated or surface-treated with use of the sizing agent or surface-treatment agent. The time to treat the filler may be the same time with addition thereof, or the time precedent to addition thereof.

Moreover, the amount of the functional surface-treatment agent or sizing agent to be used in combination with the filler is about not more than 5% by weight, and preferably about 0.05 to 2% by weight relative to the filler.

The flame retardant of the present invention imparts high flame retardancy to a resin probably because the flame retardant facilitates carbonization of the resin surface on burning. Moreover, the combination use of a specific organic phosphorus compound and a specific flame-retardant auxiliary efficiently makes a base resin high flame retardant in a small amount of the flame retardant, and does not bleed out and deteriorate heat stability.

[Production Process of Flame-retardant Resin Composition]

The flame-retardant resin composition of the present invention may be a particulate mixture or a molten mixture, and it may be prepared by mixing the base resin with the flame retardant, the flame-retardant auxiliary, and if necessary, the dripping inhibitor or other additive(s) in a conventional manner. The available method may include, for example, (1) a method comprising mixing each component, kneading and extruding the resulting mixture into pellets with a uniaxial or biaxial extruder, and molding the pellets, (2) a method comprising once making pellets (master batch) different in formulation, mixing (diluting) the pellets in a certain proportion, and molding the resulting pellets to give a shaped article having a predetermined formulation, or (3) a method comprising directly charging one or not less than 2 of each component to give the composition, and molding the composition with a molding machine. Further, as a production process of pellets with an extruder, for example, the following processes are available: (1) a production process comprising precedently melt-mixing all components except for a brittle or fragile filler such as a glass-series filler, and then mixing the brittle or fragile filler with the mixture; (2) a production process comprising precedently melt-mixing all components except for a phosphorus-containing compound and a brittle or fragile filler, and then mixing the brittle or fragile filler and the phosphorus-containing compound with the mixture simultaneously (in the same feed position); (3) a production process comprising precedently melt-mixing all components except for a phosphorus-containing compound and a brittle or fragile filler, and then mixing the brittle or fragile filler and the phosphorus-containing compound with the mixture sequentially (indifferent feed positions); and other processes. In the pellet production with use of an extruder, a small amount of a dispersing auxiliary agent such as an aromatic compound or halogen-containing compound (e.g., benzene, toluene, xylene, chlorobenzene, trichlorobenzene, chloroform, trichloroethylene) may be blended in the extrusion step. The dispersing auxiliary agent is removed from the kneaded resin through a vent-port of the extruder. Moreover, in the preparation of the composition for a shaped article, dispersion of other component(s) (e.g., a flame retardant) may be improved advantageously by mixing a powdery or particulate base resin component (e.g., a powder or particulate obtained by pulverizing a part or all of the polyester-series resin) with the other component(s) and melt-kneading the mixture.

Incidentally, for imparting handling, it is usable the master batch prepared by melt-mixing a non-resinous component(s) (e.g., the specific organic phosphorus compound, the phosphorus-containing compound, the nitrogen-containing compound, the inorganic metal compound, the sulfur-containing compound, and a silicon-containing compound) and a resinous component(s) (e.g., the base resin, the aromatic resin). In particular, when a red phosphorus is used in combination, often a master batch is prepared. Moreover, when a master batch comprises the resinous component(s), part of the base resin is used as a master batch in many cases.

The master batch includes, for example, (a) a master batch comprising a part of a base resin, and a non-resinous component; (b) a master batch comprising an aromatic resin and a non-resinous component; (c) a master batch comprising an aromatic resin, a resinous flame retardant, and a non-resinous component; (d) a master batch comprising a part of a base resin, an aromatic resin, and a non-resinous component; (e) a master batch comprising a part of a base resin, a resinous component, and a non-resinous component; and (f) a master batch comprising a part of a base resin, an aromatic resin, a resinous component, and a non-resinous component.

If necessary, the master batch may comprise a variety of additives such as a fluorine-containing resin, an antioxidant, a phosphorus-containing stabilizer, and a filler.

The flame-retardant resin composition can be produced by melt-mixing thus obtained master batch, a base resin, and if necessary a residual component(s).

Moreover, the flame-retardant resin composition of the present invention may be molded (or shaped) by melt-kneading, and then conducting a conventional manner such as extrusion molding, injection molding and compression molding.

According to the present invention, the combination use of a base resin, a specific organic phosphorus compound and a flame-retardant auxiliary imparts flame retardancy to the resin even in small amount of the flame retardant without using a halogen-series flame retardant, and realizes flame retardancy at a high level. Moreover, mold deposit and bleeding out (or blooming) of the flame retardant is effectively inhibited without deteriorating resin properties, and high flame retardancy is achieved. Further, a shaped article having improved flame retardancy can be obtained by the use of such a resin composition.

INDUSTRIAL APPLICABILITY

The shaped article formed with the resin composition of the present invention is excellent in flame retardancy and molding processability (mold-processability), and may be utilized for various purposes. For example, the shaped article is suitable for an electric or electronic device part, an office automation (OA) device part, a household electrical appliance part, an automotive part, a mechanical device part, a packaging material or a case, and others.

EXAMPLES

The following examples are intended to describe this invention in further detail and should by no means be interpreted as defining the scope of the invention.

Incidentally, flame retardancy and blooming properties of a resin composition were evaluated on the basis of the following tests.

(Evaluation of Flame Retardancy)

In accordance with UL94, the flame retardancy was evaluated using a test piece 1.6 mm thick.

(Evaluation of Blooming Properties)

A test piece 1.6 mm thick for burning was heated at 150° C. for 5 hours, and visually observed for the state of bleeding out in the surface of the test piece. The blooming properties were evaluated on the basis of the following judgmental standard.

"A": no bleeding out was observed
"B": slight bleeding out was observed
"C": remarkable bleeding out was observed

[Base Resin A]
A-1: Polybutylene terephthalate ["DURANEX", intrinsic viscosity=0.83, manufactured by Polyplastics Co., Ltd.]
A-2: Polystyrene ["TOYO STYROL G19", manufactured by Toyo Styrene Co., Ltd.]
A-3: Acrylonitrile-styrene copolymer ["CEVIAN JD", manufactured by Daicel Chemical Industries, Ltd.]
A-4: Polyethylene terephthalate ["BELLPET EFG 10", manufactured by Kanebo Gohsen, Ltd.]
A-5: Polybutylene terephthalate copolymer modified with isophthalic acid in 12 mol % thereof [intrinsic viscosity=1.0]
A-6: Polycarbonate ["PANLITE L1225", manufactured by Teijin Chemicals Ltd.]
A-7: Acrylonitrile-butadiene-styrene copolymer ["CEVIAN DP611", manufactured by Daicel Chemical Industries, Ltd.]
A-8: Liquid crystalline polyester ["RODRUN LC3000", manufactured by Unitika Ltd.]
A-9: Liquid crystalline polyester ["VECTRA A950", manufactured by Polyplastics Co., Ltd.]
A-10: Poly(2,6-dimethyl-1,4-phenylene)oxide ["PPE POLYMER YPX-100F", manufactured by Mitsubishi Gas Chemical Co., Inc.]
A-11: Nylon-6 ["UBE NYLON 6", manufactured by Ube Industries, Ltd.]
A-12: Polytrimethylene terephthalate [intrinsic viscosity=1.0]

[Flame Retardant B]
B-1: 10-(2,5-Dihydroxyphenyl)-10H-9-oxa-10-phosphaphenanthrene-10-oxide
B-2: 10-(2,7-Dihydroxynaphthyl)-10H-9-oxa-10-phosphaphenanthrene-10-oxide
B-3: Diphenylphosphonyl-1,4-hydroquinone
B-4: Cyclooctylenephosphonyl hydroquinone [a mixture of 1',4'-cyclooctylenephosphonyl-1,4-hydroquinone and 1',5'-cyclooctylenephosphonyl-1,4-hydroquinone]
B-5: 1,4-Bis[(9,10-dihydro-9-oxa-10-oxide-10-phosphaphenanthren-10-yl)methyl]benzene
B-6: Phosphorus-containing polyarylate [a phosphorus-containing polyarylate prepared by a polycondensation reaction from diacetate of the compound "B-1" and terephthalic acid/isophthalic acid (molar ratio: 50/50)]
B-7: N,N'-bis[(9,10-dihydro-9-oxa-10-oxide-10-phosphaphenanthren-10-yl)methyl]benzoguanamine ["HCA-BG", manufactured by Sanko Co., Ltd.]
B-8: [(9,10-Dihydro-9-oxa-10-oxide-10-phosphaphenanthren-10-yl)methyl]benzene [BCA(10-benzyl-9,10-dihydro-9-oxa-10-phosphaphenanthrene-10-oxide), manufactured by Sanko Co., Ltd.]
B-9: 1,4-Bis[(cyclooctylenephosphonyl)methyl]benzene (a mixture of 1,4-bis[(1',4'-cyclooctylenephosphonyl)methyl]benzene and 1,4-bis[(1',5'-cyclooctylenephosphonyl)methyl]benzene)
B-10: [(Cyclooctylenephosphonyl)methyl]benzene (a mixture of [(1,4-cyclooctylenephosphonyl)methyl]benzene and [(1,5-cyclooctylenephosphonyl)methyl]benzene)

[Flame Retardant B (Organic Phosphorus Compound Used in Comparative Examples)]
B-11: 9,10-Dihydro-9-oxa-10-phosphaphenanthrene-10-oxide
B-12: Resorcinol bis(diphenyl phosphate)

[Flame-retardant Auxiliary C]

[Phosphorus-containing Compound C1]
C1-1: Red phosphorus ["NOVA EXCEL 140", manufactured by Rinkagaku Kogyo Co., Ltd.]
C1-2: Aluminum ethylmethylhypophosphite [prepared based on Examples described in Japanese Patent Application Laid-Open No. 60924/1999 (JP-11-60924A)]
C1-3: Resorcinol bis(di-2,6-xylyl phosphate)
C1-4: 1,4-Piperazinediyltetra-2,6-xylyl phosphate [N,N'-bis(di-2,6-xylyloxyphosphinyl)piperazine]
C1-5: Polyphenoxyphosphazene

[Aromatic Resin C2]
C2-1: Polycarbonate ["IUPILON S3000", manufactured by Mitsubishi Gas Chemical Co., Inc.]
C2-2: Polyarylate ["POLYARYLATE U100", manufactured by Unitika Ltd.]
C2-3: Nylon MXD6 ["RENY 6002", manufactured by Mitsubishi Engineering-Plastics Corp.]
C2-4: Poly(2,6-dimethyl-1,4-phenylene)oxide ["PPE POLYMER YPX-100F", manufactured by Mitsubishi Gas Chemical Co., Inc.]
C2-5: Novolak phenol resin ["PR-53647", manufactured by Sumitomo Durez Co., Ltd.]
C2-6: Phenol aralkyl resin ["MILEX XL-225", manufactured by Mitsui Chemicals, Inc.]
C2-7: Poly(1,4-phenylene)sulfide
C2-8: Phenoxy resin ["PHENOTOHTO YP-50", manufactured by Tohto Kasei Co., Ltd.]
C2-9: Bisphenol A-based epoxy resin ["EPIKOTE 1004K", manufactured by Yuka Shell Epoxy K.K.]
C2-10: Poly-p-vinyl phenol ["MARUKA LYNCUR MS-1P", manufactured by Maruzen Petrochemical Co., Ltd.]
C2-11: Phenol-novolak epoxy resin ["EPPN-201", manufactured by Nippon Kayaku Co., Ltd.]

[Nitrogen-Containing Resin C3]
C3-1: Melamine cyanurate ["MC610", manufactured by Nissan Chemical Industries, Ltd.]
C3-2: Melam polyphosphate ["PMP200", manufactured by Nissan Chemical Industries, Ltd.]
C3-3: Melamine polyphosphate ["Melapur200", manufactured by DSM]
C3-4: Melamine sulfate ["APINON 901", manufactured by Sanwa Chemical Co., Ltd.]
C3-5: piperazine salt of 5,5'-bitetrazole
C3-6: Acetyleneurea

[Inorganic Metal Compound C4]
C4-1: Zinc borate ["FIREBRAKE ZB", manufactured by Borax Japan Ltd.]
C4-2: Anhydrous calcium secondary phosphate [mean particle size=about 30 μm, manufactured by Taihei Chemical Industrial Co., Ltd.]
C4-3: Magnesium hydroxide ["KISUMA 5E", manufactured by Kyowa Chemical Industry Co., Ltd.]
C4-4: Zinc borate ["FireBrake 415", manufactured by Borax Japan Ltd.]

[Sulfur-containing Compound C5]
C5-1: Sodium salt of sulfonated polystyrene [manufactured by Lion Corporation]

[Silicon-containing Compound C6]
C6-1: Zeolite ["ZEOLAMA-3", manufactured by Tosoh Corp.]
C6-2: Silicone resin ["Si POWDER DC4-7015", manufactured by Dow Corning Toray Silicone Co., Ltd.]
C6-3: Silicone resin ["X-40-9805", manufactured by Shin-Etsu Chemical Co., Ltd.]

[Antioxidant D]
D-1: Pentaerythritol-tetrakis[3-(3,5-di-t-butyl-4-hydroxyphenyl)propionate] ["IRGANOX 1010", manufactured by Ciba-Geigy Ltd.]

[Phosphorus-containing Stabilizer E]
E-1: Bis(2,6-di-t-butyl-4-methylphenyl) pentaerythritol diphosphite ["ADKSTAB PEP36", manufactured by Adeka Argus Chemical Co., Ltd.]
E-2: Tetrakis(2,4-di-t-butylphenyl)-4,4'-biphenylene diphosphonite ["SANDOSTAB P-EPQ", manufactured by Sandoz.]

[Dripping Inhibitor F]
F-1: Polytetrafluoroethylene

[Filler G]
G-1: Glass chopped strand being 10 μm in diameter and 3 mm long
G-2: Talc ["TALC 3A", manufactured by Nippon Talc Co., Ltd.]

Examples 1 to 90 and Comparative Examples 1 to 46

The above components were mixed in the ratio (parts by weight) described in Tables 1 to 11, and the mixture was kneaded with the use of a small extruder (manufactured by Toyo Seiki Seisaku-sho, Ltd.) to prepare a resin composition. The obtained resin composition was subjected to press molding to make shaped articles for test. The properties were evaluated with the use of the test shaped articles. The results are shown in Tables 1 to 11.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Base resin A | | A-1 100 | A-1 100 | A-1 100 | A-1 100 | A-1 100 | A-1 100 | A-1 100 | A-1 100 | A-1 100 | A-1 92 A-2 8 |
| Flame retardant B | | B-1 10 | B-1 10 | B-1 10 | B-1 35 | B-2 35 | B-3 35 | B-4 35 | B-1 35 | B-1 35 | B-1 40 |
| Flame-retardant auxiliary C | C1 | C1-1 8 | C1-1 8 | C1-2 20 | — | — | — | — | — | — | — |
| | C2 | — | — | — | C2-1 90 | C2-1 80 | C2-1 90 | C2-1 80 | C2-2 90 | C2-3 80 | C2-4 30 C2-5 10 |
| | C3 | — | — | — | — | C3-1 10 | — | C3-1 10 | — | C3-1 10 | — |
| | C4 to C6 | — | — | — | — | — | — | — | — | — | — |
| Antioxidant D | D-1 | 0.3 | 0.3 | 0.3 | 0.3 | 0.3 | 0.3 | 0.3 | 0.3 | 0.3 | 0.5 |
| Phosphorus-containing stabilizer E | E-1 | — | 0.3 | 0.3 | 0.3 | 0.3 | 0.3 | — | 0.3 | 0.3 | 1.0 |
| | E-2 | — | — | — | — | — | — | 0.3 | — | — | — |
| Dripping inhibitor F | F-1 | — | 0.8 | 1.0 | 1.0 | 1.0 | — | — | — | — | 1.0 |
| Filler G | G-1 | — | 45 | 60 | — | — | — | — | — | — | 80 |
| | G-2 | — | — | — | — | — | — | — | — | — | — |
| UL94 Flame retardancy | | V-0 | V-0 | V-0 | V-0 | V-0 | V-0 | V-0 | V-0 | V-0 | V-0 |
| Blooming properties | | A | A | A | A | A | A | A | A | A | A |

TABLE 2

| | | Examples | | | | | | | | | | |
|---|---|---|---|---|---|---|---|---|---|---|---|---|
| | | 11 | 12 | 13 | 14 | 15 | 16 | 17 | 18 | 19 | 20 | 21 |
| Base resin A | | A-1 100 | A-1 100 | A-1 100 | A-1 100 | A-1 100 | A-1 100 | A-1 100 | A-1 100 | A-1 100 | A-1 100 | A-1 100 |
| Flame retardant B | | B-1 20 | B-1 20 | B-1 30 | B-4 15 | B-1 15 | B-4 45 | B-4 45 | B-4 45 | B-3 45 | B-4 45 | B-1 45 |
| Flame-retardant auxiliary C | C1 | — | — | — | — | — | — | — | — | — | — | — |
| | C2 | C2-5 20 | C2-5 20 | C2-1 10 C2-6 30 | — | — | — | — | — | — | — | — |

TABLE 2-continued

|  |  | Examples |  |  |  |  |  |  |  |  |  |  |
|---|---|---|---|---|---|---|---|---|---|---|---|---|
|  |  | 11 | 12 | 13 | 14 | 15 | 16 | 17 | 18 | 19 | 20 | 21 |
|  | C3 | — | — | — | C3-2 75 | C3-3 75 | C3-4 20 | C3-5 20 | C3-1 20 | C3-2 20 | C3-3 20 | C3-1 10 |
|  | C4 to C6 | — | — | — | — | — | — | — | — | — | — | C4-1 10 |
| Antioxidant D | D-1 | 0.5 | 0.5 | 0.5 | 0.5 | 0.5 | 0.5 | 0.5 | 0.5 | 0.5 | 0.5 | 0.5 |
| Phosphorus-containing stabilizer E | E-1 | 0.5 | 0.5 | 0.5 | 0.5 | 0.5 | 0.5 | 0.5 | 0.5 | 0.5 | 0.5 | 0.5 |
|  | E-2 | — | — | — | — | — | — | — | — | — | — | — |
| Dripping inhibitor F | F-1 | — | — | — | 1.0 | 1.0 | 1.0 | 1.0 | 1.0 | 1.0 | 1.0 | 1.0 |
| Filler G | G-1 | — | 60 | 30 | 50 | 50 | 60 | 60 | 60 | 60 | 60 | 60 |
|  | G-2 | — | — | — | — | — | — | — | — | — | — | — |
| UL94 Flame retardancy |  | V-0 | V-0 | V-0 | V-0 | V-0 | V-0 | V-0 | V-0 | V-0 | V-0 | V-0 |
| Blooming properties |  | A | A | A | A | A | A | A | A | B | B | A |

TABLE 3

|  |  | Examples |  |  |  |  |  |  |  |  |  |  |
|---|---|---|---|---|---|---|---|---|---|---|---|---|
|  |  | 22 | 23 | 24 | 25 | 26 | 27 | 28 | 29 | 30 | 31 | 32 |
| Base resin A |  | A-1 100 | A-1 100 | A-1 100 | A-1 100 | A-1 100 | A-1 100 | A-1 92 A-2 8 | A-1 92 A-2 8 | A-1 92 A-2 8 | A-1 92 A-2 8 | A-1 92 A-3 8 |
| Flame retardant B |  | B-1 15 | B-4 15 | B-4 45 | B-1 20 | B-1 40 | B-1 35 | B-1 40 | B-1 40 | B-2 40 | B-4 40 | B-4 40 |
| Flame-retardant auxiliary C | C1 | — | — | — | — | — | — | — | — | — | — | — |
|  | C2 | — | — | — | C2-4 25 | C2-4 30 | C2-1 5 C2-4 30 | C2-4 30 | C2-4 30 | C2-4 15 C2-7 15 | C2-4 30 | C2-4 30 |
|  | C3 | C3-1 15 | C3-1 15 | C3-1 10 | C3-1 20 | C3-1 10 | C3-1 10 | C3-1 10 | C3-3 10 | C3-3 10 | C3-1 10 | C3-3 10 |
|  | C4 to C6 | C4-2 15 | C4-1 15 | C4-1 10 | — | — | — | — | — | — | — | — |
| Antioxidant D | D-1 | 0.5 | 0.5 | 0.5 | 0.5 | 0.5 | 0.5 | 0.5 | 0.5 | 0.5 | 0.5 | 0.5 |
| Phosphorus-containing stabilizer E | E-1 | 0.5 | 0.5 | 0.5 | 0.5 | 0.5 | 0.5 | 0.5 | 0.5 | — | 0.5 | 0.5 |
|  | E-2 | — | — | — | — | — | — | — | — | 0.5 | — | — |
| Dripping inhibitor F | F-1 | — | — | 1.0 | — | — | 1.5 | 1.5 | 1.5 | 1.5 | 1.5 | 1.5 |
| Filler G | G-1 | — | — | 60 | — | 80 | 80 | 80 | 80 | 80 | 80 | 80 |
|  | G-2 | — | — | — | — | — | — | — | — | — | — | — |
| UL94 Flame retardancy |  | V-0 | V-0 | V-0 | V-0 | V-0 | V-0 | V-0 | V-0 | V-0 | V-0 | V-0 |
| Blooming properties |  | A | A | A | A | A | A | A | A | A | A | A |

TABLE 4

|  |  | Examples |  |  |  |  |  |  |  |  |  |  |  |  |  |  |  |
|---|---|---|---|---|---|---|---|---|---|---|---|---|---|---|---|---|---|
|  |  | 33 | 34 | 35 | 36 | 37 | 38 | 39 | 40 | 41 | 42 | 43 | 44 | 45 | 46 | 47 | 48 | 49 |
| Base resin A |  | A-1 92 A-2 8 | A-1 92 A-3 8 | A-1 92 A-2 8 | A-1 92 A-2 8 | A-1 92 A-2 8 | A-1 92 A-2 8 | A-1 92 A-3 8 | A-1 92 A-2 8 | A-1 92 A-3 8 | A-1 92 A-3 8 | A-1 92 A-2 8 | A-1 100 | A-1 100 | A-1 60 A-4 40 | A-1 100 | A-1 100 | A-1 92 A-2 8 |
| Flame retardant B |  | B-5 40 | B-5 40 | B-6 40 | B-7 40 | B-1 20 | B-1 20 | B-1 20 | B-1 35 | B-1 35 | B-1 35 | B-4 35 | B-1 45 | B-1 45 | B-1 45 | B-1 25 | B-4 25 | B-5 25 |
| Flame-retardant auxiliary C | C1 | — | — | — | — | C1-3 20 | C1-4 20 | C1-5 20 | — | — | — | — | — | — | — | — | — | — |
|  | C2 | C2-4 30 | C2-4 30 | C2-4 30 | C2-4 30 | C2-4 30 | C2-4 30 | C2-4 30 | C2-1 5 C2-4 30 | C2-8 5 C2-4 30 | C2-9 5 C2-4 30 | C2-1 5 C2-4 30 | C2-1 3 C2-4 45 | C2-1 3 C2-4 45 | C2-1 3 C2-4 45 | C2-1 3 C2-4 45 | C2-1 3 C2-4 45 | C2-1 3 C2-4 45 |
|  | C3 | C3-1 10 | C3-1 10 | C3-1 10 | C3-3 10 | C3-1 10 | C3-1 10 | C3-1 10 | C3-1 10 | C3-3 10 | C3-3 10 | C3-3 10 | — | — | — | C3-1 20 | C3-1 20 | C3-3 20 |
|  | C4 to C6 | — | C4-3 1 | C6-1 3 | — | — | — | — | — | — | — | — | C4-1 6 | C4-1 6 | C4-2 10 | C4-1 6 | C4-1 6 | C4-1 6 |
| Antioxidant D | D-1 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Phosphorus-containing stabilizer E | E-1 | 0.5 | 0.5 | — | — | 0.5 | 0.5 | 0.5 | 0.5 | 0.5 | 0.5 | 0.5 | 0.5 | 0.5 | 0.5 | 0.5 | 0.5 | 0.5 |
|  | E-2 | — | — | 0.5 | 0.5 | — | — | — | — | — | — | — | — | — | — | — | — | — |
| Dripping inhibitor F | F-1 | 1.5 | 1.5 | 1.5 | 1.5 | — | — | — | 1.5 | 1.5 | 1.5 | 1.5 | 1.5 | 1.5 | 1.5 | 1.5 | 1.5 | 1.5 |

TABLE 4-continued

|  |  | Examples | | | | | | | | | | | | | | | | |
|---|---|---|---|---|---|---|---|---|---|---|---|---|---|---|---|---|---|
|  |  | 33 | 34 | 35 | 36 | 37 | 38 | 39 | 40 | 41 | 42 | 43 | 44 | 45 | 46 | 47 | 48 | 49 |
| Filler G | G-1 | 80 | 80 | 80 | 80 | 80 | 80 | 80 | 80 | 80 | 80 | 80 | — | 80 | 80 | 80 | 80 | 80 |
|  | G-2 | — | — | — | — | — | — | — | — | — | — | — | — | — | — | — | — | — |
| UL94 Flame retardancy |  | V-0 | V-0 | V-0 | V-0 | V-0 | V-0 | V-0 | V-0 | V-0 | V-0 | V-0 | V-0 | V-0 | V-0 | V-0 | V-0 | V-0 |
| Blooming properties |  | A | A | A | A | A | A | A | A | A | A | A | A | A | A | A | A | A |

TABLE 5

|  |  | Examples | | | | | | | | | | | | | | | | |
|---|---|---|---|---|---|---|---|---|---|---|---|---|---|---|---|---|---|
|  |  | 50 | 51 | 52 | 53 | 54 | 55 | 56 | 57 | 58 | 59 | 60 | 61 | 62 | 63 | 64 | 65 | 66 | 67 |
| Base resin A |  | A-1 90 A-3 10 | A-1 90 A-3 10 | A-1 90 A-3 10 | A-1 90 A-3 10 | A-1 70 A-4 30 | A-1 70 A-4 30 | A-4 100 | A-4 100 | A-4 100 | A-1 50 A-4 50 | A-1 70 A-4 30 | A-4 100 | A-4 100 | A-4 92 A-2 8 | A-4 92 A-3 8 | A-1 40 A-3 20 A-4 40 | A-1 40 A-3 20 A-4 40 | A-5 92 A-2 8 |
| Flame retardant B |  | B-1 30 | B-1 30 | B-4 30 | B-5 30 | B-1 30 | B-1 30 | B-1 20 | B-1 20 | B-4 20 | B-1 20 | B-1 15 | B-1 45 | B-1 45 | B-1 25 | B-5 25 | B-1 35 | B-4 35 | B-1 25 |
| Flame-retardant auxiliary C | C1 | — | — | — | — | — | — | — | — | — | — | — | — | — | — | — | — | — | — |
|  | C2 | C2-5 25 | C2-5 25 | C2-5 25 | C2-5 25 | C2-1 90 | C2-1 90 | — | — | — | — | — | — | — | C2-4 20 | C2-4 20 | C2-9 5 | C2-9 5 | C2-4 20 |
|  | C3 | C3-1 12 | C3-6 12 | C3-1 12 | C3-1 12 | — | — | C3-1 40 | C3-1 40 | C3-3 40 | C3-1 40 | C3-3 75 | C3-1 10 | C3-3 10 | C3-1 10 | C3-2 10 | C3-1 50 | C3-3 50 | C3-1 10 |
|  | C4 to C6 | — | — | — | — | C5-1 0.3 | C6-2 5 | — | — | — | — | — | C4-1 10 | C4-2 10 | — | — | — | — | — |
| Antioxidant D | D-1 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Phosphorus-containing inhibitor E | E-1 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | — | 0.5 |
|  | E-2 | — | — | — | — | — | — | — | — | — | — | — | — | — | — | — | — | 0.5 | — |
| Dripping inhibitor F | F-1 | 1.5 | 1.5 | 1.5 | 1.5 | 1.5 | 1.5 | 1.5 | 1.5 | 1.5 | 1.5 | 1.0 | 1.5 | 1.5 | 1.5 | 1.5 | 1.5 | 1.5 | 1.5 |
| Filler G | G-1 | 80 | 80 | 80 | 80 | — | — | 60 | 40 | 60 | 60 | 50 | 60 | 60 | 80 | 80 | 90 | 90 | 80 |
|  | G-2 | — | — | — | — | — | — | — | 20 | — | — | — | — | — | 4 | 4 | — | — | — |
| UL94 Flame retardancy |  | V-0 | V-0 | V-0 | V-0 | V-0 | V-0 | V-0 | V-0 | V-0 | V-0 | V-0 | V-0 | V-0 | V-0 | V-0 | V-0 | V-0 | V-0 |
| Blooming properties |  | A | A | A | A | A | A | A | A | A | A | A | A | A | A | A | A | A | A |

TABLE 6

|  |  | Examples | | | | | | | | | | | | |
|---|---|---|---|---|---|---|---|---|---|---|---|---|---|---|
|  |  | 68 | 69 | 70 | 71 | 72 | 73 | 74 | 75 | 76 | 77 | 78 | 79 | 80 |
| Base resin A |  | A-6 70 A-7 30 | A-6 80 A-7 20 | A-6 70 A-7 30 | A-6 80 A-1 20 | A-6 80 A-4 20 | A-6 90 A-8 10 | A-6 90 A-9 10 | A-6 70 A-9 30 | A-7 45 A-10 55 | A-7 45 A-10 55 | A-2 40 A-10 60 | A-7 30 A-11 70 | A-7 30 A-11 70 |
| Flame retardant B |  | B-1 10 | B-4 10 | B-1 10 | B-1 7 | B-1 7 | B-1 5 | B-1 5 | B-4 5 | B-1 15 | B-4 15 | B-1 15 | B-1 15 | B-1 15 |
| Flame-retardant auxiliary C | C1 | — | — | — | — | — | — | — | — | — | — | — | — | — |
|  | C2 | — | — | — | — | — | — | — | — | — | — | — | — | — |
|  | C3 | C3-3 12 | — | C3-1 5 | — | — | — | — | — | C3-3 5 | C3-1 5 | — | C3-1 15 | — |
|  | C4 to C6 | — | C4-1 10 | C4-2 5 | C4-1 3 | C4-2 3 | C5-1 0.5 | C5-1 0.5 | C6-3 5 | — | — | C4-1 3 | — | C4-1 15 |
| Antioxidant D | D-1 | 0.5 | 0.5 | 0.5 | 0.5 | 0.5 | 1.0 | 1.0 | 1.0 | 0.5 | 0.5 | 0.5 | 0.5 | 0.5 |
| Phosphorus-containing stabilizer E | E-1 | 0.5 | 0.5 | 0.5 | 0.5 | 0.5 | 1.0 | 1.0 | — | 0.5 | 0.5 | 0.5 | 0.5 | 0.5 |
|  | E-2 | — | — | — | — | — | — | — | 1.0 | — | — | — | — | — |
| Dripping inhibitor F | F-1 | 0.5 | 0.5 | 0.5 | 0.5 | 0.5 | 1.5 | 1.5 | 1.5 | 0.5 | 0.5 | 0.5 | 0.8 | 0.8 |
| Filler G | G-1 | — | — | — | — | — | 45 | 45 | 45 | — | — | — | 30 | 30 |
|  | G-2 | — | — | — | 1.0 | 1.0 | — | — | — | — | — | — | — | — |
| UL94 Flame retardancy |  | V-0 | V-0 | V-0 | V-0 | V-0 | V-0 | V-0 | V-0 | V-0 | V-0 | V-0 | V-0 | V-0 |
| Blooming properties |  | A | A | A | A | A | A | A | A | A | A | A | A | A |

TABLE 7

| | | Comparative Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Base resin A | | A-1 100 | A-1 100 | A-1 100 | A-1 100 | A-1 100 | A-1 100 | A-1 100 | A-1 100 | A-1 100 | A-1 100 | A-1 100 | A-1 100 A-2 8 | A-1 100 |
| Flame retardant B | | B-1 10 | — | — | B-1 35 | B-2 35 | B-3 35 | B-4 45 | B-5 40 | — | — | — | — | — |
| Flame-retardant auxiliary C | C1 | — | C1-1 8 | C1-2 20 | — | — | — | — | — | — | — | — | — | — |
| | C2 | — | — | — | — | — | — | — | — | C2-1 90 | C2-2 90 | C2-3 80 | C2-4 30 | C2-5 20 |
| | C3 | — | — | — | — | — | — | — | — | — | — | C3-1 10 | — | — |
| | C4 to C6 | — | — | — | — | — | — | — | — | — | — | — | — | — |
| Antioxidant D | D-1 | 0.3 | 0.3 | 0.3 | 0.3 | 0.3 | 0.3 | 0.3 | 0.3 | 0.3 | 0.3 | 0.3 | 0.5 | 0.5 |
| Phosphorus-containing stabilizer E | E-1 | — | 0.3 | 0.3 | 0.3 | 0.3 | 0.3 | — | — | 0.3 | 0.3 | 0.3 | 1.0 | 0.5 |
| | E-2 | — | — | — | — | — | — | 0.3 | 0.3 | — | — | — | — | — |
| Dripping inhibitor F | F-1 | — | 0.8 | 1.0 | 1.0 | 1.0 | — | — | — | — | — | — | 1.0 | — |
| Filler G | G-1 | — | 45 | 60 | — | — | — | — | — | — | — | — | 80 | — |
| | G-2 | — | — | — | — | — | — | — | — | — | — | — | — | — |
| UL94 Flame retardancy | | HB | HB | V-2 | HB | HB | HB | HB | HB | HB | HB | HB | HB | HB |
| Blooming properties | | A | A | A | C | C | C | C | C | A | A | A | A | A |

TABLE 8

| | | Comparative Examples | | | | | | | | | | | | |
|---|---|---|---|---|---|---|---|---|---|---|---|---|---|---|
| | | 14 | 15 | 16 | 17 | 18 | 19 | 20 | 21 | 22 | 23 | 24 | 25 | 26 |
| Base resin A | | A-1 100 | A-1 100 | A-1 100 | A-1 100 | A-1 92 A-2 8 | A-1 92 A-2 8 | A-1 92 A-2 8 | A-1 92 A-2 8 | A-1 92 A-2 8 | A-1 92 A-3 8 | A-1 70 A-4 30 | A-1 70 A-4 30 | A-1 92 A-2 8 |
| Flame retardant B | | — | — | — | — | — | — | — | — | — | — | — | — | — |
| Flame-retardant auxiliary C | C1 | — | — | — | — | — | — | C1-3 20 | C1-4 20 | C1-5 20 | — | — | — | — |
| | C2 | C2-5 20 | — | — | C2-4 30 | C2-4 30 | C2-4 30 | C2-4 30 | C2-4 30 | C2-4 30 | C2-5 25 | C2-1 90 | C2-1 90 | C2-4 20 |
| | C3 | — | C3-2 75 | C3-1 10 | C3-1 10 | C3-1 10 | C3-3 10 | C3-1 10 | C3-1 10 | C3-1 10 | C3-1 12 | — | — | C3-1 10 |
| | C4 to C6 | — | — | C4-1 10 | — | — | — | — | — | — | — | C5-1 0.3 | C6-1 5 | — |
| Antioxidant D | D-1 | 0.5 | 0.5 | 0.5 | 0.5 | 0.5 | 0.5 | 0.5 | 0.5 | 0.5 | 0.5 | 0.5 | 0.5 | 0.5 |
| Phosphorus-containing stabilizer E | E-1 | 0.5 | 0.5 | 0.5 | 0.5 | 0.5 | 0.5 | 0.5 | 0.5 | 0.5 | 0.5 | 0.5 | 0.5 | 0.5 |
| | E-2 | — | — | — | — | — | — | — | — | — | — | — | — | — |
| Dripping inhibitor F | F-1 | — | 1.0 | 1.0 | — | 1.5 | 1.5 | — | — | — | 1.5 | 1.5 | 1.5 | 1.5 |
| Filler G | G-1 | 60 | 50 | 60 | 80 | 80 | 80 | 80 | 80 | 80 | 80 | — | — | 80 |
| | G-2 | — | — | — | — | — | — | — | — | — | — | — | — | 4 |
| UL94 Flame retardancy | | HB | HB | HB | HB | HB | HB | V-2 | V-2 | HB | HB | HB | HB | HB |
| Blooming properties | | A | B | A | A | A | A | A | A | A | A | A | A | A |

TABLE 9

| | | Comparative Examples | | | | | | | |
|---|---|---|---|---|---|---|---|---|---|
| | | 27 | 28 | 29 | 30 | 31 | 32 | 33 | 34 |
| Base resin A | | A-4 100 | A-4 100 | A-5 92 A-2 8 | A-1 100 | A-1 100 | A-1 92 A-2 8 | A-1 100 | A-1 90 A-3 8 |
| Flame retardant B | | — | — | — | B-11 10 | B-11 35 | B-11 40 | B-12 35 | B-11 30 |
| Flame-retardant auxiliary C | C1 | — | — | — | C1-1 8 | — | — | — | — |
| | C2 | — | — | C2-4 20 | — | C2-1 90 | C2-4 30 | — | C2-5 25 |
| | C3 | C3-1 20 | — | C3-1 10 | — | — | — | C3-1 20 | C3-1 12 |
| | C4 to C6 | — | C4-1 10 | — | — | — | — | — | — |

TABLE 9-continued

|  |  | Comparative Examples | | | | | | | |
|---|---|---|---|---|---|---|---|---|---|
|  |  | 27 | 28 | 29 | 30 | 31 | 32 | 33 | 34 |
| Antioxidant D | D-1 | 0.5 | 0.5 | 0.5 | 0.3 | 0.3 | 0.5 | 0.5 | 0.5 |
| Phosphorus-containing stabilizer E | E-1 | 0.5 | 0.5 | 0.5 | — | 0.3 | 1.0 | 0.5 | 0.5 |
|  | E-2 | — | — | — | — | — | — | — | — |
| Dripping inhibitor F | F-1 | 1.5 | 1.5 | 1.5 | — | 1.0 | 1.0 | 1.0 | 1.5 |
| Filler G | G-1 | 60 | 60 | 80 | — | — | 80 | 60 | 80 |
|  | G-2 | — | — | — | — | — | — | — | — |
| UL94 Flame retardancy |  | HB | HB | HB | V-0 | V-2 | V-1 | V-0 | V-0 |
| Blooming properties |  | A | A | A | C | B | C | C | C |

TABLE 10

|  |  | Comparative Examples | | | | | | | | | | | |
|---|---|---|---|---|---|---|---|---|---|---|---|---|
|  |  | 35 | 36 | 37 | 38 | 39 | 40 | 41 | 42 | 43 | 44 | 45 | 46 |
| Base resin A |  | A-6 | A-6 | A-6 | A-6 | A-6 | A-6 | A-7 | A-7 | A-7 | A-7 | A-7 | A-7 |
|  |  | 70 | 70 | 80 | 80 | 80 | 90 | 45 | 45 | 45 | 30 | 30 | 30 |
|  |  | A-7 | A-7 | A-7 | A-1 | A-1 | A-9 | A-10 | A-10 | A-10 | A-11 | A-11 | A-11 |
|  |  | 30 | 30 | 30 | 20 | 20 | 10 | 55 | 55 | 55 | 70 | 70 | 70 |
| Flame retardant B |  | B-1 | — | B-11 | B-1 | — | — | B-1 | — | B-11 | B-1 | — | B-11 |
|  |  | 10 |  | 10 | 7 |  |  | 15 |  | 15 | 15 |  | 15 |
| Flame-retardant auxiliary C | C1 | — | — | — | — | — | — | — | — | — | — | — | — |
|  | C2 | — | — | — | — | — | — | — | — | — | — | — | — |
|  | C3 | — | C3-2 | C3-2 | — | — | — | — | C3-2 | C3-2 | — | C3-1 | C3-1 |
|  |  |  | 12 | 5 |  |  |  |  | 5 | 5 |  | 15 | 15 |
|  | C4 to C6 | — | — | — | — | C4-1 | C5-1 | — | — | — | — | — | — |
|  |  |  |  |  |  | 3 | 0.5 |  |  |  |  |  |  |
| Antioxidant D | D-1 | 0.5 | 0.5 | 0.5 | 0.5 | 0.5 | 1.0 | 0.5 | 0.5 | 0.5 | 0.5 | 0.5 | 0.5 |
| Phosphorus-containing stabilizer E | E-1 | 0.5 | 0.5 | 0.5 | 0.5 | 0.5 | 1.0 | 0.5 | 0.5 | 0.5 | 0.5 | 0.5 | 0.5 |
|  | E-2 | — | — | — | — | — | — | — | — | — | — | — | — |
| Dripping inhibitor F | F-1 | 0.5 | 0.5 | 0.5 | — | — | — | 0.5 | 0.5 | 0.5 | 0.8 | 0.8 | 0.8 |
| Filler G | G-1 | — | — | — | — | — | 45 | — | — | — | 30 | 30 | 30 |
|  | G-2 | — | — | — | 1.0 | 1.0 | — | — | — | — | — | — | — |
| UL94 Flame retardancy |  | V-2 | HB | V-1 | V-2 | HB | V-2 | V-2 | HB | V-1 | V-2 | HB | V-0 |
| Blooming properties |  | A | A | C | A | A | A | A | A | C | A | A | C |

TABLE 11

|  |  | Examples | | | | | | | | | |
|---|---|---|---|---|---|---|---|---|---|---|---|
|  |  | 81 | 82 | 83 | 84 | 85 | 86 | 87 | 88 | 89 | 90 |
| Base resin A |  | A-1 | A-1 | A-1 | A-2 | A-1 | A-3 | A-1 | A-1 | A-1 | A-3 |
|  |  | 92 | 60 | 92 | 8 | 90 | 10 | 90 | 40 | 40 | 20 |
|  |  | A-2 | A-2 | A-2 | A-12 | A-3 | A-12 | A-3 | A-3 | A-3 | A-4 |
|  |  | 8 | 10 | 8 | 92 | 10 | 90 | 10 | 20 | 20 | 40 |
|  |  |  | A-4 |  |  |  |  |  | A-4 | A-4 | A-12 |
|  |  |  | 30 |  |  |  |  |  | 40 | 40 | 40 |
| Flame retardant B |  | B-8 | B-9 | B-10 | B-8 | B-8 | B-8 | B-9 | B-8 | B-9 | B-8 |
|  |  | 40 | 40 | 40 | 40 | 30 | 30 | 30 | 35 | 35 | 35 |
| Flame-retardant auxiliary C | C1 | — | — | — | — | — | — | — | — | — | — |
|  | C2 | C2-4 | C2-4 | C2-4 | C2-4 | C2-5 | C2-5 | C2-6 | C2-9 | — | C2-10 |
|  |  | 30 | 30 | 30 | 30 | 25 | 25 | 25 | 5 |  | 5 |
|  | C3 | C3-1 | C3-2 | C3-1 | C3-1 | C3-1 | C3-1 | C3-2 | C3-1 | C3-1 | C3-1 |
|  |  | 10 | 10 | 10 | 10 | 12 | 12 | 12 | 50 | 50 | 50 |
|  | C4 to C6 | — | — | — | — | — | — | — | — | — | — |
| Antioxidant D | D-1 | 0.5 | 0.5 | 0.5 | 0.5 | 0.5 | 0.5 | 0.5 | 0.5 | 0.5 | 0.5 |
| Phosphorus-containing stabilizer E | E-1 | 0.5 | 0.5 | 0.5 | 0.5 | 0.5 | 0.5 | 0.5 | 0.5 | 0.5 | 0.5 |
|  | E-2 | — | — | — | — | — | — | — | — | — | — |
| Dripping inhibitor F | F-1 | 1.5 | 1.5 | 1.5 | 1.5 | 1.5 | 1.5 | 1.5 | 1.5 | 1.5 | 1.5 |
| Filler G | G-1 | 80 | 80 | 80 | 80 | 80 | 80 | 80 | 80 | 80 | 80 |
|  | G-2 | — | — | — | — | — | — | — | — | — | — |
| UL94 Flame retardancy |  | V-0 | V-0 | V-0 | V-0 | V-0 | V-0 | V-0 | V-0 | V-0 | V-0 |
| Blooming properties |  | A | A | A | A | A | A | A | A | A | A |

The invention claimed is:

1. A flame-retardant resin composition, which comprises a base resin (A), an organic phosphorus compound (B), and a flame-retardant auxiliary (C), wherein the organic phosphorus compound (B) comprises at least one member selected from the group consisting of compounds represented by the following formulae (3-1), (4-1) and (4-2):

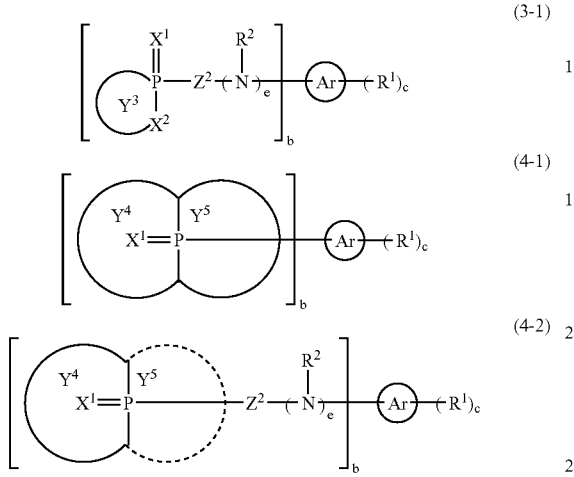

wherein Ar represents an aromatic hydrocarbon ring or a nitrogen-containing aromatic heterocycle; $X^1$ represents an oxygen atom or a sulfur atom; $X^2$ represents an oxygen atom or a sulfur atom; $Y^3$ represents a 5 to 10-membered ring which contains P and $X^2$ as ring-constituting atoms and may have a substituent, $Y^4$ and $Y^5$ are the same or different from each other and each represents a 4 to 10-membered ring which contains P as a ring-constituting atom and may have a substituent; $Z^2$ represents an alkylene group; $R^1$ represents an organic group; $R^2$ represents a hydrogen atom, an alkyl group, or a group represented by the following formulae (3a) or (4a):

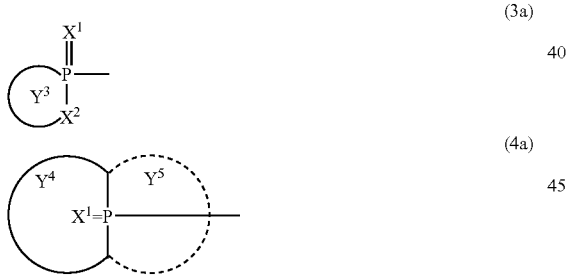

wherein $X^1$, $X^2$, $Y^3$, $Y^4$ and $Y^5$ have the same meanings defined above;

"b" denotes an integer of 1 to 6; "c" represents an integer of 0 to 9; and "e" represents 0 or 1.

2. A resin composition according to claim 1, wherein the base resin (A) comprises at least one thermoplastic resin selected from the group consisting of a polyester-series resin, a styrenic resin, a polyamide-series resin, a polycarbonate-series resin, a polyphenylene oxide-series resin, a vinyl-series resin, an olefinic resin, and an acrylic resin.

3. A resin composition according to claim 1, wherein the base resin (A) comprises a styrenic resin and at least one member selected from the group consisting of a polyester-series resin, a polyamide-series resin, a polycarbonate-series resin, and a polyphenylene oxide-series resin.

4. A resin composition according to claim 1, wherein the base resin (A) comprises a polyester-series resin, or at least a polyester-series resin and a styrenic resin.

5. A resin composition according to claim 1, wherein the polyester-series resin comprises a homo- or co-polyester having at least one unit selected from the group consisting of 1,4-cyclohexanedimethylene terephthalate, a $C_{2-4}$alkylene terephthalate, and a $C_{2-4}$ alkylene naphthalate.

6. A resin composition according to claim 1, wherein the polyester-series resin comprises a homo- or co-polyester having at least one unit selected from the group consisting of ethylene terephthalate, trimethylene terephthalate, and butylene terephthalate.

7. A resin composition according to claim 1, wherein, in the formula (3-1), (4-1) and (4-2), $R^1$ is at least one organic group selected from the group consisting of a hydrocarbon group, an N-substituted amino group, an amino group-containing hydrocarbon group, a hydroxyl group, and a substituted hydroxyl group; the ring Ar is a $C_{6-20}$aromatic hydrocarbon ring or a 6 to 20-membered aromatic heterocycle having 1 to 4 nitrogen atom(s) as a ring-constituting atom.

8. A resin composition according to claim 1, wherein, in the formula (3-1), (4-1) and (4-2), $R^1$ is a hydroxyl group or a substituted hydroxyl group, "c" is 2, and the ring Ar is a $C_{6-12}$aromatic hydrocarbon ring.

9. A resin composition according to claim 1, wherein the organic phosphorus compound (B) comprises at least one member selected from the group consisting of compounds represented by the following formulae (3c), (4-1b) and (4c):

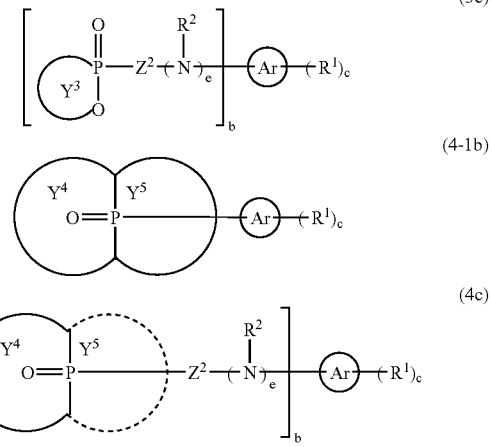

wherein $R^1$, $R^2$, Ar, $Y^3$, $Y^4$, $Y^5$, $Z^2$, "b", "c" and "e" have the same meanings as defined above.

10. A resin composition according to claim 1, wherein, in the formulae (3-1) and (3a), the phosphorus-containing group formed by the ring $Y^3$, $X^1$ and $X^2$ is a group represented by the following formula which may have an organic substituent on an aromatic ring:

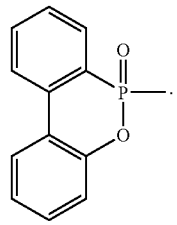

11. A resin composition according to claim 1, wherein the organic phosphorus compound (B) comprises a cycloalkylenephosphonyl-polyhydroxyarene.

12. A resin composition according to claim 1, wherein the organic phosphorus compound (B) comprises at least one member selected from the group consisting of a mono- or bis[(9,10-dihydro-9-oxa-10-oxide-10-phosphaphenanthlen-10-yl)$C_{1-4}$alkyl]benzene, an N-mono- or N,N-bis[(9,10-dihydro-9-oxa-10-oxide-10-phosphaphenanthlen-10-yl)$C_{1-4}$alkyl]aminotriazine, a mono- or bis[(cycloalkylenephosphonyl)$C_{1-4}$alkyl]benzene, and an N-mono- or N,N-bis[(cycloaklylenephosphonyl)$C_{1-4}$alkyl]aminotriazine.

13. A resin composition according to claim 1, wherein the organic phosphorus compound (B) comprises an oligomer or polymer obtainable from a compound of the formula (3-1), (4-1) or (4-2) and a dicarboxylic acid component containing at least an aromatic dicarboxylic acid, wherein, in the formulae (3-1), (4-1) and (4-2), $R^1$ is a hydroxyl group or a derivative group thereof capable of forming an ester and "c" is not less than 2.

14. A resin composition according to claim 1, wherein the flame-retardant auxiliary (C) comprises at least one member selected from the group consisting of
   (C1) a phosphorus-containing compound,
   (C2) an aromatic resin,
   (C3) a nitrogen-containing cyclic compound, or a salt thereof,
   (C4) an inorganic metal compound,
   (C5) a sulfur-containing compound, and
   (C6) a silicon-containing compound,
   wherein the phosphorus-containing compound (C1) is selected from the group consisting of (c-1) an inorganic phosphorus compound, (c-2) an orthophosphoric ester or a condensate thereof, (c-3) a phosphoric acid ester amide, (c-4) a phosphonitrilic compound, (c-5) a phosphorous ester having a phosphonyl group or a phosphinico group, or a metal salt thereof, and (c-6) an organic hypophosphorous acid compound having a phosphonyl group or a phosphinico group, or a metal salt thereof.

15. A resin composition according to claim 14, wherein the aromatic resin (C2) comprises at least one member selected from the group consisting of
   a polyphenylene sulfide-series resin,
   a polyphenylene oxide-series resin,
   a polycarbonate-series resin,
   an aromatic nylon,
   a polyarylate-series resin,
   an aromatic epoxy resin, and
   a resin of which the main chain or side chain contains an aromatic ring having a hydroxyl group, an amino group, or both.

16. A resin composition according to claim 14, wherein the cyclic compound or a salt thereof (C3) comprises at least one member selected from the group consisting of
   a nitrogen-containing cyclic compound having an amino group, or a salt thereof,
   a cyclic compound having a urea unit,
   a tetrazole compound, and
   a (poly)phosphoric amide.

17. A resin composition according to claim 14, wherein the inorganic metal compound (C4) comprises at least one member selected from the group consisting of a metal hydroxide, a metal borate, a metal hydrogenphosphate, and a metal stannate.

18. A resin composition according to claim 14, wherein the sulfur-containing compound (C5) comprises at least one member selected from salts of a metal with an organic sulfonic acid.

19. A resin composition according to claim 14, wherein the silicon-containing compound (C6) comprises at least one member selected from the group consisting of a linear or branched organosiloxane, and a zeolite.

20. A resin composition according to claim 1, wherein the total amount of the organic phosphorus compound (B) and the flame-retardant auxiliary (C) is 0.01 to 300 parts by weight relative to 100 parts by weight of the base resin (A), and the proportion of the organic phosphorus compound (B) relative to the flame-retardant auxiliary (C) [the former/the latter] is 5/100 to 1000/100.

21. A resin composition according to claim 1, which further comprises at least one member selected from the group consisting of a hindered phenol-series antioxidant, a phosphorus-containing stabilizer, a fluorine-containing resin, and a filler.

22. A process for producing a flame-retardant resin composition, which comprises mixing a base resin (A), an organic phosphorus compound (B) recited in claim 1 and a flame-retardant auxiliary (C).

23. A shaped article which is formed with a flame-retardant resin composition recited in claim 1.

24. A shaped article according to claim 23, which is an electric or electronic device part, an office automation device part, a household electrical appliance part, an automotive part, or a mechanical part or machine element.

* * * * *